(12) United States Patent
Lu et al.

(10) Patent No.: US 7,957,609 B2
(45) Date of Patent: Jun. 7, 2011

(54) SYSTEM FOR EXTENDED HIGH FRAME RATE IMAGING WITH LIMITED-DIFFRACTION BEAMS

(75) Inventors: Jian-yu Lu, Sylvania, OH (US); Jiqi Cheng, Selden, NY (US)

(73) Assignee: The University of Toledo, Toledo, OH (US)

( * ) Notice: Subject to any disclaimer, the term of this patent is extended or adjusted under 35 U.S.C. 154(b) by 654 days.

(21) Appl. No.: 11/991,129

(22) PCT Filed: Aug. 29, 2006

(86) PCT No.: PCT/US2006/033751
§ 371 (c)(1),
(2), (4) Date: Mar. 24, 2008

(87) PCT Pub. No.: WO2007/027703
PCT Pub. Date: Mar. 8, 2007

(65) Prior Publication Data
US 2009/0066727 A1    Mar. 12, 2009

Related U.S. Application Data

(60) Provisional application No. 60/712,080, filed on Aug. 29, 2005.

(51) Int. Cl.
*G06K 9/36* (2006.01)
*G09G 5/00* (2006.01)
(52) U.S. Cl. .................. 382/280; 345/643
(58) Field of Classification Search .......... 382/100, 382/131, 254, 280; 345/643, 619; 348/77
See application file for complete search history.

(56) References Cited

U.S. PATENT DOCUMENTS

| | | | |
|---|---|---|---|
| 5,492,121 A | 2/1996 | Lu | |
| 5,696,737 A | 12/1997 | Hossack et al. | |
| 5,720,708 A | 2/1998 | Lu et al. | |
| 5,799,649 A | 9/1998 | Prince | |

(Continued)

FOREIGN PATENT DOCUMENTS
WO    2007/089580    8/2007

OTHER PUBLICATIONS

Lu, Jian-Yu, 2D and 3D High Frame Rate Imaging with Limited Diffraction Beams, IEEE Transactions on Ultrasonics, Ferroelectrics, and Frequency Control, vol. 44, No. 4, Jul. 1997, pp. 839-856.

(Continued)

*Primary Examiner* — Yon Couso
(74) *Attorney, Agent, or Firm* — MacMillan, Sobanski & Todd LLC

(57) ABSTRACT

The present invention provides a method and a system for producing an image using an imaging system by weighting: i) the signals transmitted from at least one element of a transducer array to form limited diffraction transmitted beams or the transmitted beams are steered with linear time delay over transducer aperture; and, ii) weighting the echo signals received at the separate elements to form limited diffraction receive beams or doing Fourier transformations of the echo signals over the transducer aperture. Fourier transformations of the weighted or Fourier transformed signals form multi-dimensional k-space data sets which are used to interpolate into a rectilinear k-space of the object to be imaged. Inverse Fourier transformation along each dimension of the rectilinear k-space to produce an image.

71 Claims, 28 Drawing Sheets

U.S. PATENT DOCUMENTS

| | | | |
|---|---|---|---|
| 6,463,318 | B2 | 10/2002 | Prince |
| 6,497,666 | B1 | 12/2002 | Phillips et al. |
| 6,504,892 | B1 | 1/2003 | Ning |
| 6,517,489 | B1 * | 2/2003 | Phillips et al. ............. 600/458 |
| 6,685,641 | B2 | 2/2004 | Liu |
| 6,816,556 | B2 | 11/2004 | Kim |
| 6,867,720 | B1 | 3/2005 | Freeman et al. |
| 6,868,137 | B2 * | 3/2005 | Inoue ...................... 378/98.4 |
| 7,173,551 | B2 | 2/2007 | Vrazel et al. |
| 2009/0036772 | A1 | 2/2009 | Lu |

OTHER PUBLICATIONS

Ramadan, M., Analog Signals Transmission Over Optical Fiber Systems, 1985, IEEE MTT-S Digest, pp. 303-306.

Lu, Jian-Yu, Transmit-Receive Dynamic Focusing with Limited Diffraction Beams, 1997 IEEE Ultrasonics Symposium, pp. 1543-1546.

Lu, Jian-Yu, Experimental Study of High Frame Rate Imaging with Limited Diffraction Beams, IEEE Transactions on Ultrasonics, Ferroelectrics, and Frequency Control, vol. 45, No. 1, Jan. 1998, pp. 84-97.

Lu, Jian-Yu, Nonlinear Processing for High Frame Rate Imaging, American Institute of Ultrasound in Medicine, 1999 (43rd) Annual Convention, Mar. 14-17, San Antonio, TX USA (submitted Sep. 1, 1998), one page.

Lu, Jian-Yu et al., Increasing field of view of high frame rate ultrasonic imaging, Acoustical Society of America, 139th Meeting, May 30-Jun. 3, 2000, Atlanta, GA, USA (submitted Jan. 10, 2000), one page.

Lang, Roberto et al., Three-Dimensional Cardiac Ultrasound, Radiology Management, Nov./Dec. 2002, vol. 24, No. 6, pp. 1-5.

IEEE Transactions on Ultrasonics, Ferroelectrics, and Frequency Control, vol. 50, No. 9, Sep. 2003, http://www.ieee-uffc.org/tr/.

Lu, Jian-Yu et al., Development Of A Linear Power Amplifier For High Frame Rate Imagining System, 2004, IEEE International Ultrasonics, Ferroelectrics, and Frequency Control Joint 50th Anniversary Conference, pp. 1413-1416.

Wang, Jing et al., A Study of Motion Artifacts of Fourier-Based Image Construction, 2005, IEEE Ultrasonics Symposium, pp. 1439-1442.

Fox, Paul et al., Connection Between X Waves, Fourier-Based Series and Optimal Modeling Aperture For Circular Symmetric Arrays 2005, IEEE Ultrasonics Symposium, pp. 1644-1647.

Cheng, Jiqi et al., Fourier-Based Imaging Method With Steered Plane Waves and Limited-Diffraction Array Beams, 2005, IEEE Ultrasonics Symposium, pp. 1976-1979.

Lu, Jian-Yu et al., Field Computation For Two-Dimensional Array Transducers With Limited Diffraction Array Beams, 2005, Ultrasonic Imaging, 27: 237-255.

Cheng, Jiqi et al., Fourier based imaging method with steered plane waves and limited-diffraction array beams, 2005 IEEE International Ultrasonics Symposium, Conference centre De Doelen, Rotterdam, The Netherlands, Sep. 19-21, 2005, one page.

Wang, Zhaohui et al., Contrast and resolution study of Fourier-based method, 2005 IEEE International Ultrasonics Symposium, Conference centre De Doelen, Rotterdam, The Netherlands, Sep. 19-21, 2005, two pages.

International Search Report/Opinion (Mar. 23, 2007), PCT, International Application No. PCT/US06/33751 filed Aug. 29, 2006.

International Search Report/Opinion (Dec. 19, 2007), PCT, International Application No. PCT/US07/02162 filed Jan. 26, 2007.

* cited by examiner

| Para-meter | Depth (mm) | Imaging Method | | | | | |
|---|---|---|---|---|---|---|---|
| | | 1TX | 11TXs | 19TXs | 91TXs | D&S | D&S(D) |
| Resolution (mm) | 30 | 1.29 | 0.93 | 0.99 | 0.99 | 1.02 | 1.29 |
| | 50 | 2.04 | 1.29 | 1.62 | 1.5 | 1.68 | 1.77 |
| | 70 | 2.79 | 1.68 | 1.95 | 2.07 | 2.37 | 2.37 |
| | 90 | 3.81 | 4.05 | 3.09 | 2.67 | 2.97 | 2.97 |
| Sidelobe (dB) | 30 | -30.31 | -38.4 | -41.83 | -54.7 | -38.29 | -52.13 |
| | 50 | -25.98 | -33.66 | -37 | -46.97 | -40.18 | -43.44 |
| | 70 | -23.22 | -27.26 | -30.32 | -40.7 | -36.37 | -36.37 |
| | 90 | -19.88 | -20.03 | -24.68 | -34.98 | -29.96 | -31.18 |

Fig. 16

| Nominal Contract (dB) | Measured Contrast for Different Imaging Method | | | |
|---|---|---|---|---|
| | 11TXs | 19TXs | 91TXs | D&S |
| -15 | -12.31 | -14.17 | -16.52 | -13.70 |
| -6 | -7.87 | -8.55 | -9.07 | -7.34 |
| -3 | -4.71 | -4.54 | -4.64 | -3.00 |
| +3 | 2.34 | 2.34 | 2.41 | 4.55 |
| +6 | 6.05 | 6.20 | 6.48 | 7.55 |
| +15 | 14.68 | 14.80 | 15.09 | 17.04 |

US 7,957,609 B2

SYSTEM FOR EXTENDED HIGH FRAME RATE IMAGING WITH LIMITED-DIFFRACTION BEAMS

This application claims the benefit of U.S. Provisional Application No. 60/712,080, filed Aug. 29, 2005, and International Application No. PCT/US2006/033751, filed Aug. 29, 2006. The disclosures of both applications are fully and expressly incorporated herein by reference.

RELATED APPLICATION

This invention was made partly with government support under Contract No. HL60301 awarded by the National Institute of Health. The government has certain rights in this invention.

FIELD OF THE INVENTION

The present invention provides a method and a system for producing multi-dimensional images, including for example, two-dimensional: a single picture; three-dimensional: volumetric image; and four-dimensional: three-dimensional image sequence displayed over time.

BACKGROUND OF THE INVENTION

High frame rate imaging theorem uses a pulsed plane wave in transmission and limited-diffraction array beam weightings are applied to received echo signals to produce a spatial Fourier transform of object function for 3D image reconstruction.

Because one transmission is used to construct an image, high image frame rate is achieved. In addition, because Fourier transform is implemented with a fast Fourier transform (FFT) which is a computationally efficient, simpler imaging system could be constructed to implement the method.

High frame rate imaging is important for imaging of fast moving objects such as the heart, especially, in three-dimensional (3D) imaging where many two-dimensional (2D) image frames are needed to form a 3D volume that may reduce image frame rate dramatically with conventional imaging methods.

Steered plane waves in transmissions have been used to increase image field of view, and reduce speckle noises. Also, limited-diffraction array beams in transmission have been used to increase field of view and spatial Fourier domain coverage to increase image resolution. Images constructed with different steering angles are combined with a coherent (enhancing resolution) or incoherent superposition (reducing speckles).

To increase field of view, a method using a spherical wave transmission followed by Fourier transformation for image reconstruction has also been proposed. Although this method may maintain a high frame rate at a large field of view due to the divergence nature of spherical waves, it may lower signal-to-noise ratio (SNR) and reduce computation efficiency as compared with the high frame rate imaging method.

The theory of high frame rate imaging and its extension have connections to many previous studies where Fourier transform was also used for ultrasonic imaging in the past two decades. However, the previous studies are not aimed at increasing the frame rate of conventional B-mode images. For example, a Fourier-domain reconstruction method for synthetic focusing was developed that solved the inverse scattering problem. A point source was used to transmit a broadband spherical wave over any given geometrical surfaces. 2D or 3D images are reconstructed using Fourier transformation. Apparently, the imaging process is slow. Another method used a Fourier based method using a fixed focus transmission and reception (cofocal) approach. This method requires multiple transmissions to cover the Fourier space of object function and thus is slow.

Another method used a plane wave steered at different angles to form a line of data in the Fourier space. Unfortunately, this method also requires a large number of transmissions to construct a frame of image.

Still another method used a narrow-band imaging method based on ultrasound holography and synthetic aperture concept, while another method also applied synthetic aperture focusing with Fourier transform to get C-mode images (the image plane is in parallel with the surface of a planar transducer).

One drawback of synthetic aperture methods is that they suffer from low, transmission efficiency since only part of the aperture of a transducer is used. Because a large amount of transmissions is required to construct an image, the image frame rate is low in addition to poor quality due to a low SNR. Nonetheless, Fourier-based synthetic aperture imaging is used with catheter-based ultrasound probes where a complex method is difficult to implement due to the confined space of these probes. Still another method used a Fourier-based 3D imaging method with mechanically scanning of a highly focused single-element transducer. Although the method mal get a high-resolution image beyond the focal distance and may, have applications in ophthalmology, and dermatology, it is not suitable for high frame rate imaging because mechanical scanning is usually very slow. Yet another method used suggested an imaging method that could be used to improve image resolution and contrast by transmitting multiple plane waves to coherently synthesize the so-called "sinc waves". However, their method uses a time-domain approach and the complexity of an imaging system would be formidably high if it were applied to a 3D imaging at a rate of a few thousands volumes/s.

Therefore, there is a compelling and crucial need in the art for high-quality fast 3D ultrasound imaging that is made and operated at low, cost.

SUMMARY OF THE INVENTION

In one aspect, a method for producing a high frame rate, high resolution and high contrast image includes transmitting a group of signals of energy weighted by single spatial frequency but may be of different phases or linear time delays toward an object to be imaged. The receive signals from the object are weighted with multiple spatial frequencies, or by performing a spatial Fourier transform. A two- or three-dimensional image data set is reconstructed from the group of the transmitted signals weighted by the single spatial frequency or lineal time delay. The receive signals are weighted with the multiple spatial frequencies or processed by the spatial Fourier transform. The high frame rate, high resolution and high contrast image is reconstructed from the image data set of step c.

In another aspect, a method for producing a high frame rate, high resolution and high contrast velocity vector image of an object where at least a part of the object is moving includes transmitting two or more groups of signals of energy weighted bye single spatial frequency, but may be of different phases or linear time delay toward the object. The receive signals from the object are weighted with multiple spatial frequencies or by performing a spatial Fourier transform. Two- or three-dimensional image data sets are reconstructed from the groups of the transmitted signals weighted by the single spatial frequency or linear time delay. The receive signals are weighted with the multiple spatial frequencies or processed by the spatial Fourier transform. The image data sets are used to reconstruct: i) a first set of flow velocity component images in a first direction, and ii) a second set of flow velocity component images in a second direction that is different from the first direction. The velocity vector image is reconstructed from the two sets of velocity component images.

The foregoing has outlined in broad terms the more important features of the invention disclosed herein so that the detailed description that follows ma), be more clearly understood, and so that the contribution of the instant inventors to the art may be better appreciated. The instant invention is not to be limited in its appreciation to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

Various objects and advantages of this invention will become apparent to those skilled in the art from the following detailed description of the preferred embodiment, when read in light of the accompanying drawings.

Figure 15:
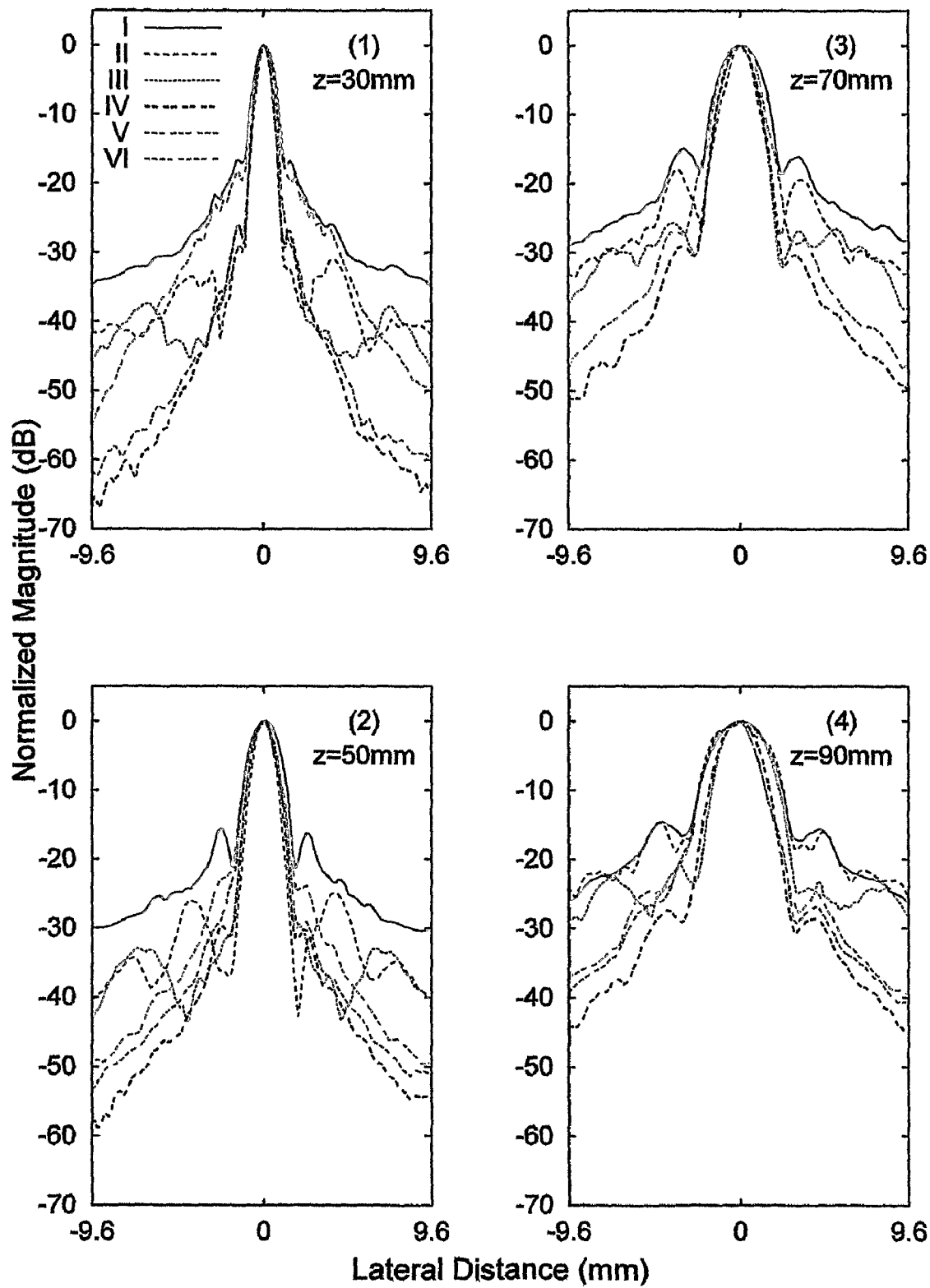
FIG. 15 shows the results of In vitro experiment with a stationary point scatterer located at depths of (1) 30, (2) 50, (3) 70, and (4) 90 mm, respectively, in water with a 2.5 MHz. 19.2 mm aperture, and 128 element broadband phased array transducer for different imaging methods. The line plots show the maximum envelope of the point spread functions (PSFs) of reconstructed images along the axial axis versus the transverse axis (in parallel with transducer surface) of the transducer. I—Fourier method with 1 TX or 1 transmission (5346 frames/s); II—11 TXs or 11 transmissions (486 frame/s); III—19 TXs or 19 transmissions (281 frame/s); IV—91 TXs or 91 transmissions (59 frames/s); V—D&S or delay-and-sum method with a fixed transmission focus at 70 mm and with dynamic reception focusing (59 frames/s); VI—D&S (D) or delay-and-sum method with both dynamic transmission and reception focusing (the frame, rate mall be much lower than 59 frames/s).

FIG. 16 is a table showing −6 dB resolution and average sidelobe (calculated with the average of the left and right ⅜ of each plot that is log compressed) of the point spread functions (PSFs) obtained according to the line plots in FIG. 15.

Figure 17:
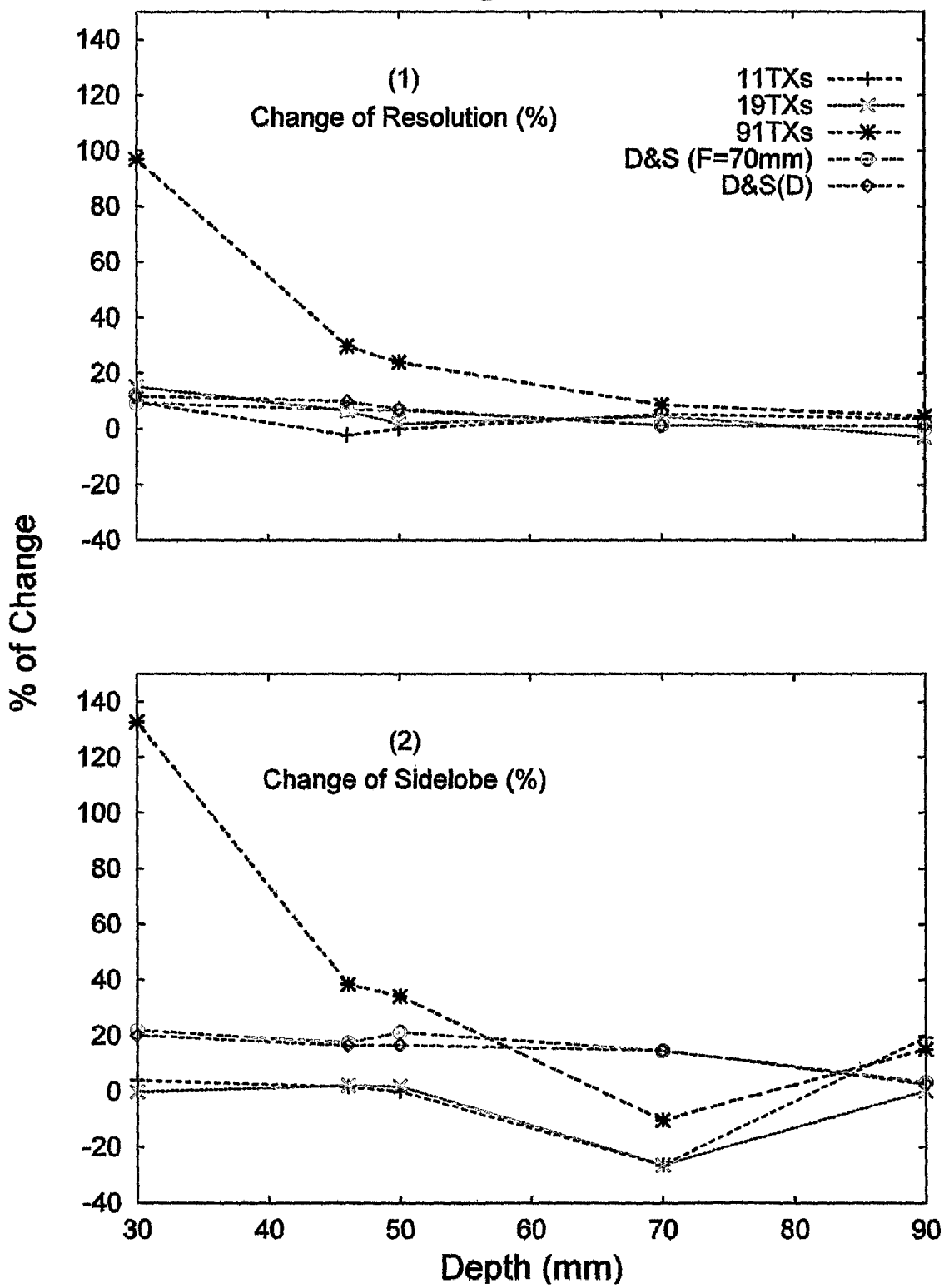

FIG. 17 are graphs showing the percent change of (1) resolution and (2) sidelobe of a point scatterer due to its linear motion at a speed of 214 mm/s. The motion is perpendicular to the axial axis of the transducer and is in the imaging plane. The meaning of 11 TXs, 19 TXs, 91 TXs, D&S, and D&S (D) is the same as that of FIG. 15. The percent change is zero for 1 TX and thus not shown.

Figures 18, 19:
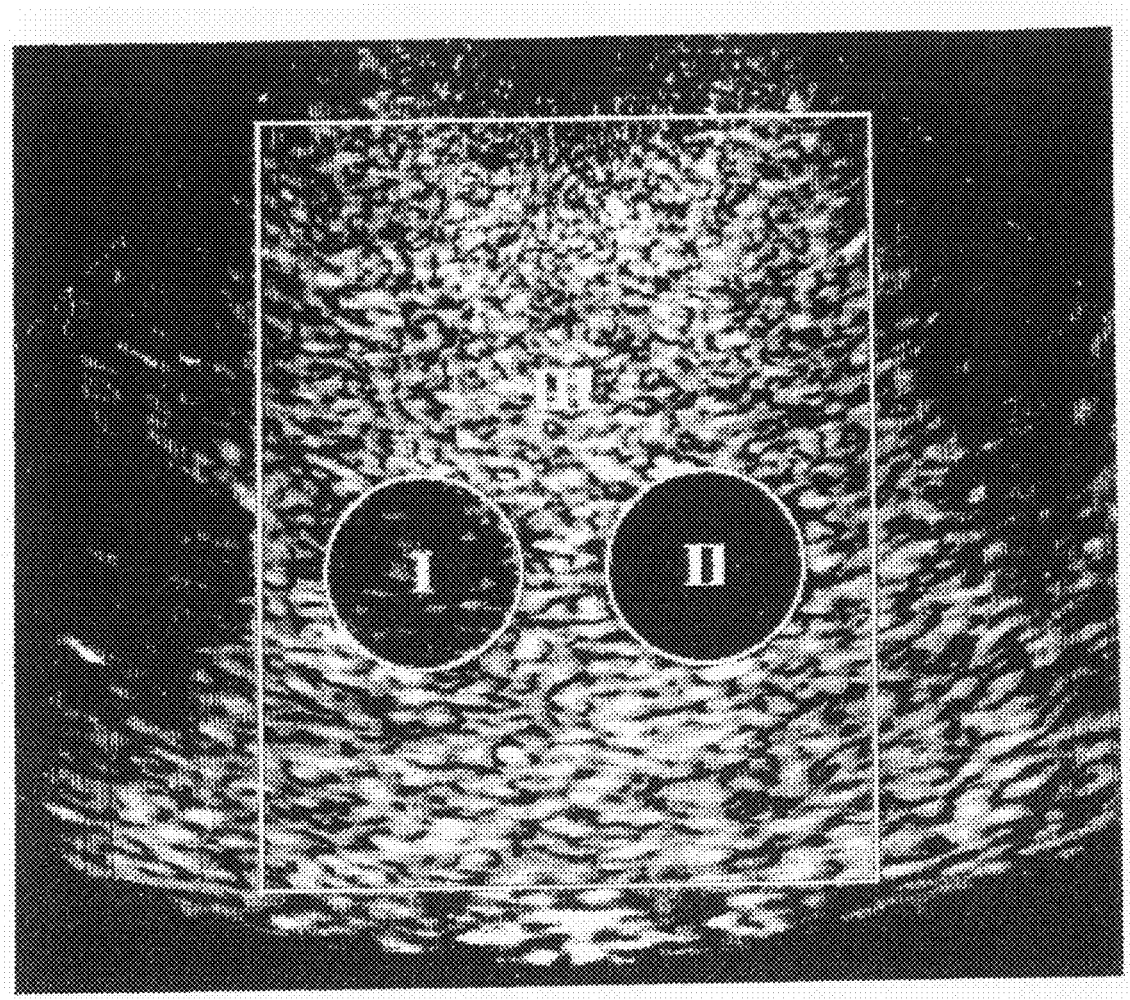

FIG. 18 is an image where areas used for the calculation of contrasts of cylindrical objects of an ATS539 tissue-mimicking phantom. The image shown is an example that is obtained with the Fourier method of 91 TXs and is log-compressed at 40 dB. In the example, there are two cylindrical objects. A total of 3 such images are used to calculate contrasts of 6 cylindrical objects for each imaging method. Region I is the area that is used to calculate the contrast of one cylinder (the cylinder diameter is 15 mm and the region diameter is 14.1 mm). Region II is the area that has the same size as region I and is used to calculate the contrast of the other cylinder. Region III is a rectangular area excluding both Regions I and II and is used as the background reference for the contrast calculation.

FIG. 19 is a table showing contrasts of a stationary ATS539 tissue-mimicking phantom obtained with the In vitro experiments. 11 TXs, 19 TXs, 91 TXs, and D&S have the same meaning as those in FIG. 15, except that the focal distance of the D&S method is 46 mm instead of 70 mm. The nominal contrast means the contrast values provided by the manufacturer of the phantom.

Figure 20:
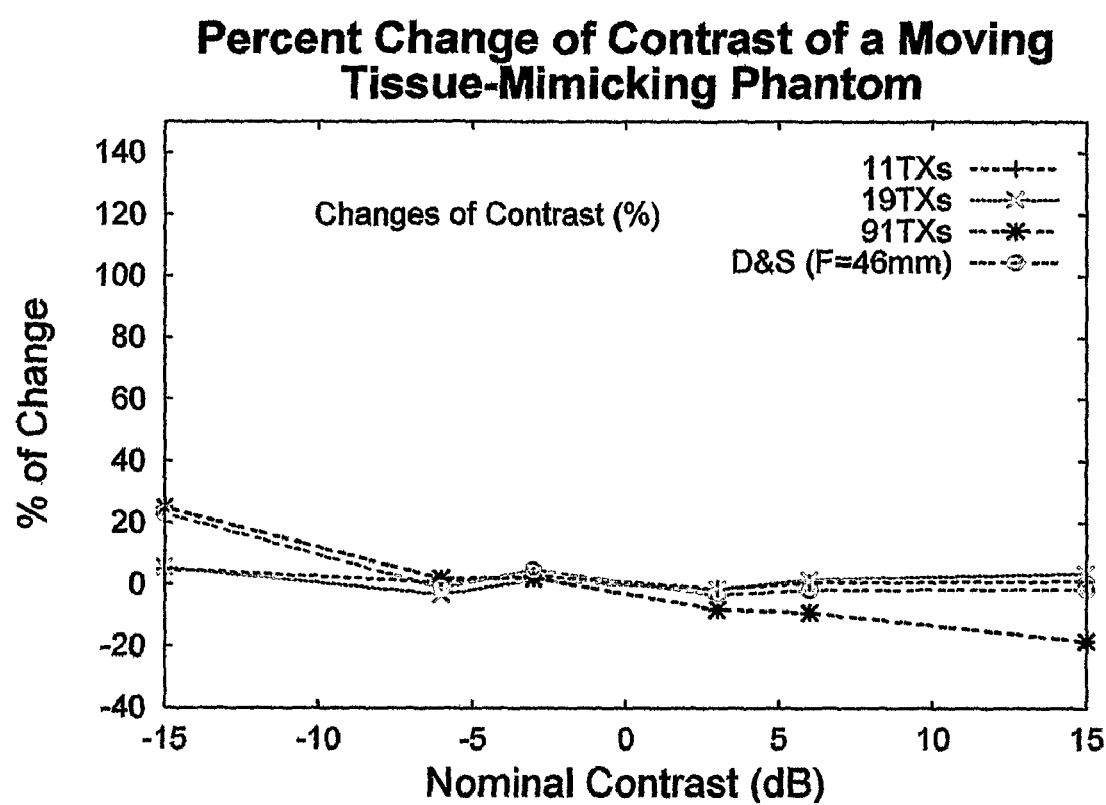

FIG. 20 is a graphs showing percent change of image contrast of an ATS539 tissue-mimicking phantom due to its linear motion at a speed of 214 mm/s. The motion is perpendicular to the axial axis of the transducer and is in the imaging plane. 11 TXs, 19 TXs, 91 TXs, and D&S have the same meaning as that in FIG. 15, except that the focal distance of the D&S method is 46 mm instead of 70 mm.

Figure 21:
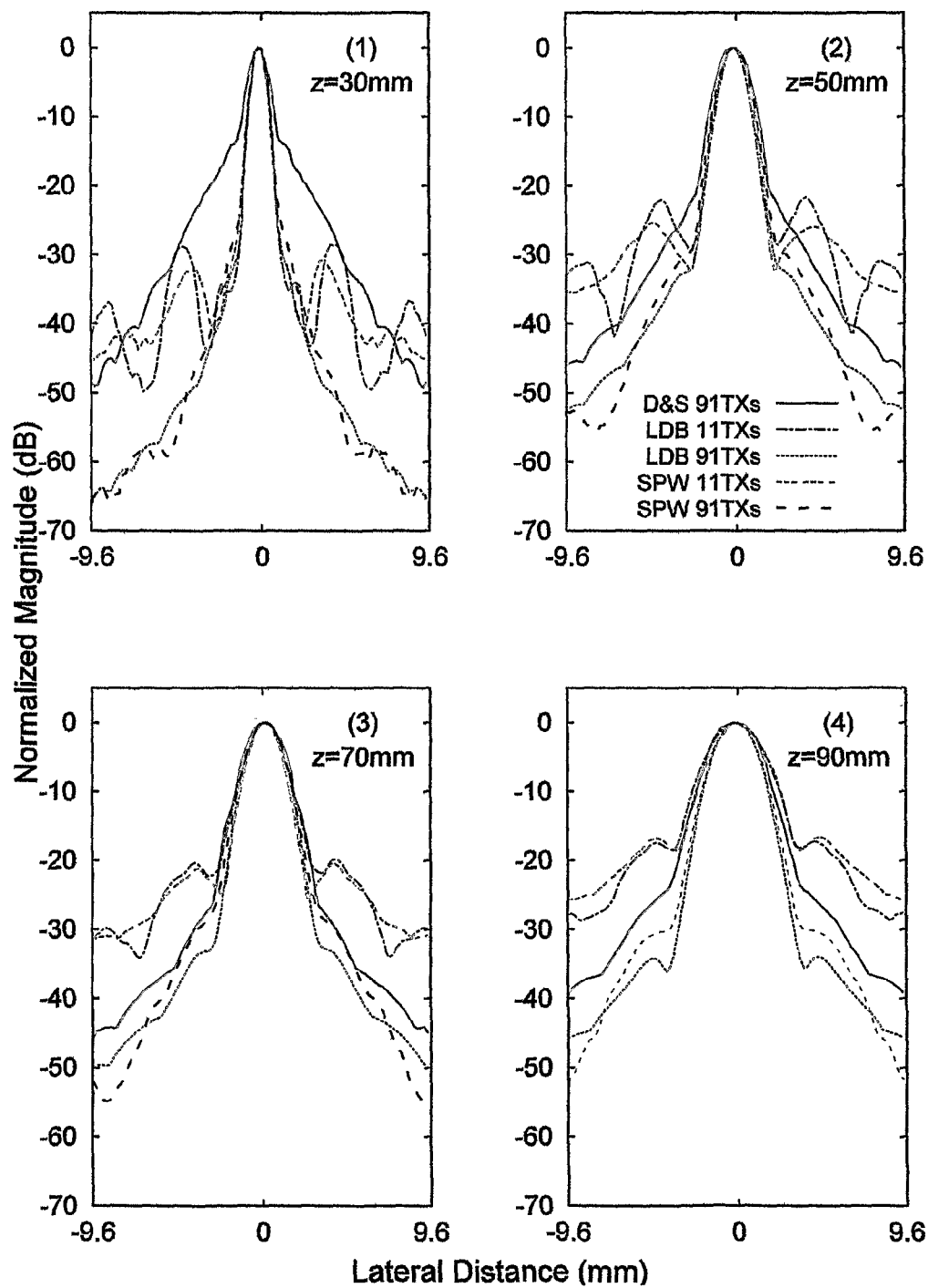

FIG. 21 (panels 1-4) are graphs showing sidelobe plots comparing the resolution and sidelobe of a stationary point scatterer. In FIG. 21, sidelobe plots (maxima of envelope-detected images along the axial direction versus the lateral distance that is in parallel with the transducer surface) of computer simulated images of a stationary point scatterer (point spread function or PSF) located at depths of (1) 30. (2) 50. (3) 70, and (4) 90 mm, respectively., in water. A 2.5 MHz center frequency 1D array, transducer of 128-elements, 0.15 mm pitch, and 58%-6 dB pulse-echo fractional bandwidth was assumed. D&S 9117 s (red and solid lines): delay-and-sun (D&S) method with 91 transmissions focused at 70 mm and a dynamically focused reception; LDB 11 TXs (cyan and dash-dotted lines) and LDB 91 TXs (pink and dotted lines): limited-diffraction array beam imaging with 11 and 91 transmissions, respectively; SPW 11 TXs (orange and dashed lines) and SPW 91 TXs (black and long-dashed lines): steered plane wave imaging with 11 and 91 transmissions, respectively.

Figure 22:
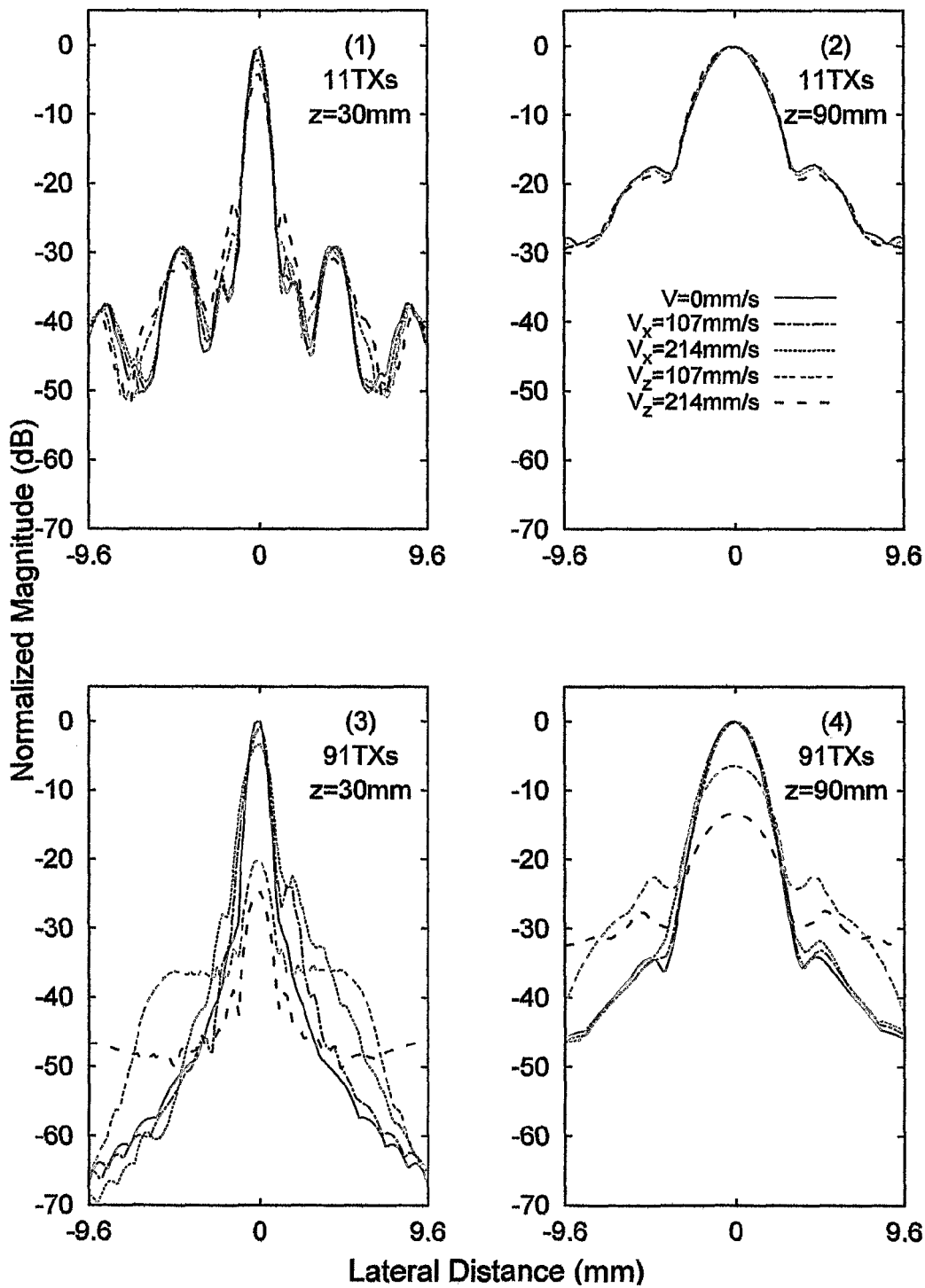

FIG. 22 (panels 1-4) are graphs showing sidelobe plots comparing the resolution and sidelobe of a moving point scatterer where limited-diffraction array beams were used in transmissions. In FIG. 22, sidelobe plots (maxima of envelope-detected images along the axial direction versus the lateral distance that is in parallel with the transducer surface) of computer simulated images of a moving point scatterer (point spread function or PSF) located at depths of 30 (Panels (1) and (3)) and 90 mm (Panels (2) and (4)), respectively, in water. The images were reconstructed with the limited-diffraction array beam imaging method of 11 (Panels (1) and (2)) and 91 (Panels (3) and (4)) transmissions, respectively. The time between adjacent transmissions was 187 μs. The transducer used was the same as that in FIG. 21. V=0 mm (red and solid lines): the point scatterer was stationary; $V_x$=107 mm (cyan and dash-dotted lines) and $V_x$=214 mm (pink and dotted lines): the point scatterer moved at 107 and 214 mm/s along the lateral direction; respectively; $V_z$=107 mm (orange and dashed lines) and $V_z$=214 mm (black and long-dashed lines): the point scatterer moved at 107 and 214 mm/s along the axial direction, respectively. The peaks of the plots are relative to the stationary cases in cases in FIG. 21.

Figure 23:
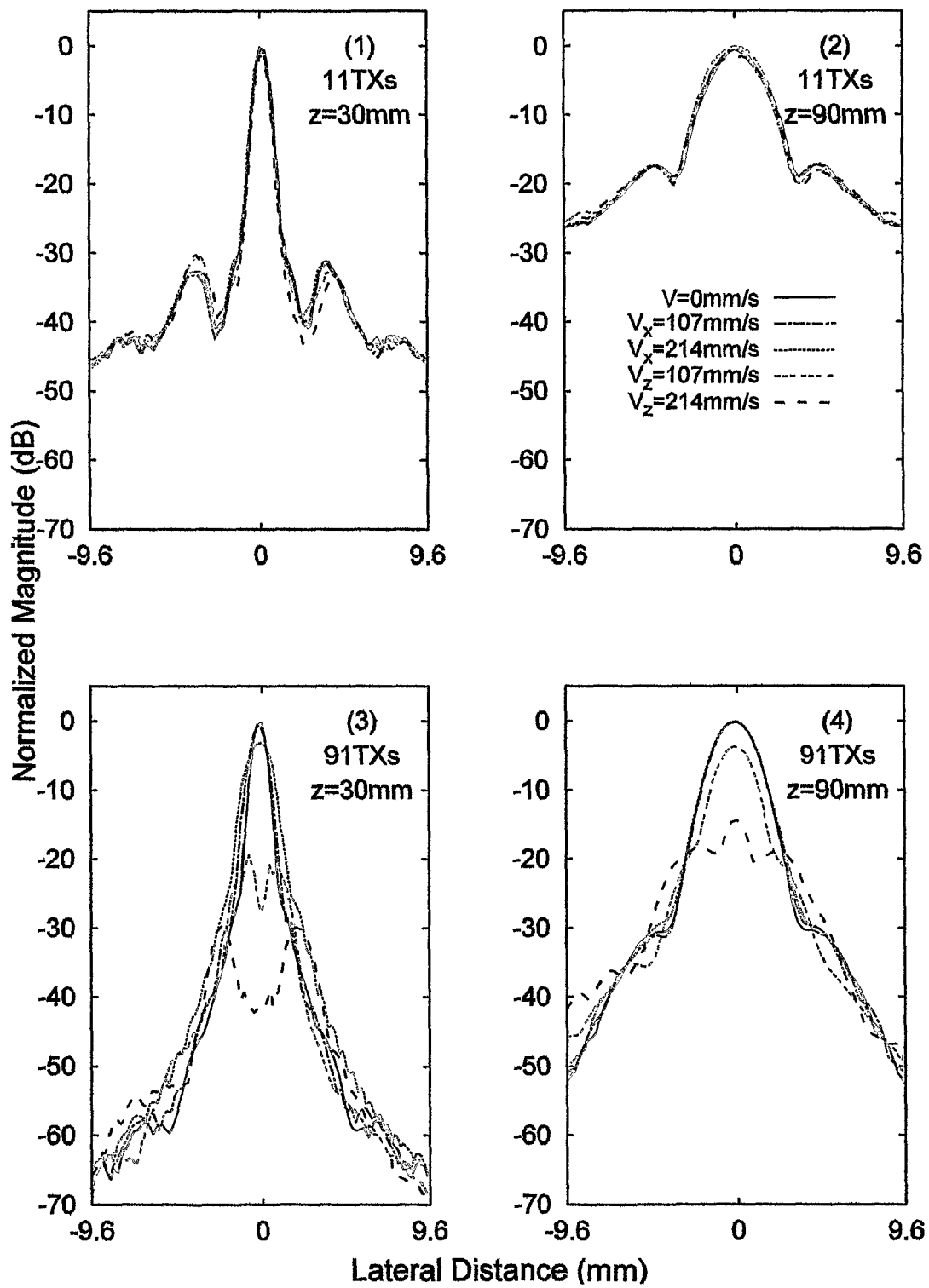

FIG. 23 (panels 1-4) are graphs, similar to FIG. 22, but showing sidelobe plots comparing the resolution and sidelobe of a moving point scatterer where steered plane wave were used in the transmissions.

Figure 24:
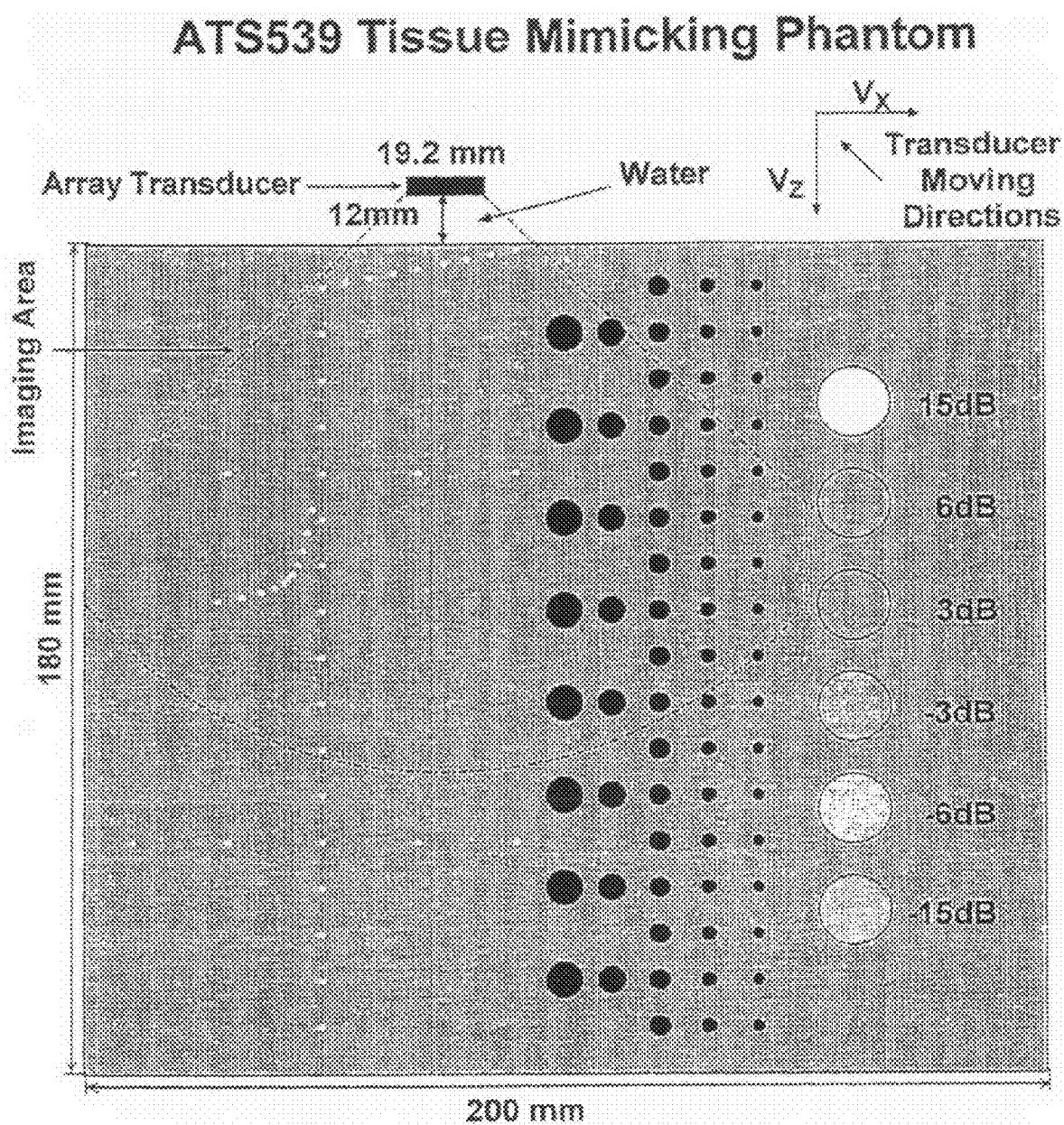

FIG. 24 is an illustration of a structure and imaging area of an ATA539 multipurpose tissue-mimicking phantom.

Figure 25:
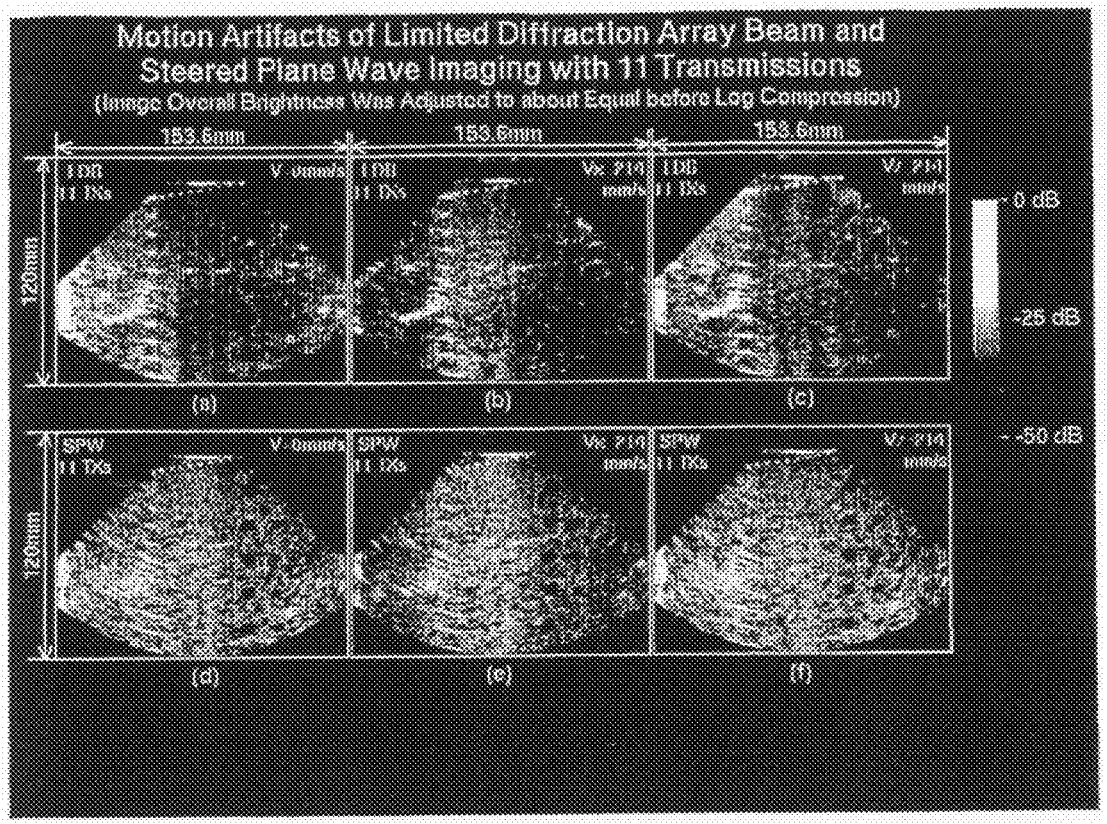

FIG. 25 shows the results of images reconstructed with both limited-diffraction array beam and steered plane wave imaging methods with 11 transmissions (TXs) for in vitro experiments of an ATS539 tissue-mimicking phantom (see FIG. 24 for the imaging area) immersed in water. The experiments were performed with an Acuson V2 phased array transducer (128 elements, 2.5 MHz, and 0.15 mm pitch) placed near the top of the phantom. The transducer moved at different velocities during data acquisitions while the phantom was kept stationary. The time between adjacent transmissions was 187 μs. The images are log-compressed with a dynamic range of 50 dB. The speed of sound of the phantom is 1450 m/s and the depth of images is 120 mm. Results of the limited-diffraction array beam (LDB) imaging method are shown in (a), (b) and (c) with motion velocities of V=0, $V_x$=214 mm/s (in the lateral direction), and $V_z$=214 mm/s (in the vertical direction), respectively. Results of steered plane wave (SPW) imaging method are shown in (d), (e), and (f), corresponding to (a), (b), and (c), respectively.

Figure 26:
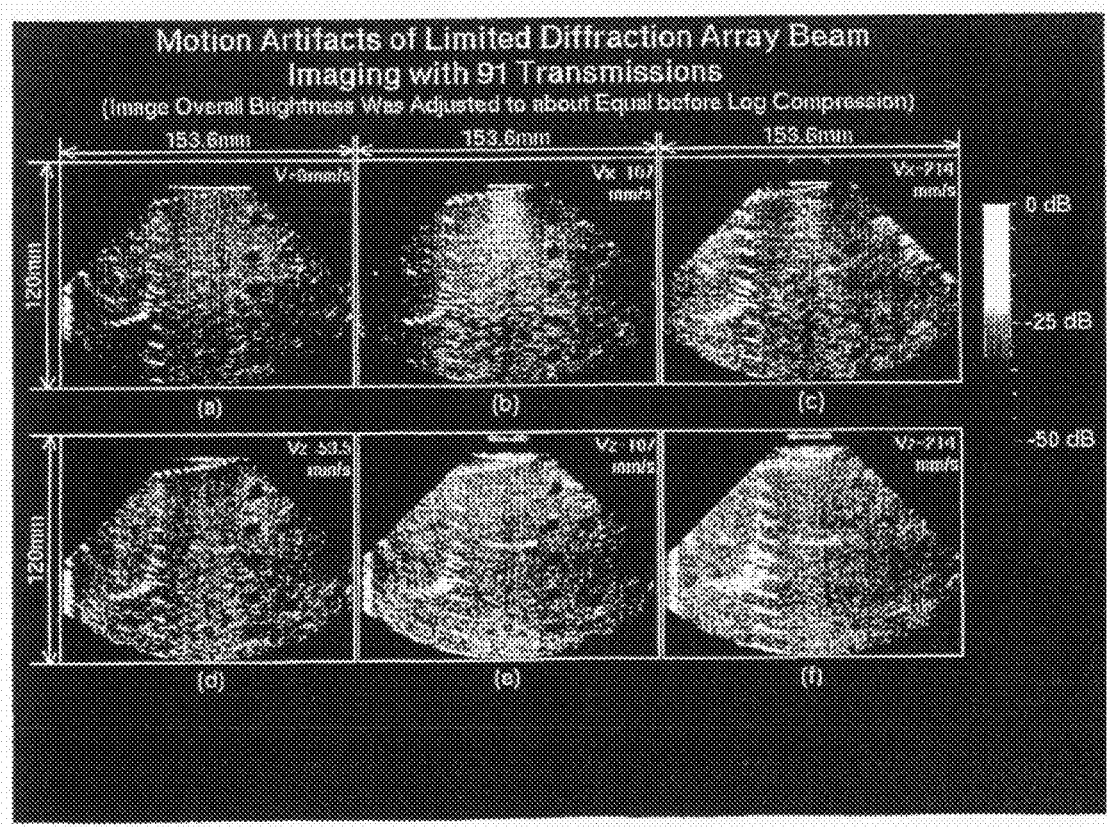

FIG. 26 shows the results where limited-diffraction array beams were used in the transmissions. Images reconstructed with the limited-diffraction array beam (LDB) imaging method with 91 transmissions (TXs) for in vitro experiments of an ATS539 tissue-mimicking phantom (see FIG. 24 for the imaging area) immersed in water. The experiment conditions were the same as those for FIG. 25. Results of different motion velocities (V=0 (stationary), $V_x$=107 mm/s (in the lateral direction), $V_x$=214 mm/s, $V_z$=53.5 mm/s (in the vertical direction) $V_x$=107 mmns, and $V_x$=214 mm/s) are shown in (a)-(f), respectively.

Figure 27:
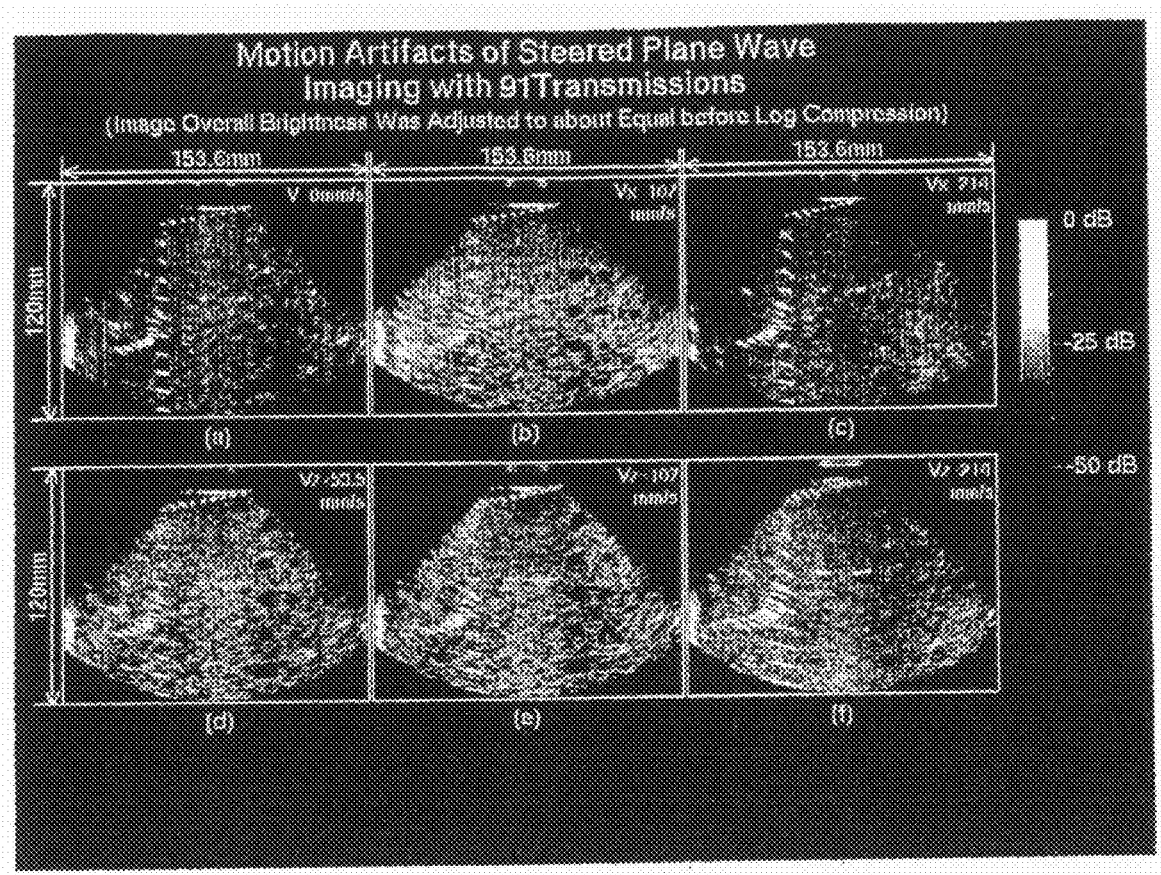

FIG. 27 shows the results, similar to FIG. 26, but where steered waves were used in the transmissions.

Figure 28:
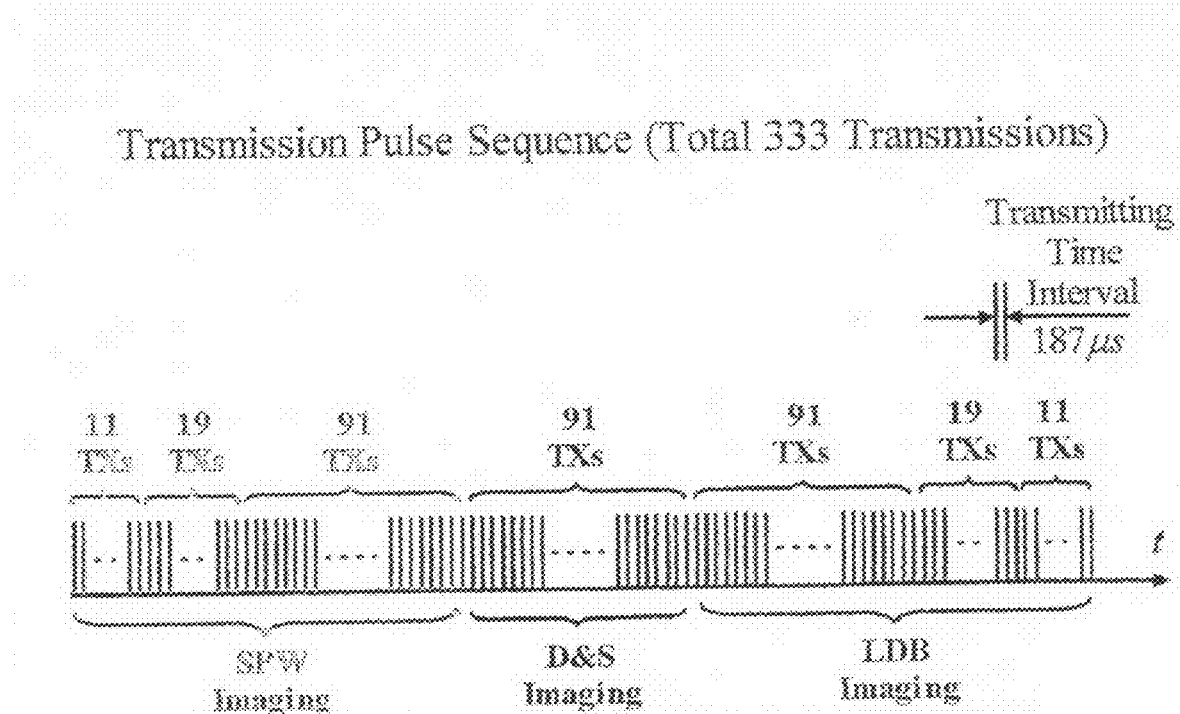

FIG. 28 is an illustration of a transmission pulse sequence used in an in vivo heart experiment. This sequence was repeated 18 times to cover about a complete heart cycle. SPW, D&S, and LDB mean steered plane wave, delay-and-sum, and limited-diffraction array beam imaging, respectively. 11

TXs. 19 TXs, and 91 TXs represent 11, 19, and 91 transmissions, respectively. The time between adjacent transmissions was 187 μs.

Figure 29:
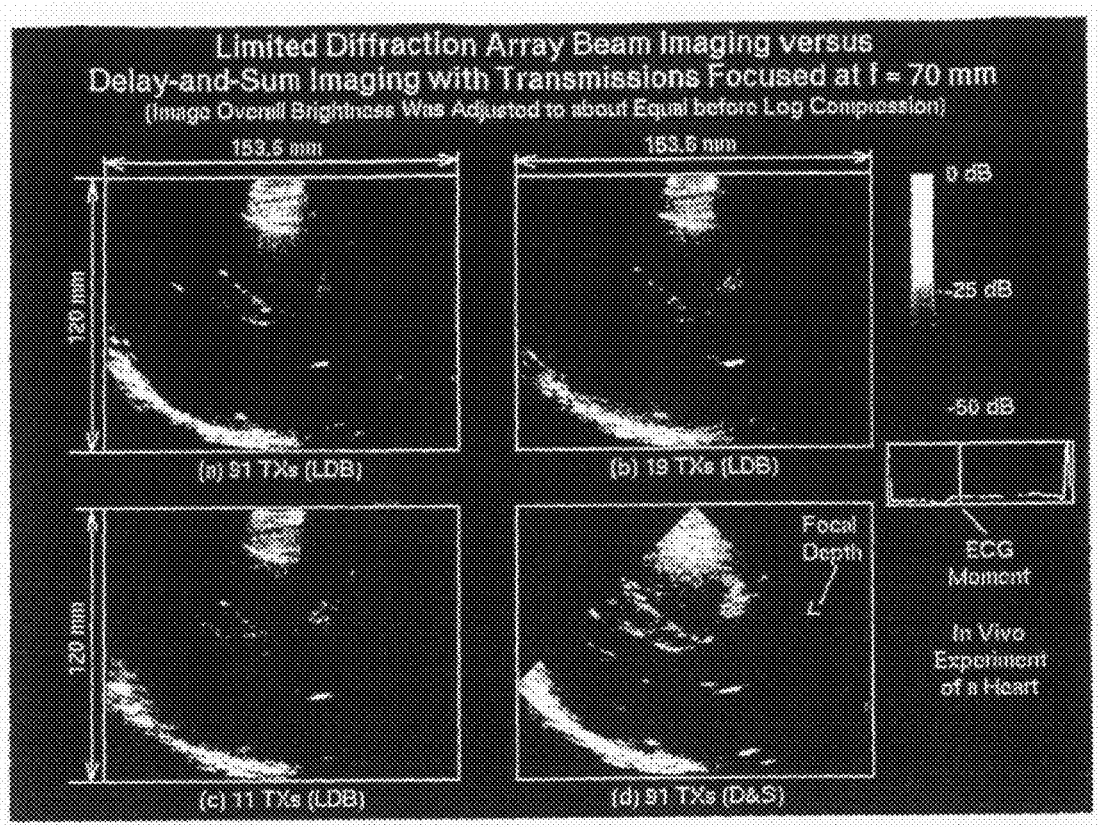

FIG. 29 shows the results of images reconstructed from in vivo experiments of the heart of a volunteer. The experiment was performed with an Acuson 72 phased arrays transducer (128 elements, 2.5 MHz, and 0.15 mm pitch) that was stationary and was in contact with the skin. The time between adjacent transmissions was 187 μs. The images are log-compressed with a dynamic range of 50 dB. The speed of sound was assumed 1540 m/s and the depth of images was 120 mm. Images in Panels (a); (b), and (c) were reconstructed with the limited-diffraction array beam (LDB) imaging method, with 91, 19, and 11 transmissions, respectively. As a comparison, an image reconstructed with the conventional D&S method with a fixed transmission focal distance of 70 mm and a dynamically focused reception was shown in Panel (d). The electrocardiogram (ECG) signal in the box below the scale bar indicates the moment when the images were acquired according to the sequence in FIG. 28.

Figure 30:
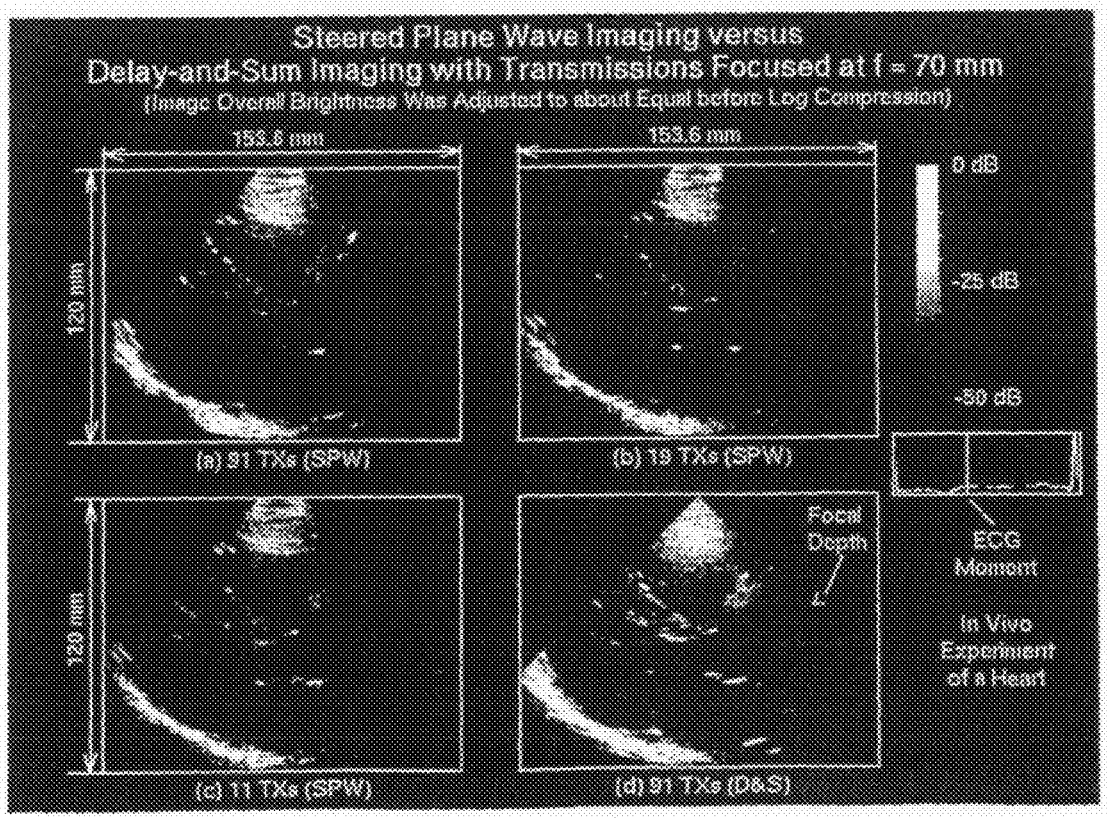

FIG. 30 shows the results, similar to FIG. 29, but where the images in panels (a), (b) and (c) are replaced with the results of the steered plane wave imaging (SPW)-method.

Figure 31:
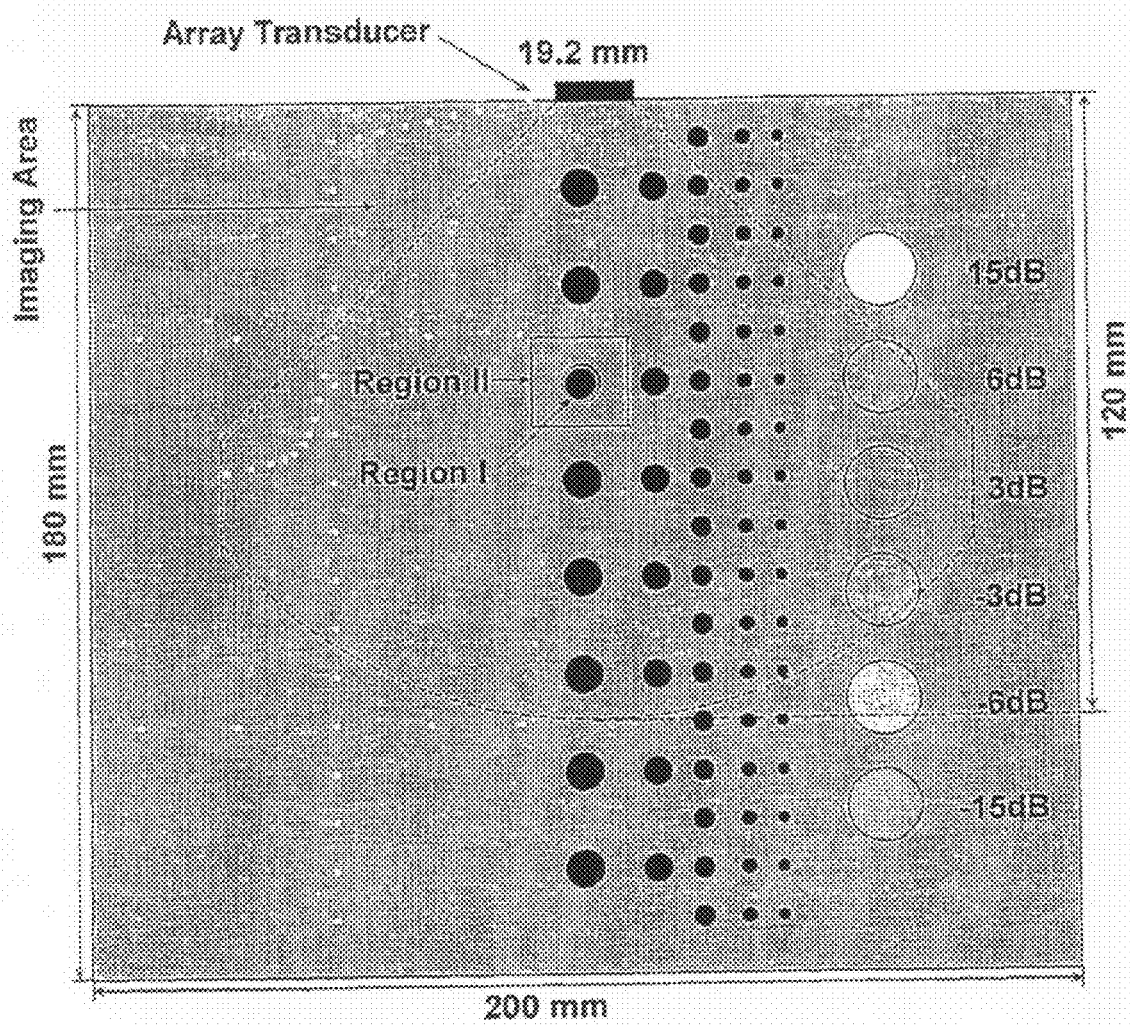

FIG. 31 shows the results of cross section and imaging areas of an ATS539 multipurpose tissue-mimicking phantom (ATS Laboratories. Inc.). The fan-shaped area (bounded by dashed lines) indicates the imaging area. Regions I (circular with 6.3 mm diameter and concentric with the cyst) and II (square with 19 mm on each side but excluding the circle) represent the cystic and background areas for the computation of contrasts of the cyst. The center of the cyst is at about 55.2 mm from the surface and has a diameter of 8 mm.

Figure 32:
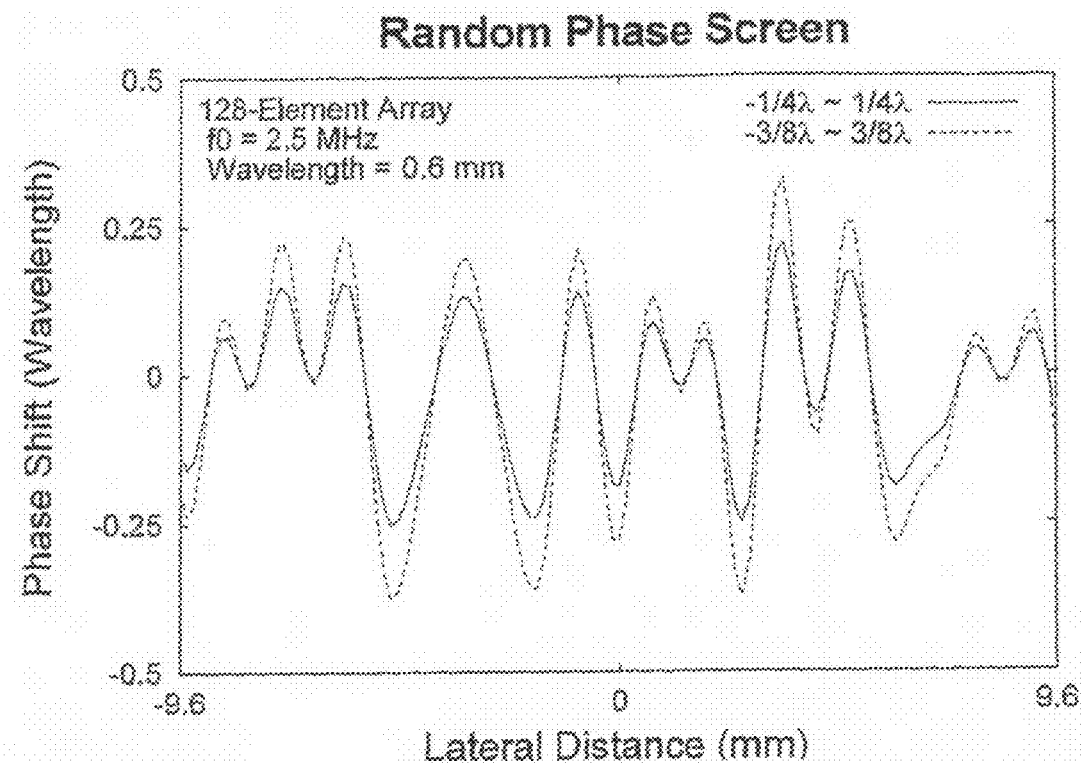

FIG. 32 shows two phase screens with random phase distributions. The phase screens were applied to both transmissions and receptions in the experiments. The first (red solid line) and the second (blue dotted line) phase screens have maximum phase shifts of $\lambda/2$ and $3\lambda/4$, respectively, where $\lambda=0.6$ mm is the wavelength. The transducer aperture is 19.2 mm that is also the width of the phase screens.

Figure 33:
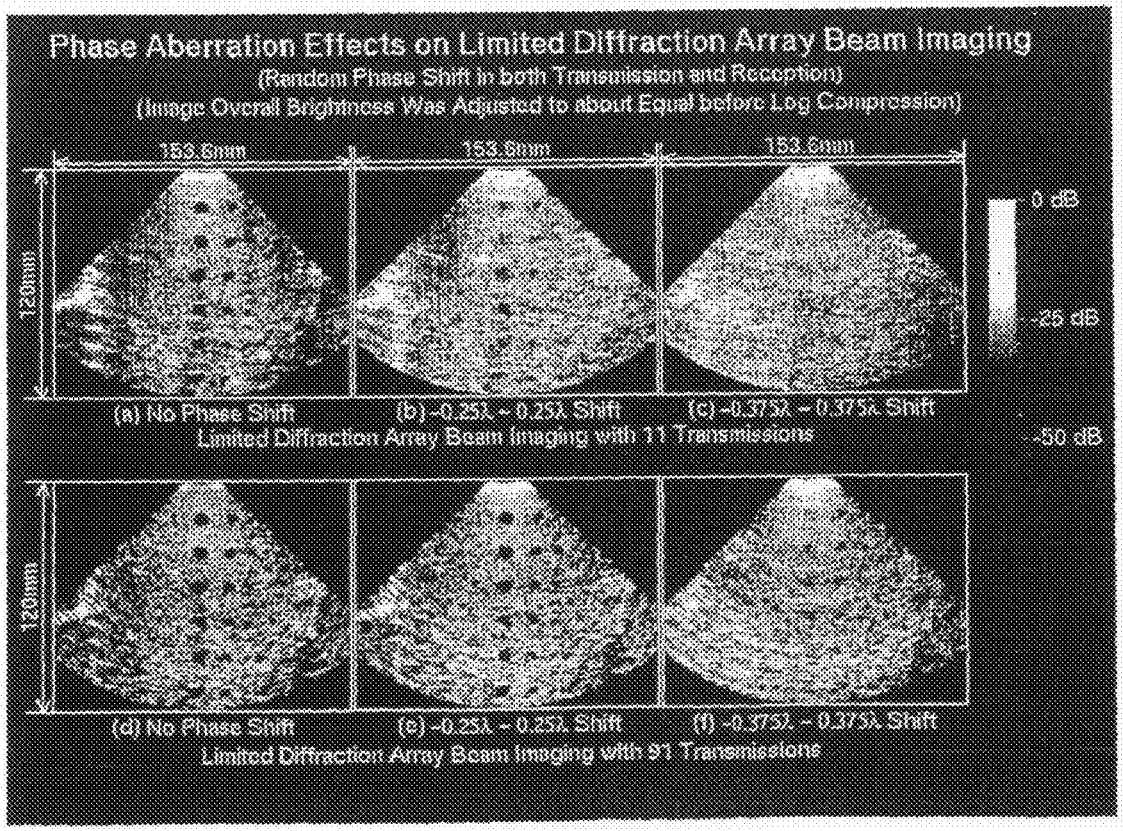

FIG. 33 shows the results of in vitro experiments on an ATS539 tissue-mimicking phantom (see the imaging area shown in FIG. 31) with limited-diffraction arrays beam transmissions. An Acuson V2 phased arrays (128 elements, 2.5 MH center frequency, 0.15 mm pitch, and 14 mm elevation aperture with a 68 mm elevation focal length) transducer and a homemade general-purpose high frame rate imaging system were used in the experiments. The phase screens in FIG. 32 were applied to the transducer elements in both transmissions and receptions. The speed of sound of the phantom is 1450 m/s and the depth of images is 120 mm. Images are log-compressed with a dynamic range of 50 dB. The time between adjacent transmissions is 187 μs. Panels (a), (b), and (c) represent images reconstructed with 11 transmissions (486 frames/s) after applying the random phase screens of 0, $-0.25\lambda$ to $0.25\lambda$, and $-0.375\lambda$ to $0.375\lambda$ maximum ranges of phase-shifts, respectively, where $\lambda=0.6$ mm is the center wavelength. Panels (d), (e), and (f) are the same as Panels (a), (b), and (c), respectively, except that they are reconstructed with 91 transmissions (59 frames/s).

Figure 34:
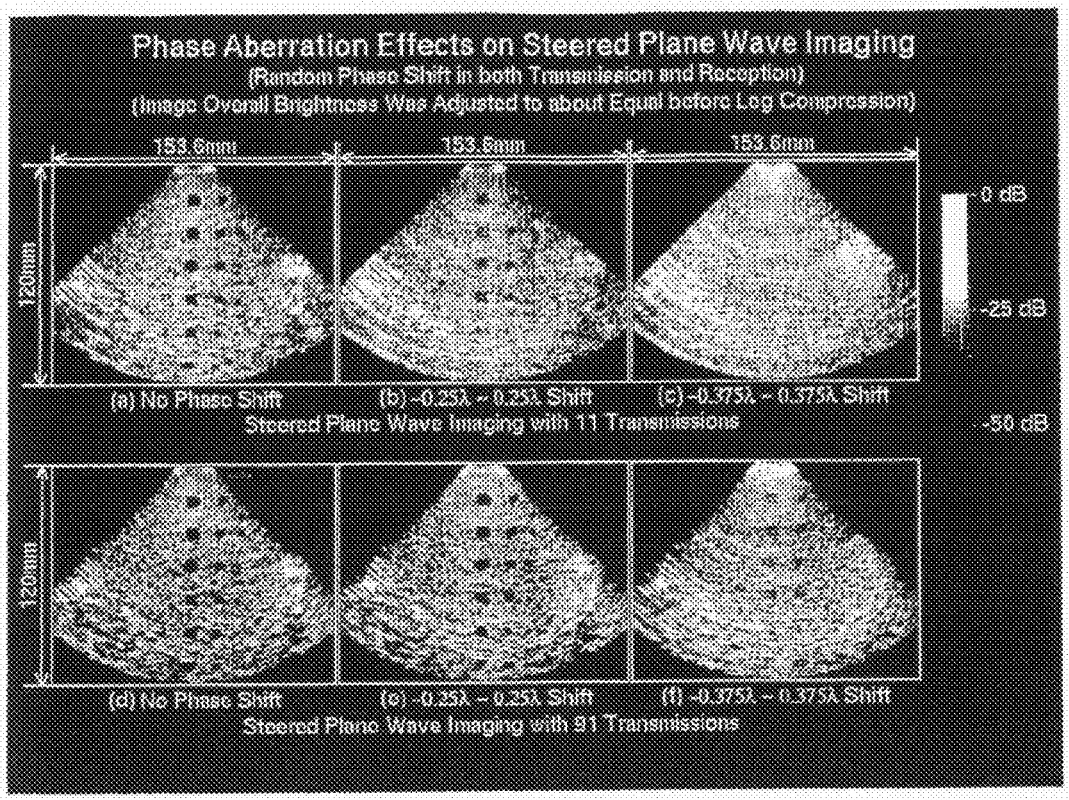

FIG. 34 is similar to FIG. 33, except that the steered plane waves, instead of the limited-diffraction array beams, are used in transmissions.

Figure 35:
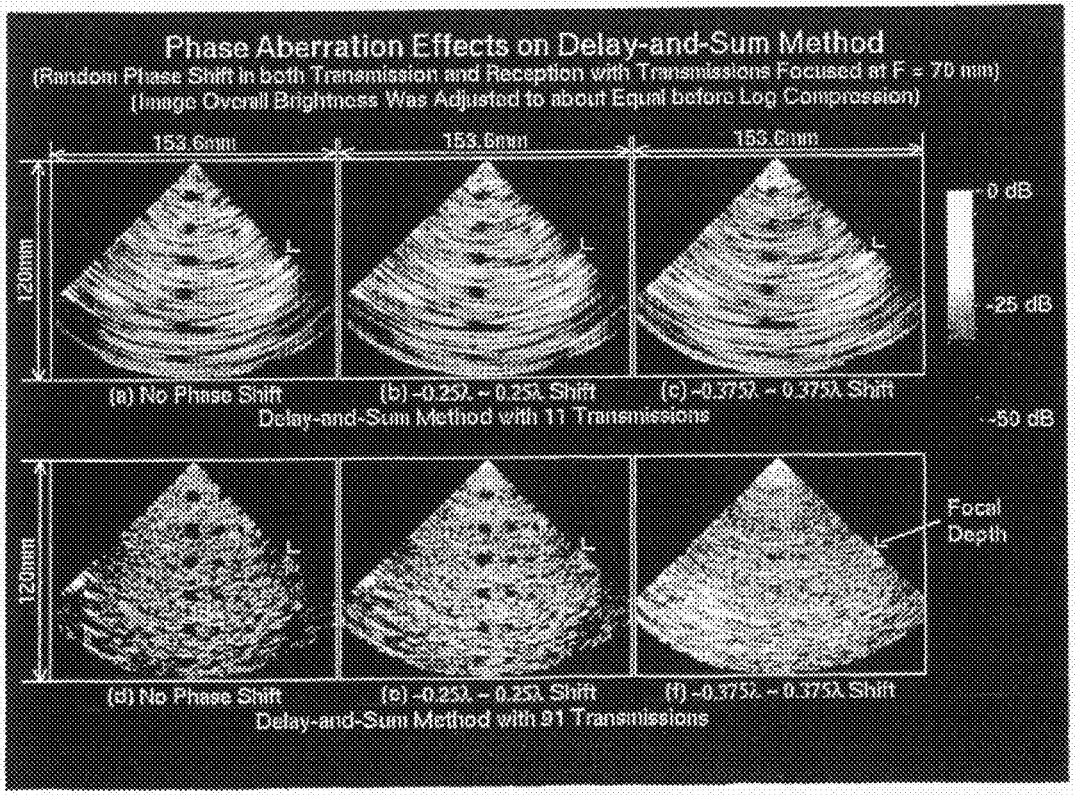

FIG. 35 is similar to FIG. 33, except that the delay-and-sum (D&S) method, instead of the limited-diffraction array beam imaging, is used for image reconstructions. The D&S method has a transmission focal length of 70 mm and a dynamically focused reception. The focus is marked with an "<" sign in each panel. The results of 11 transmissions (top row) are obtained from those of 91 transmissions (bottom row) by evenly extracting each transmission out of ever: 9 over a +/−45 degree field of view, and are produced with a bilinear interpolation.

Figure 36:
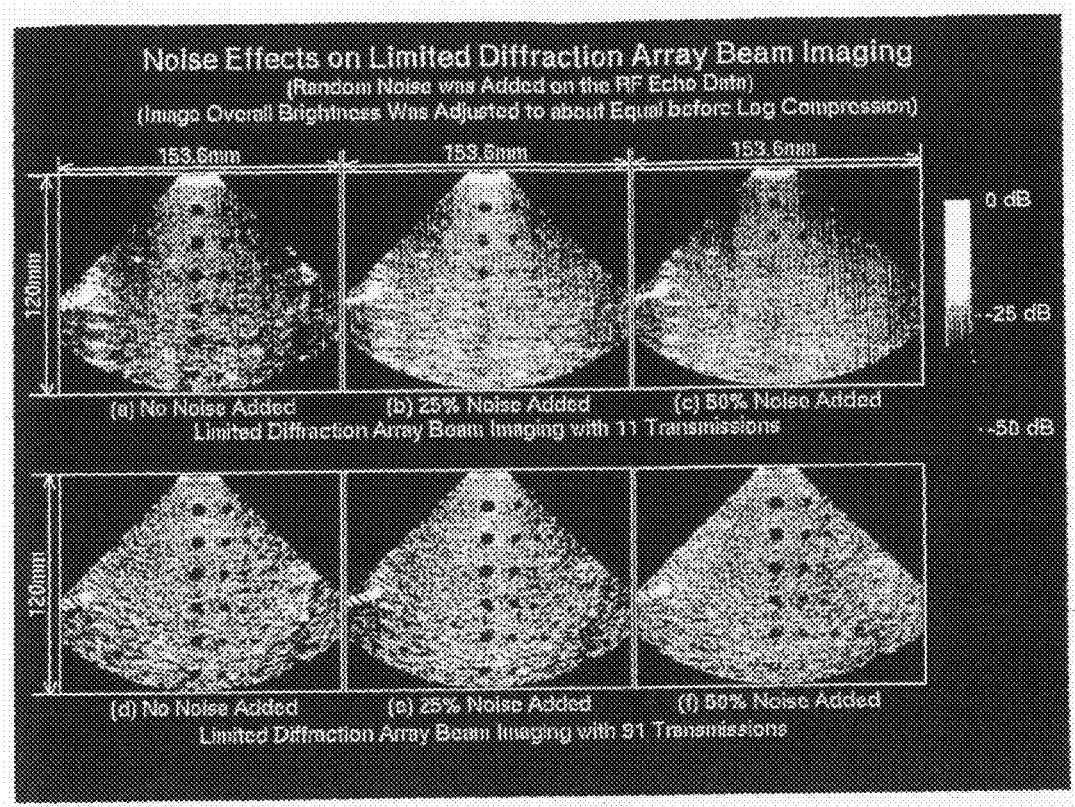

FIG. 36 shows the effects of random noise of an imagine system on the limited-diffraction array beam imaging. The experiment conditions and the figure layout are the same as those of FIG. 33, except that a band-pass filtered random noise with peak amplitudes of 0% (Panels (a) and (d)), 25% (Panels (b) and (e)), and 50% (Panels (c) and (f)) relative to the peaks of the amplitudes of the received signals are added.

Figure 37:
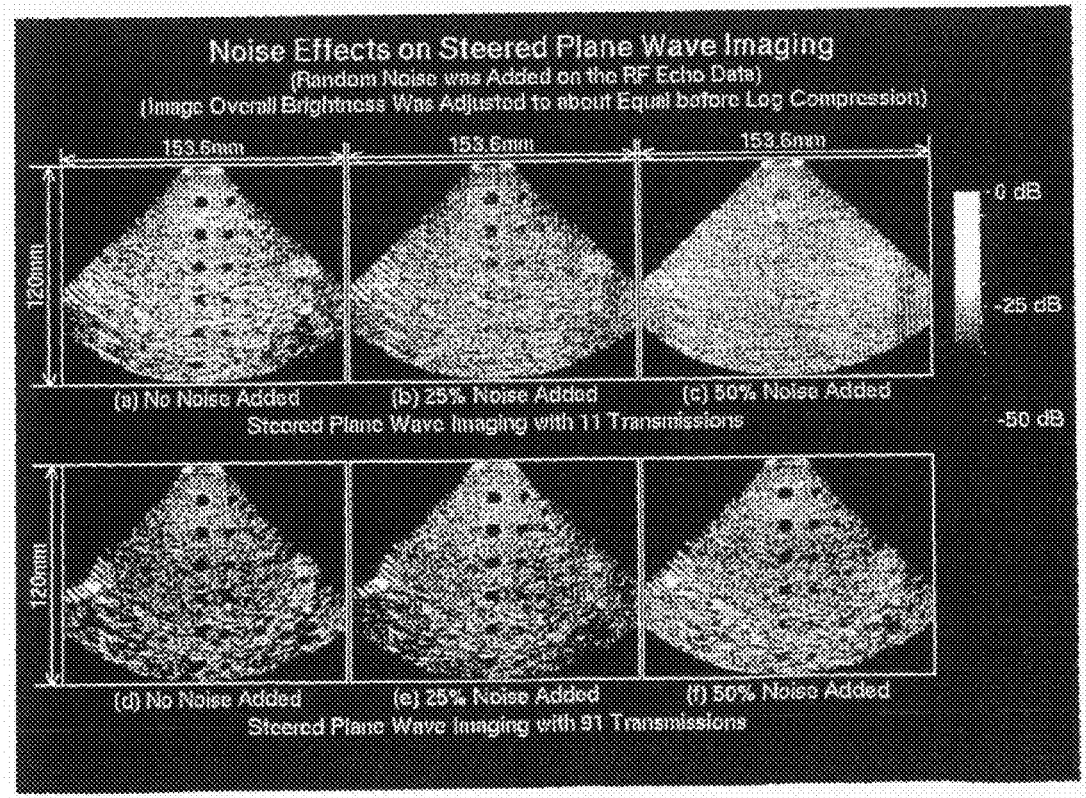

FIG. 37 is similar to FIG. 36, except that the steered plane waves, instead of the limited-diffraction array beams, are used in transmissions.

Figure 38:
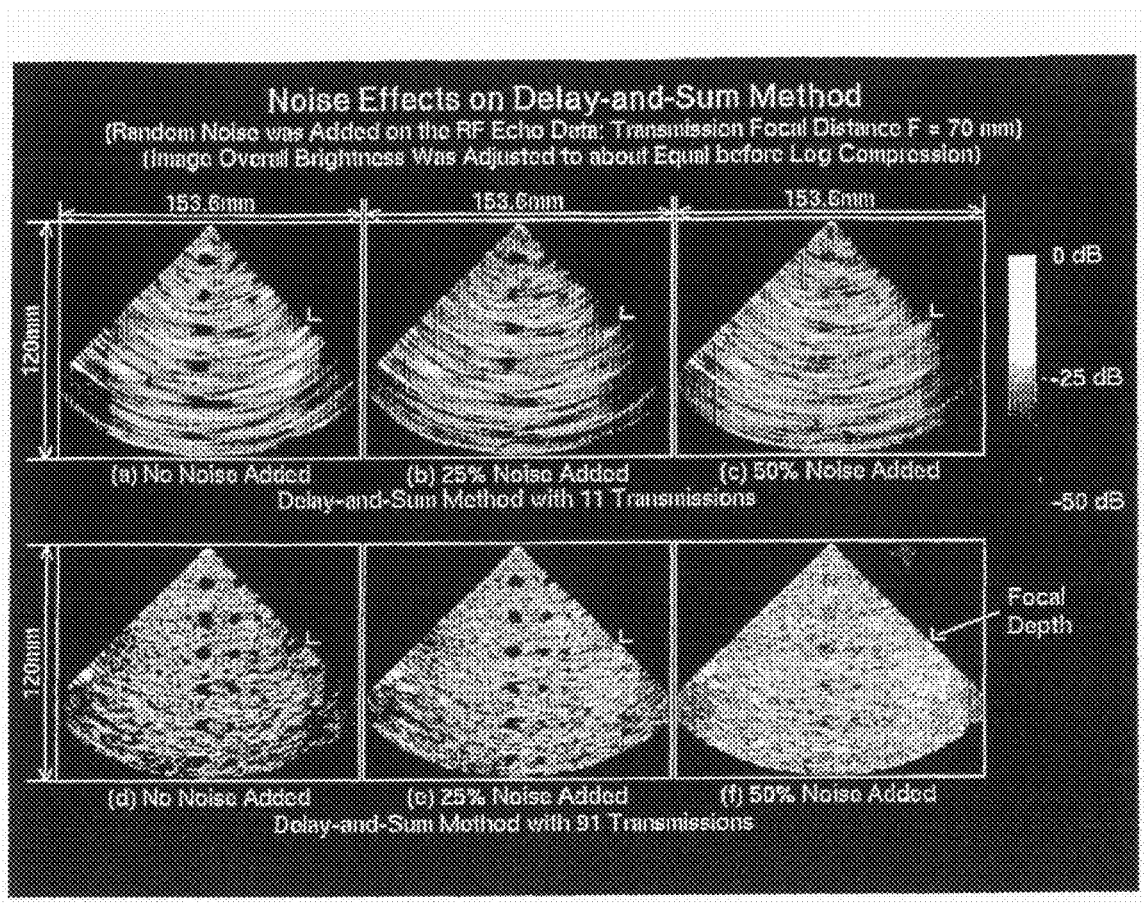

FIG. 38 is similar to FIG. 36, except that the delay-and-sum (D&S) method, instead of the limited-diffraction array beam imaging, is used for image reconstructions. The experiment conditions of the D&S method are the same as those of FIG. 35.

Figure 39:
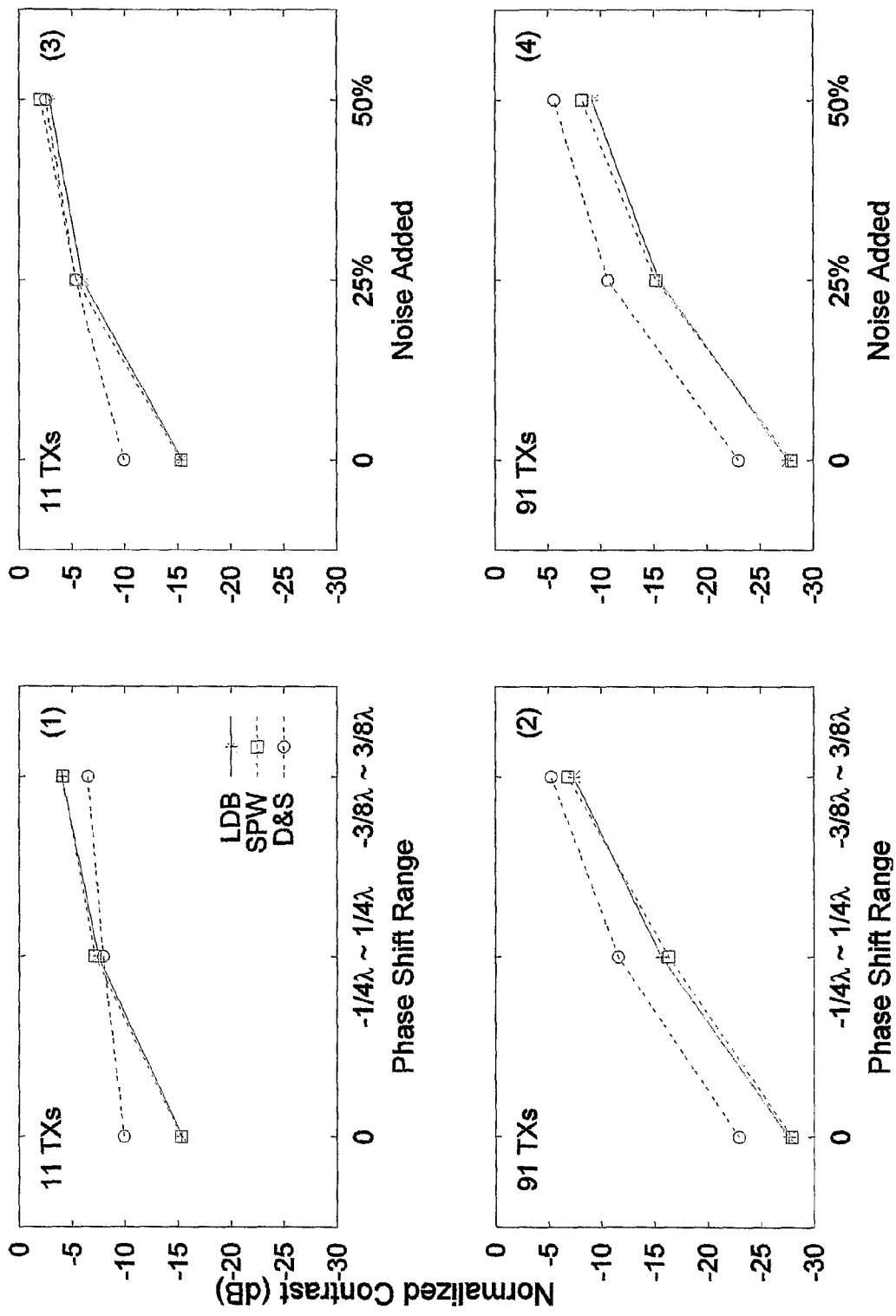

FIG. 39 shows a comparison of contrasts of a cylindrical cystic target of an ATS539 multifunction tissue-mimicking phantom using the Regions I and II shown in FIG. 31 for the effects of the phase aberration (Panels (1) and (2)) and noise (Panels (3) and (4)) on different imagine methods. Ideally, the cystic target should have a −∞ dB contrast. Top two panels show results with 11 transmissions (TXs), while bottom two panels show those of 91 TXs. The solid lines with a "star" symbol (red) represent the results of the limited-diffraction array beam (LDB) imaging; The dotted lines with a "square" symbol (blue) are from the results of the steered plane wave (SPW) imaging; While the dotted lines with a "circle" s symbol (black) are the results of the Delay-and-sum (D&S) method with transmission focal length of 70 mm and a dynamically focused reception.

DETAILED DESCRIPTION OF THE PREFERRED EMBODIMENT

Figure 1:
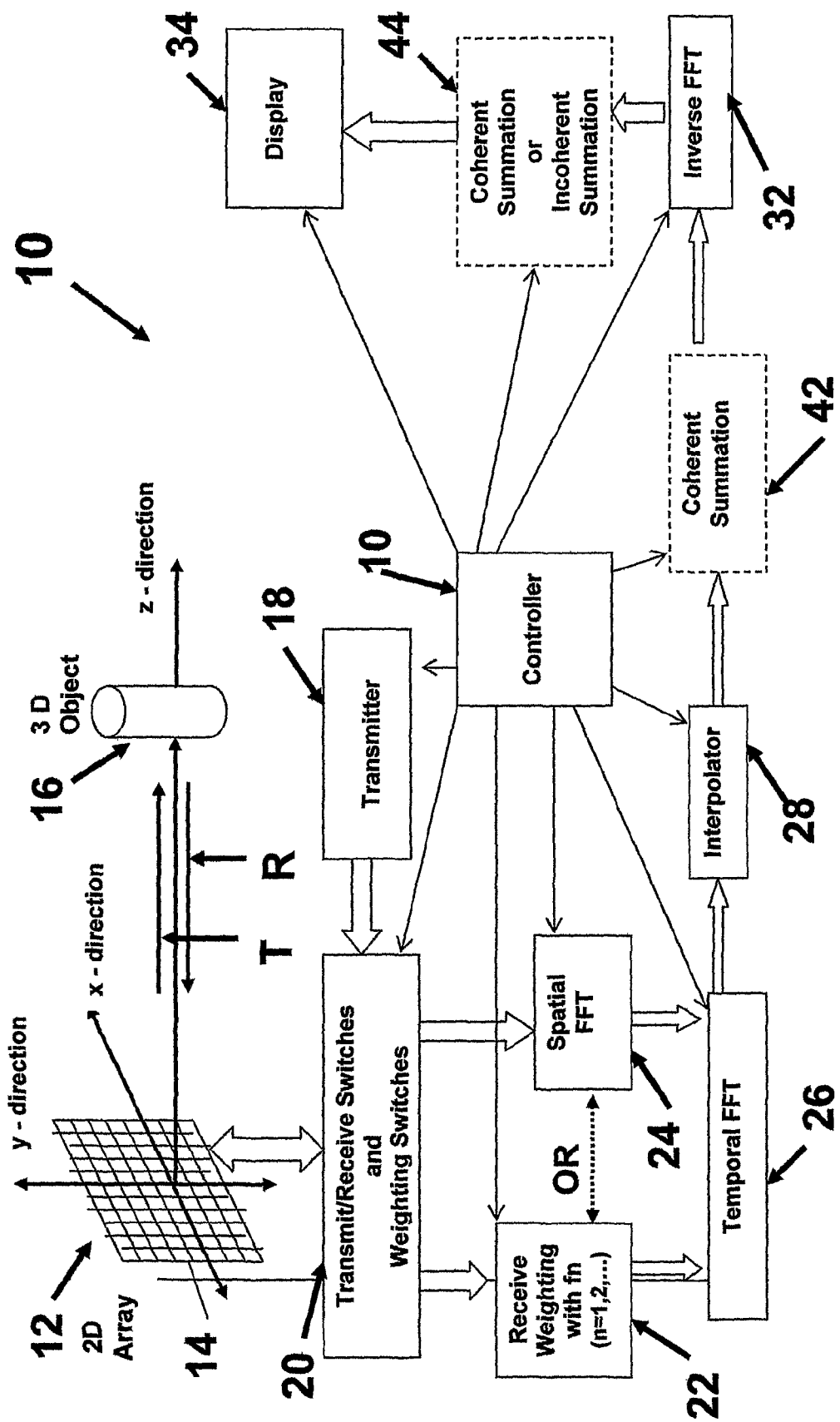
FIG. 1 is a system block diagram.

Referring first to FIG. 1. FIG. 1 is a general structure diagram of one embodiment of an imaging system 10. It is to be understood that the signals of energy can be, for example, but not limited to ultrasonic, electromagnetic, radar, microwave and the like. In the embodiment shown, the imaging system 10 includes a 2D transducer array 12 comprised of a plurality of elements 14. The transducer array driven by the circuits 20 transmits at least one signal T having a central frequency and fractional bandwidth (i.e. bandwidth divided by the central frequency) to a 3D object 16. A receive signal R (i.e., an echo reflected from a three-dimensional object) is received by the transducer array 12 and the resulting signals from each of its separate elements is processed as described below.

For 2D- or 3D imaging, the inter-element distances of the transducer 12 along the x and y axes are determined by the highest spatial frequencies of $K_x$ and $k_y$, respectively. In certain embodiments, the inter-element distance in the 2D transducer 12 can be much larger than a fully sampled 2D arrays used in the imaging system 10 for electronic steering. It is to be noted that any resulting grating lobes can be suppressed bad sub-dicing each transducer element. In such embodiments, the large inter-element distance reduces dramatically the number of elements required in the transducer 12.

The energy signal is generated by a transmitter 18 for a short time period. The energy signal is applied through a transmit/receive switch 20 to all of the elements in the transducer 12. The signal (for example, a resulting plane wave)

that is launched from the transducer 12 bad the energy signal to its elements is delayed and weighted.

The individual receive R signals received by each transducer element 14 are coupled through the T/R switches 20 during a receive mode. In certain embodiments, the receive signals R are sent to a weighing element 22 and are weighted and summed to produce spatial frequency components (i.e., $f_1, f_2, \ldots f_n$). The receive signals R are weighted to produce a limited diffraction receive beam.

In another embodiment, the receive signals R are sent to a spatial FFT element 24 and undergo Fast Fourier Transform.

The receive signals R are each Fourier transformed by application to a corresponding set of FFT integrated circuits that form a temporal FFT circuit 26. The output of the temporal FFT circuit 26 is a three dimensional array of k-space data which is related to the subject being imaged.

The output of the temporal FFT circuit 26 is applied to an interpolator 28 that transforms the k-space data to a rectilinear k-space array.

After the complete spatial Fourier transform of the object is obtained on a three-dimensional rectangular grid ($k_x', k_y', k_z'$) an image can be reconstructed by performing a three-dimensional inverse Fourier transformation along each k-space data array axis ($k_x', k_y', k_z'$). This is accomplished by the IFFT (inverse fast Fourier transform) circuit 32. The resulting three-dimensional array of image data is then envelope detected and displayed at a display element 34 using any suitable method.

In certain embodiments, the rectilinear k-space array from the interpolator 28 can be sent to a coherent summation element 42 before being sent to the inverse FFT element 32. In other embodiments, the rectilinear k-space array from the interpolator 28 can be sent to a coherent/incoherent summation element 44 after being sent to the inverse FFT element 32.

The timing and control circuit, generally labeled as controller 10 in FIG. 1, operates the above-described elements. In certain embodiments, this process is repeated for an enhanced three-dimensional image.

The high frame rate that is achievable can also be traded off for improved image quality. For example, rather than display each frame of newly acquired data, the acquired data may be averaged over a plurality of acquisitions to improve the signal-to-noise ratio, increase resolution, enhance contrast, reduce sidelobe, and/or reduce speckle noise of the reconstructed image.

In one system, the limited-diffraction array beam weightings of receive signals over a 2D transducer aperture are the same as a 2D Fourier transform of these signals over the same aperture. In certain embodiments, if the transducer is a one-dimensional (1D) array, limited diffraction array beam weightings of received echo signals over a 1D transducer aperture will be the same as a 1D Fourier transform of these signals over the 1D aperture. Thus, in one embodiment, the imaging system uses either limited diffraction array beam weightings of received echo signals over a transducer aperture or with a Fourier transformation, depending on which method is easier to implement in a particular imaging system. Image resolution and contrast are increased over a large field of views as more and more limited-diffraction array beams with different parameters or plane waves steered at different angles are used in transmissions.

Thus, in another aspect, the system allows a continuous compromise between image quality and image frame rate that is inversely proportional to the number of transmissions used to obtain a single frame of image. This is useful since in certain end-use applications such as imaging of liver and kidney where high frame rate imaging is not crucial, high quality images is obtained at the expense of image frame rate.

In certain embodiments, for limited-diffraction array beam transmissions, the present system has additional advantages over multiple plane waves steered at different angles. Limited-diffraction array beam transmissions are produced with an amplitude weighting of a transducer aperture (no need of any, time or phase delay). This allows a single transmitter to excite all transducer elements of different amplitude weightings at the same time, or allows a few transmitters, each of which excite a large group of transducer elements that have approximately the same weighting amplitude, greatly simplifying imaging systems, especially in 3D tissue harmonic imaging where over 10,000 independent linear high-voltage high-power transmitters would normally be required. Because all elements of the transducer are excited at the same time for limited diffraction beams, dead zones due to strong-ringing or inter-element interferences of transmission pulses are reduced.

In an additional aspect, a limited-diffraction array beam weighting acts as a diffraction grating where a lower frequency component is steered at a larger angle than a higher frequency one. This helps to increase image field of view with a broadband transducer though, in certain embodiments, it may be at the expense of reduced energy density that may lower SNR.

In certain embodiments, the image reconstructions, after an image data set are reconstructed, areas outside of transmission beams are masked before coherent superposition. Otherwise, images quality may be lower due to digital noise (caused by aliasing of digital signals) in image reconstruction.

Also, in certain embodiments, data densifying techniques such as zero padding can be used to increase the size of digital data sets in k-space and object space to reduce digital noises caused by aliasing.

The system constructs an image from echo signals produced in response to a single or multiple ultrasonic pulses and their associated echo measurements. By weighting received echo signals with limited diffraction beams or performing Fourier transforms, sufficient data are acquired in a single or multiple pulse transmissions to substantially fill a k-space (i.e., spatial Fourier space) data array from which an image can be reconstructed by a multi-dimensional inverse Fourier transformation.

The system produces images at a high frame rate. A complete 2D or 3D image is reconstructed from echo signals produced by a single weighted transmission. The frame rate is not limited bet the time needed to produce multiple, steered, transmit and receive beams normally required to produce an image. Very substantial increases in frame rate are achievable for both 2D and 3D imaging.

The cost of the imaging system is reduced. Steered transmit or receive beams are not required. This results in a substantial consequent reduction in the amount of hardware typically required to produce 2D and 3D ultrasound images. The image reconstruction system uses Fourier transformation circuits which are commercially available at reasonable cost due to the many applications of these circuits in a variety of other fields. Specially designed FFT processing units can be used to further increase the efficient of the hardware.

The image quality is also improved. Because data for a complete image is be acquired quickly, and efficiently, multiple acquisitions can be made and averaged, or otherwise combined either coherently or incoherently using known methods. This results in an increase in the signal-to-noise ratio and an improvement in the quality of the reconstructed image.

Image resolution is increased while sidelobes are reduced. This is achieved by also transmitting the pulse of ultrasonic energy as a limited diffraction beam. In certain embodiments, a plane wave is transmitted by energizing all of the transducer array elements with the same signal pulse or pulses delayed from the pulse. When the transmit signals applied to each transducer element are weighted to produce limited diffraction beams or steered plane waves, the resolution of the resulting image is improved, and artifacts caused by sidelobes are reduced as resulting multiple images are superposed.

In certain embodiments, the method for producing a high frame rate, high resolution and high contrast image includes transmitting a group of signals of energy weighted by single spatial frequency but may be of different phases or linear time delay toward an object to be imaged. The receive signals from the object are weighted with multiple spatial frequencies, or by performing a spatial Fourier transform. A two- or three-dimensional image data set is reconstructed from the group of the transmitted signals weighted by the single spatial frequency or linear time delay. The receive signals are weighted with the multiple spatial frequencies or processed by the spatial Fourier transform. The high frame rate, high resolution and high contrast image is reconstructed from the image data set of step c.

In another embodiment, a method for producing a high frame rate, high resolution and high contrast velocity vector image of an object where at least a part of the object is moving includes transmitting two or more groups of signals of energy weighted by, single spatial frequency but may be of different phases or linear time delay toward the object. The receive signals from the object are weighted with multiple spatial frequencies or by performing a spatial Fourier transform. Two- or three-dimensional image data sets are reconstructed from the groups of the transmitted signals weighted by the single spatial frequency or linear time delay. The receive signals are weighted with the multiple spatial frequencies or processed by the spatial Fourier transform. The image data sets are used to reconstruct: i) a first set of flow velocity component images in a first direction, and ii) a second set of flow velocity component images in a second direction that is different from the first direction. The velocity vector image is reconstructed from the two sets of velocity component images.

Also, in certain embodiments, in step a) each group may contain one or more signals, each of which is produced with one transmission.

In yet another aspect, limited-diffraction array beam in transmission can be used to obtain the transverse component of flow velocity. When reconstructing moving images, two or more identical transmissions are used in order to detect motion for broadband signals (short pulses). When more than two identical transmissions are used, signal-to-noise ratio for velocity vector imaging will increase. The velocity component images are reconstructed after two or more identical transmissions (with either steered plane wave or limited diffraction array beam)—transmit in the same direction or with the same aperture weightings at least twice.

In certain embodiments, color flow mapping techniques (based on the line-by-line flows techniques) can be used to obtain velocity component images. The color flow technique is a reliable technique for good velocity estimation and simple to implement in a real system.

The image data set can be produced by: i) Fourier transforming along a time domain of the weighted transmitted signals, or ii) Fourier transforming along the time domain of the spatial Fourier transform, whereby a first multi-dimensional k-space data set is formed. The first multi-dimensional k-space data set is interpolated to produce rectilinear multi-dimensional k-space data sets. Inverse Fourier transformations of the interpolated rectilinear multi-dimensional k-space data sets (along each of its dimensions) are used to produce the image data set.

It is to be understood that the imaging system can include a transducer array and one or more elements that can be arranged in more than one tope of configuration. For example, in certain embodiments, the separate elements in a transducer array are arranged in a one- or two-dimensional array. The k-space data set thus generated has two- or three-dimensions, and the inverse Fourier transformation is performed along each of the two- or three-dimensions to produce a two- or three-dimensional image data set. In certain embodiments, the transducer arrays can comprise one or more of a piezoelectric device, or a capacitive micro-machined ultrasound transducer (CMUT).

In certain embodiments, the energy is transmitted using only one transmitter. For example, in one embodiment, the single transmitter is configured to excite all the transducer elements having different amplitude weightings a the same time. In one embodiment, a 2D array transducer is excited to generate a broadband limited-diffraction array beam.

In other embodiments, multiple and/or separate elements of a transducer array are used, and the transmissions of each separate element are weighted to produce a limited diffraction beam. The transducer array can be used to produce waves by energizing separate elements in the transducer array.

The transducer array can be weighted to produce multiple limited diffraction transmit beams where one or more of the limited diffraction beams have different weighting parameters.

Further, in certain embodiments, the transducer array is excited with a plane wave without steering. Alternatively, the transducer array can be excited with a plane wave that is steered either mechanically or electronically. In certain embodiments, the transducer array is excited with multiple plane waves that are steered at different angles (where the multiple plane waves can be either mechanically or electronically steered).

The system can also include steering at least one of the transmitted energy signal and/or the receive echo signal. In addition, the process steps can be repeated and both the transmitted signal and the receive signal are steered in a different direction.

In certain embodiments, the process steps are performed a plurality of times, and the system further includes a step g): combining the plurality of limited diffraction transmit and/or receive signals to increase a signal-to-noise ratio, increase resolution, enhance contrast, reduce side lobe, and/or reduce speckle noise of the image. In addition, the combining step can be performed can be performed either coherently or incoherently.

The system can further include the step of time gating on at least one of the transmitted signals or the received echo signals.

Also, in certain embodiments, the system includes discretizing an amplitude of the weighted transmitted signals. The system can include digitizing the weighted echo signals prior to Fourier transforming the weighted echo signals.

The limited-diffraction array beam transmissions can be produced with an amplitude weighting of the transducer aperture. Also, in certain embodiments, no time or phase delay need to be used.

In certain embodiments of the imaging system, the same transducer array can be used to transmit a beam and receive the echo signals. Also, in certain embodiments, the received echo signals are separated from transmit signals with a transmit/receive (T/R) switch. The received echo signals can be filtered with active or passive analog filters.

In certain embodiments, the received echo signals are weighted with limited diffraction beams that have different parameters, where the weighting is done either before or after analog-to-digital conversion. In addition, the received echo signals can be Fourier transformed over the transducer aperture, and/or densified over the transducer aperture before the Fourier transform.

Also, in certain embodiments, the received echo signals are switched to obtain appropriate weighting amplitudes. The received and digitized echo signals can be stored in memory. Further, the received and digitized echo signals can be Fourier transformed in time domain. In addition, the received and digitized echo signals can be densified before the time-domain Fourier transform. For example, the received echo signals can be densified by various interpolation systems such as zero-padding, cubic spline interpolation, and other suitable systems.

In one embodiment, the interpolation is applied to obtain a rectilinear Fourier transformation data set from the Fourier transform of the receive echo signals. In another embodiment, the inverse Fourier transform is used to reconstruct images from the interpolated rectilinear Fourier data sets.

A variable imaging frame rate is achieved by using the limited diffraction arrays beams in transmission and by applying a Fast Fourier Transform to the received echo signals so that the constructed images have an increased resolution, while having lower sidelobe distortions. In certain embodiments, in the echo Fourier domain, the sampling intervals in both $x_1$ and $y_1$ directions are determined by the transducer and are smaller than a half of the minimum wavelength of the transducer to avoid aliasing or grating lobes. In certain embodiments, a sampling interval in time is smaller than the half of the smallest period of the signal frequency component. In other embodiments, a sampling interval (pitch) of the transducer is bigger than a half of minimum wavelength. Also, in certain embodiments, a sampling interval is in the spatial Fourier domain, $(k_x', k_y', k_z')$, of the object function.

In certain embodiments, the weighting of the transducer is approximated with piece-wise functions to produce a transmit and/or a receive limited diffraction beam.

Also, in certain embodiments, one transmission is used to reconstruct an image. For example, in one embodiment, a single transmitter is used and electronic switches are used to produce weightings for different transducer elements. In another embodiment, multiple transmitters are used and electronic switches are used to produce weightings for different transducer elements.

In another embodiment, one group of transmitted signals is used to reconstruct an image. In vet another embodiment, at least two groups of transmitted signals are used to reconstruct an image.

It is to be understood that the transmit signal can be, for example (and without being limited to) one or more of a coded signal, a chirp signal, a broadband signal, and/or a narrow band signal. Also, the polarity of transit signal can be inverted in each subsequent transmission.

It is also to be understood that harmonic images can be constructed and/or elastic images can be reconstructed according to the system described herein. In addition, in certain embodiments, the constructed 3D images are volume rendered images, surface rendered images, and/or are multiple-slice images.

In one particular embodiment, physiological functional images of a patient's organs and/or systems, such as blood flows or lymphatic systems, are reconstructed. For example, in certain embodiments, blood flow can be imaged. The blood flow vector images can be reconstructed with a cross-correlation system. Alternatively, the blood flow, vector images can be reconstructed with a Doppler system (for example, a pulse or color flowing Doppler method) or a combined Doppler and cross-correlation system.

Also, it is to be understood that additional functions, such as, for example, a window function can be applied to transmit signals in time domain, transmit signals over transducer aperture, data sets of echo signals in time domain, data sets of echo signals over transducer aperture, data sets of Fourier transform of echo signals, data sets of interpolated Fourier transform, or data sets of Fourier transform corresponding to each transmit weighting or beam steering.

The imaging system is especially useful for producing multi-dimensional images, including for example, two-dimensional: a single picture; three-dimensional: volumetric image; and four-dimensional: three-dimensional image sequence displayed over time. The multi-dimensional images are produced bar weighting: i) the signals transmitted from at least one element of a transducer array to form limited diffraction transmitted beams or other types of beams; and ii) weighting the echo signals received at the separate elements to form limited diffraction receive beams or Fourier transformations of the received signals in time domain as well as in both spatial axes across the transducer surface.

The limited diffraction weighting and the Fourier transformation are identical. Fourier transformations of the weighted signals form multi-dimensional k-space data sets which are used to produce an image from the image data sets. The Fourier transformations can be done digitally with either Discrete Fourier transform (DFT) or computationally efficient Fast Fourier Transformation (FFT). The weighting can also be in combination with time delay for each transducer element to produce steered limited diffraction beams in transmission or in reception to further increase the field of view of an image.

In certain embodiments, the extended high frame rate imaging method with multiple limited-diffraction array beam or steered plane wave transmissions uses a phase-coherent summation in either spatial or spatial Fourier domain in order to correct for an), distortions. For example, in certain embodiments the system includes one or more of the following steps:

i) comparing the number of coherent superposition to the number of overlapping transmissions, ii) evaluating any overlapping regions that are close to the transducer surface, iii) compensating for any overlapping transmissions that appear in the entire imaging area and thus are more sensitive to any motion by the object being imaged, iv) compensating for direction of any motion by using less phase coherence to avoid motion artifacts at least in the axial direction.

v) imaging a field where only a part of the imaged field is in motion vii) using steered plane wave imaging when the number of transmissions is large viii) when imaging fast moving objects, using a small number of transmissions and/or higher frame rate for both limited-diffraction array beam and steered plane wave imaging ix) when imaging fast moving objects that are located farther away from the transducer surface, using more transmissions to increase image contrast and resolution, and x) when stationary or slowly moving objects are imaged, using a lower frame rate (or a larger number of transmissions) used to increase image quality.

Also, in certain embodiments, the high frame rate imaging system can be used to provide vector imaging. In such embodiments, the system can include the following:
 i) transmitting multiple plane waves in the same direction,
 ii) receiving echo signals and digitized the echo signals
 iii) reconstructing a two- or three-dimensional radio frequency image from each transmission
 iv) reconstructing:
  a first set of flow velocity component images along an axial direction (wherein the axial direction is perpendicular with respect to a surface transmitting the plane waves), and
  a second set of flow velocity component images at an acute angle from the axial directions, whereby from two sets of velocity component images, velocity vector images are obtained.

An apparatus for producing a high frame rate: high resolution and high contrast image of an object can include a device configured to: i) transmit one or more groups of signals of energy weighted by single spatial frequency but may be of different phases or linear time delay toward an object to be imaged; and ii) receive by weighting receive signals from the object with multiple spatial frequencies, or by performing a spatial Fourier transform. The apparatus can also include a device configured to reconstruct a two- or three-dimensional image data set from the group of the transmitted signals weighted by the single spatial frequency or linear time delay, and the receive signals weighted with the multiple spatial frequencies or processed by the spatial Fourier transform. In certain embodiments, the apparatus can include a device configured to reconstruct the high frame rate, high resolution and high contrast image from the image data set.

Also, in certain embodiments, the transmit/receive device transmits more than one beam at the same spatial frequency, or steering angle in order to obtain the velocity component image and to improve signal-to-noise ratio.

High Frame Imaging System

High frame rate imaging includes transmission schemes such as multiple limited-diffraction array beams and steered plane waves. The limited-diffraction array beam weightings of received echo signals over a 2D transducer aperture are the same as a 2D Fourier transform of these signals over the same aperture. The same is applicable for a 1D array and its 1D Fourier transform over the array aperture.

Figure 2A:
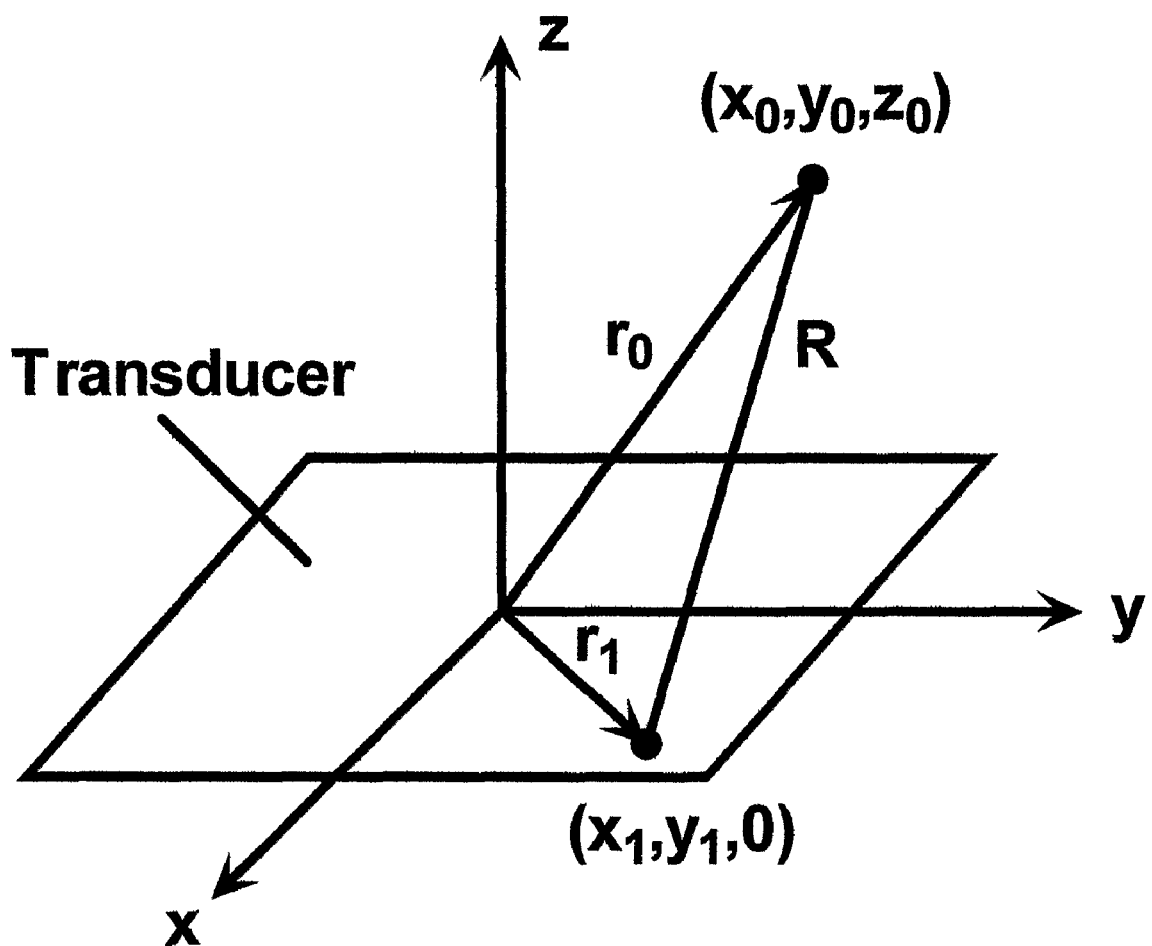
FIG. 2*a* is a schematic illustration showing coordinates of transducer and object in space.

As shown in FIG. 2a, a 2D arrays transducer located at z=0 plane is excited to generate a broadband limited-diffraction array beam or a steered pulsed plane wave. The same transducer is also used to receive echoes scattered from objects. The aperture of the transducer is assumed to be infinitely large, and the size of each transducer element is infinitely small. The coordinates on the surface of the transducer are denoted as $\vec{r}_1 = (x_1, y_1, 0)$ and the coordinates of any spatial point in the object are given by $\vec{r}_0 = (x_0, y_0, z_0)$. In the following, various transmission schemes such as multiple limited-diffraction array beams and steered plane waves will be included.

Assuming that the transmitting transfer function of the transducer is A(k) that includes both electrical response of the driving circuits and electro-acoustical coupling characteristics of the transducer elements. Then, a broadband limited diffraction array beam or pulsed steered plane wave (a plane wave is a special case of limited diffraction beams) incident on the object can be expressed as:

$$\Phi_{Array}^T(\vec{r}_0, t) = \frac{1}{2\pi} \int_0^\infty A(k) e^{ik_{x_T} x_0 + ik_{y_T} y_0 + ik_{z_T} z_0} e^{-i\omega t} dk \quad (1)$$

$$= \frac{1}{2\pi} \int_{-\infty}^\infty A(k) H(k) e^{ik_{x_T} x_0 + ik_{y_T} y_0 + ik_{z_T} z_0} e^{-i\omega t} dk,$$

where the superscript "T" in $\Phi_{Array}^T(\vec{r}_0, t)$ means "transmission" and the subscript "Array" represents "arrays beam", and $$\tilde{\Phi}_{Array}^T(\vec{r}_0, \omega) = \frac{A(k)H(k)}{c} e^{ik_{x_T} x_0 + ik_{y_T} y_0 + ik_{z_T} z_0}, \quad (2)$$

is the Fourier transform (spectrum) of the array beams in terms of time. (2) is an expression of a monochromatic (single angular frequency ω) plane wave steered at a direction along the transmission wave vector, $\vec{K}^T = (k_{x_T}, k_{y_T}, k_{z_T})$.

$$H\left(\frac{\omega}{c}\right) = \begin{cases} 1, & \omega \geq 0 \\ 0, & \omega < 0 \end{cases}, \quad (3)$$

is the Heaviside step function, and $$k_{z_T} = \sqrt{k^2 - k_{x_T}^2 - k_{y_T}^2} \geq 0, \quad (4)$$

where $k_{x_T}$ and $k_{y_T}$ are projections of the transmission wave vector along $x_1$ and $y_1$ axes, respectively, k=ω/c is the wave number, where ω=2πf is the angular frequency, f is the temporal frequency, c is the speed of sound of the object, and t is the time.

Due to the reciprocal principle, the response of a transducer weighted with a broadband limited diffraction array beam or pulsed steered plane wave for a point source (or scatterer) located at $\vec{r}_0 = (x_0, y_0, z_0)$ is given by:

$$\Phi_{Array}^R(\vec{r}_0, t) = \frac{1}{2\pi} \int_{-\infty}^\infty T(k) H(k) e^{ik_x x_0 + ik_y y_0 + ik_z z_0} e^{-i\omega t} dk, \quad (5)$$

or $$\tilde{\Phi}_{Array}^R(\vec{r}_0, \omega) = \frac{T(k)H(k)}{c} e^{ik_x x_0 + ik_y y_0 + ik_z z_0}$$

where the superscript "R" in $\Phi_{Array}^R(\vec{r}_0, t)$ means "reception", $\tilde{\Phi}_{Array}^R(\vec{r}_0, \omega)$ is the Fourier transform (spectrum) of $\Phi_{Array}^R(\vec{r}_0, t)$ in terms of time, which is an expression of a monochromatic plane wave response steered at a direction along the reception wave vector $\vec{K}^R = (k_x, k_y, k_z)$ (similar to (2) above), T(k) is the transfer function of the transducer in reception, and $$k_z = \sqrt{k^2 - k_x^2 - k_y^2} \geq 0, \quad (6)$$

where $k_x$ and $k_y$ are projections of the reception wave vector along $x_1$ and $y_1$ axes, respectively.

If the same array transducer is used as both transmitter and receiver above, from (1) and (5), the received signal for the wave scattered from a point scatterer located at $\vec{r}_0=(x_0, Y_0, z_0)$ is given by the following convolution:

$$\Phi^{(one)}_{k_x+k_{x_T},k_y+k_{y_T},k_z+k_{z_T}}(t) = f(\vec{r}_0)[\Phi^T_{Array}(\vec{r}_0, t) * \Phi^R_{Array}(\vec{r}_0, t)] \quad (7)$$

$$= \frac{1}{2\pi}\int_{-\infty}^{\infty}\frac{A(k)T(k)H(k)}{c}$$

$$f(\vec{r}_0)e^{i(k_x+k_{x_T})x_0+i(k_y+k_{y_T})y_0+i(k_z+k_{z_T})z_0} e^{-i\omega t}\,dk,$$

where "*" represents the convolution with respect to time and where the superscript "one" means "one point scatterer". This uses the fact that the spectrum of the convolution of two functions is equal to the product of the spectra of the functions. $f(\vec{r}_0)$ is an object function that is related to the scattering strength of a scatterer at point $\bar{r}_0$.

Assuming that the imaging system is linear and multiple scattering can be ignored (Born or weak scattering approximation), the received signal for echoes returned from all random scatterers within the object $f(\vec{r}_0)$ is a linear superposition of those echo signals from individual point scatterers as follows:

$$R_{k_x+k_{x_T},k_y+k_{y_T},k_z+k_{z_T}}(\tau) = \frac{1}{2\pi}\int_{-\infty}^{\infty}\frac{A(k)T(k)H(k)}{c} \times \quad (8)$$

$$\left[\int_V f(\vec{r}_0)e^{i(k_x+k_{x_T})x_0+i(k_y+k_{y_T})y_0+i(k_z+k_{z_T})z_0}\,d\vec{r}_0\right]e^{-i\omega t}dk =$$

$$\frac{1}{2\pi}\int_{-\infty}^{\infty}\frac{A(k)T(k)H(k)}{c}F(k_x+k_{x_T},k_y+k_{y_T},k_z+k_{z_T})e^{-i\omega t}dk$$

The 3D Fourier transform pair in this expression is defined as follows:

$$F(k_x, k_y, k_z) = \int_V f(\vec{r}_0)e^{ik_x x_0+ik_y y_0+ik_z z_0}\,d\vec{r}_0 \quad (9)$$

and $$f(\vec{r}_0) = \frac{1}{(2\pi)^3}\int_{-\infty}^{\infty}\int_{-\infty}^{\infty}\int_{-\infty}^{\infty} F(k_x, k_y, k_z)e^{-ik_x x_0 - ik_y y_0 - ik_z z_0}\,dk_x\,dk_y\,dk_z$$

where $V$, is the volume of the object $f(\vec{r}_0)$.

From (9) the temporal Fourier transform (spectrum) of the received signal can be obtained:

$$\tilde{R}_{k_x+k_{x_T},k_y+k_{y_T},k_z+k_{z_T}}(\omega) = \quad (10)$$

$$\frac{A(k)T(k)H(k)}{c^2}\times\int_V f(\vec{r}_0)e^{i(k_x+k_{x_T})x_0+i(k_y+k_{y_T})y_0+i(k_z+j_{z_T})z_0}\,d\vec{r}_0$$

or $$\tilde{R}_{k_x+k_{x_T},k_y+k_{y_T},k_z+k_{z_T}}(\omega) =$$

$$\frac{A(k)T(k)H(k)}{c^2}\times F(k_x+k_{x_T},k_y+k_{y_T},k_z+k_{z_T})$$

or $$F_{BL}(k'_x, k'_y, k'_z) = c^2 H(k)\tilde{R}_{k'_x,k'_y,k'_z}(\omega)$$

where

-continued $$\begin{cases} k'_x = k_x + k_{x_T} \\ k'_y = k_y + k_{y_T} \\ k'_z = k_z + k_{z_T} = \sqrt{k^2 - k_x^2 - k_y^2} + \sqrt{k^2 - k_{x_T}^2 - k_{y_T}^2} \geq 0 \end{cases} \quad (11)$$

$H(k)$ in (10) is used to indicate that only positive values of $k$ are used and thus it can be applied to either side of the equation (for the convenience of presentation, it is used with, $\tilde{R}_{k'_x,k'_y,k'_z}(\omega)$, and.

$$F_{BL}(k'_x,k'_y,k'_z) = A(k)T(k)F(k'_x,k'_y,k'_z) \quad (12)$$

is a band-limited version of the spatial Fourier transform of the object function, the subscript "BL" means "band-limited".

It should be emphasized that (10) is also a 2D Fourier transform of the echo signals in terms of both $x_1$ and $y_1$ over the transducer surface (aperture). The proof is given as follows. Using (5), one can easily see that (10) can be rewritten as:

$$\tilde{R}_{k_x+k_{x_T},k_y+k_{y_T},k_z+k_{z_T}}(\omega) = \frac{A(k)T(k)H(k)}{c^2} \times \quad (13)$$

$$\int_V f(\vec{r}_0)e^{ik_x x_0+ik_y y_0+ik_z z_0}e^{ik_{x_T} x_0+ik_{y_T} y_0+ik_{z_T} z_0}\,d\vec{r}_0 =$$

$$\frac{A(k)}{c}\int_V f(\vec{r}_0)\left[\frac{T(k)H(k)}{c}e^{ik_x x_0+ik_y y_0+ik_z z_0}\right]$$

$$e^{ik_{x_T} x_0+ik_{y_T} y_0+ik_{z_T} z_0}\,d\vec{r}_0 =$$

$$\frac{A(k)}{c}\int_V f(\vec{r}_0)[\Phi^R_{Array}(\vec{r}_0,\omega)]e^{ik_{x_T} x_0+ik_{y_T} y_0+ik_{z_T} z_0}\,d\vec{r}_0 =$$

$$\frac{A(k)}{c}\int_V f(\vec{r}_0)[\mathcal{J}_{x_1,y_1}\{\tilde{E}(x_1,y_1;\vec{r}_0;\omega)\}]e^{ik_{x_T} x_0+ik_{y_T} y_0+ik_{z_T} z_0}\,d\vec{r}_0 =$$

$$d\vec{r}_0 = \mathcal{J}_{x_1,y_1}\left\{\int_V\left[f(\vec{r}_0)\frac{A(k)}{c}e^{ik_{x_T} x_0+ik_{y_T} y_0+ik_{z_T} z_0}\right]\tilde{E}(x_1,y_1;\vec{r}_0;\omega)d\vec{r}_0\right\},$$

where $\mathcal{J}_{x_1,y_1}$ represents a 2D Fourier transform in terms of both $x_1$ and $y_1$ at the transducer surface, $$\tilde{E}(x_1, y_1; \vec{r}_0; \omega) = \mathcal{J}^{-1}_{k_x,k_y}\{\Phi^R_{Array}(\vec{r}_0,\omega)\} \quad (14)$$

$$= \frac{T(k)H(k)}{c}\mathcal{J}^{-1}_{k_x,k_y}\{e^{ik_x x_0+ik_y y_0+ik_z z_0}\}$$

$$= -\frac{T(k)H(k)}{2\pi c}\frac{\partial}{\partial z_0}\left(\frac{e^{ik\sqrt{(x_1-x_0)^2+(y_1-y_0)^2+z_0^2}}}{\sqrt{(x_1-x_0)^2+(y_1-y_0)^2+z_0^2}}\right)$$

$\mathcal{J}^{-1}_{k_x,k_y}$ represents an inverse 2D Fourier transform in terms of both $k_x$ and $k_y$. The last equal sign in (14) is obtained with the shift theorem of Fourier transform and the following Fourier transformation equality:

$$e^{ik_x x_0+ik_y y_0+ik_z z_0} = \quad (15)$$

$$-\frac{1}{2\pi}\mathcal{J}_{x_1,y_1}\left\{\frac{\partial}{\partial z_0}\left(\frac{e^{ik\sqrt{(x_1-x_0)^2+(y_1-y_0)^2+z_0^2}}}{\sqrt{(x_1-x_0)^2+(y_1-y_0)^2+z_0^2}}\right)\right\}.$$

Apparently, $\tilde{E}(x_1, y_1; \vec{r}_0; \omega)$ in (14) is a differentiation of the Green's function representing the filed at a point of the transducer surface, $(x_1, y_1, 0)$, produced by a point source (scatterer) located at a spatial point, $\vec{r}_0 = (x_0, y_0, z_0)$. This is also clear from the Rayleigh-Sommerfeld diffraction formula:

$$\tilde{\Phi}(\vec{r}_0; \omega) = \qquad (16)$$
$$-\frac{1}{2\pi} \int_{\Sigma_1} \int \tilde{\Phi}(\vec{r}_1; \omega) \frac{\partial}{\partial z_0} \left( \frac{e^{ik\sqrt{(x_1-x_0)^2+(y_1-y_0)^2+z_0^2}}}{\sqrt{(x_1-x_0)^2+(y_1-y_0)^2+z_0^2}} \right) d\vec{r}_1,$$

where $\Sigma_1$ is the area of the transducer surface, $\tilde{\Phi}(\vec{r}_0; \omega)$ is the integrated field distribution or response of the transducer for a point source (scatterer) at $\vec{r}_0$, and $\tilde{\Phi}(\vec{r}_1; \omega)$ is the weighting function at the surface of the transducer. It is seen that the kernel of (16) is the same as that of $\tilde{E}(x_1, y_1; \vec{r}_0; \omega)$ in (14). Therefore, (13) indicates that (10) represents a 2D Fourier transform over the transducer surface for echo signals produced from all point scatterers in the volume, V. The phase and amplitude of each point source (scatterer) are modified by the transmitted plane wave, $(A(k)H(k)/c)e^{ik_{xT}x_0+ik_{yT}y_0+ik_{zT}z_0}$ (see (2)) as well as the object function, $f(\vec{r}_0)$.

Thus, limited diffraction array beam weighting theory is exactly same as a 3D Fourier transformation of echo signals over both the transducer aperture (2D) and time (1D), which decomposes echo signals into plane waves or limited diffraction arrays beams. The steered plane waves and the limited-diffraction array beam weightings in transmissions is equivalent to the phase and amplitude modifications of the object function shown in (13) or (10). It is worth noting that because both the high frame rate imaging method and current extension are based on the rigorous theory of the Green's function in (14) and (16), it could be more accurate to reflect the scatterer distributions in space than the simple delay-and-sum (D&S) method used in almost all commercial ultrasound scanners. This proves that $\tilde{R}_{k_x+k_{xT},k_y+k_{yT},k_z+k_{zT}}(\omega)$ in (10) or (13) can be obtained directly by 3D Fourier transform of the received echo signals over a 2D transducer aperture and 1D time.

Taking the inverse Fourier transformation of (12), an approximation of the object function can be reconstructed using the definition of the spatial Fourier transform in (9):

$$f(\vec{r}_0) \approx f_{BL}(\vec{r}_0) \approx f_{BL}^{Part}(\vec{r}_0) \qquad (17)$$
$$= \frac{1}{(2\pi)^3} \int_{-\infty}^{\infty} dk'_z \int_{-\infty}^{\infty} dk'_y \int_{k \geq \sqrt{k_{xT}^2+k_{yT}^2} \text{ and } k \geq \sqrt{k_x^2+k_y^2}} dk'_x \times$$
$$F_{BL}(k'_x, k'_y, k'_z) e^{-ik'_x x_0 - ik'_y y_0 - ik'_z z_0}$$

where the first approximation is due to the finite bandwidth of received signals and the second one is due to the requirements that both $k \geq \sqrt{k_{xT}^2+k_{yT}^2}$ and $k \geq \sqrt{k_x^2+k_y^2}$ must be satisfied. Thus, only part (indicated by the superscript "Part") of the spatial Fourier transform of the object function is known. It can be shown from computer simulations and experiments in the later sections that these approximations do not affect the quality of constructed images as compared to those obtained with conventional dynamically focused pulse-echo imaging systems.

If the object function, $f(\vec{r}_0)$, is real, which is the case in most applications, the following is true from (9):

$$F(-k'_x, -k'_y, -k'_z) = F(k'_x, k'_y, k'_z)^* \qquad (18)$$

where the superscript "*" means complex conjugate. In this case, the spatial Fourier transform of the object function in the lower Fourier space ($k'_z < 0$) is also known.

In the following sections, (10), (11), and (17) will be used to reconstruct images for various transmission schemes.

Examples of High Frame Rate Imaging

1. High Frame Rate Imaging Method without Steering. For a plane wave without steering, one has $k_{xT} = 0$ and $k_{yT} = 0$. From (10) and (11), one obtains:

$$F_{BL}(k_x, k_y, k'_z) = c^2 H(k) \tilde{R}_{k_x, k_y, k'_z}(\omega), \qquad (19)$$

where $$\begin{cases} k'_x = k_x \\ k'_y = k_y \\ k'_z = k + k_z = k + \sqrt{k^2 - k_x^2 - k_y^2} \geq 0 \end{cases} \qquad (20)$$

which is exactly the same as that of the high frame rate imaging method. From (19) and (20), 3D or 2D images can be constructed with (17).

2. Two-Way Dynamic Focusing with Limited Diffraction Array Beams. If both $k_x = k_{xT}$ and $k_y = k_{yT}$ are fixed during each transmission, from (10) and (11), one obtains the two-way dynamic focusing with limited-diffraction beam method:

$$F_{BL}(k'_x, k'_y, k'_z) = c^2 H(k) \tilde{R}_{k'_x, k'_y, k'_z}(\omega), \qquad (21)$$

where $$\begin{cases} k'_x = 2k_x \\ k'_y = 2k_y \\ k'_z = 2k_z \geq 0 \end{cases} \qquad (22)$$

which represents an increased Fourier domain coverage resulting in a higher image resolution. The increased Fourier domain coverage may be equivalent to a dynamic focusing in both transmission and reception in theory. Choosing both $k_x$ and $k_y$ on rectangular grids, one does not need to do an) interpolation in the spatial Fourier domain of the object function along these directions. This method also increases the image field of view as compared to the high frame rate imaging method. However, because only one line in the Fourier domain is obtained from each transmission, this method may be slow for 3D imaging. In addition, to construct an image of a large field of view, the sampling internal of both $k_x$ and $k_y$ must be small that may further increase the number of transmissions needed.

3. Spherical Coordinates Approach. Using spherical coordinates for (4) or the transmission wave vector, $\vec{K}^T = (k_{xT}, k_{yT}, k_{zT})$, one obtains:

$$\begin{cases} k_{xT} = k\sin\zeta_T\cos\theta_T = k_{1T}\cos\theta_T \\ k_{yT} = k\sin\zeta_T\sin\theta_T = k_{1T}\sin\theta_T \\ k_{zT} = k\cos\zeta_T = \sqrt{k^2 - k_{1T}^2} \geq 0 \end{cases} \qquad (23)$$

where $\zeta_T$ is the Axicon angle of X wave or the steering angle of a plane wave. $\theta_T$ is an angle that determines components of the transmission wave vector in both $x_1$ and $y_1$ axes (for a given transmission, both $\zeta_T$ and $\theta_T$ are fixed), and $$k_{1_T} = k \sin \zeta_T = \sqrt{k_{x_T}^2 + k_{y_T}^2} \quad (24)$$

is the magnitude of the transverse component of the wave vector in $(x_1, y_1)$.

Let $k_x = k_{x_T} = k \sin \zeta_T \cos \theta_T$ and $k_y = k_{y_T} = k \sin \zeta_T \sin \theta_T$, where both and $\zeta_T$ and $\theta_T$ are fixed for each transmission, the Fourier space of the object function can be filled up in spherical coordinates, $(2k, \zeta_T, \theta_T)$. I.e., for each plane wave transmission, echo signal is received with a plane wave response from the same direction. From (10) and (11), one obtains (21) with the following parameters for 3D imaging:

$$\begin{cases} k'_x = 2k \sin\zeta_T \cos\theta_T \\ k'_y = 2k \sin\zeta_T \sin\theta_T \\ k'_z = k_z + k_{z_T} = 2k\cos\zeta_T \geq 0 \end{cases} \quad (25)$$

A similar result is obtained from a linear system modeling approach in polar coordinates for 2D imaging. Because the samples in the spatial Fourier domain are very sparse for a larger k (see (25)), a large number of transmissions at different angles are required to obtain high frequency components accurately. Compared to the two-way dynamic focusing with limited diffraction beam approach more transmissions may be needed to give an adequate coverage of the Fourier space.

4. Limited Diffraction Array Beams. If the following four limited-diffraction array beams are transmitted (fix both $k_{x_T}$ and $k_{y_T}$ for each transmission):

$$\Phi^T_{Array(1)}(\vec{r}_0, t) = \qquad (26)$$
$$\frac{1}{2\pi} \int_{-\infty}^{\infty} A(k)H(k)\cos(k_{x_T}x_0)\cos(k_{y_T}y_0)e^{ik_{z_T}z_0}e^{-i\omega t} dk,$$

$$\Phi^T_{Array(2)}(\vec{r}_0, t) = \qquad (27)$$
$$\frac{1}{2\pi} \int_{-\infty}^{\infty} A(k)H(k)\cos(k_{x_T}x_0)\cos(k_{y_T}y_0)e^{ik_{z_T}z_0}e^{-i\omega t} dk,$$

$$\Phi^T_{Array(3)}(\vec{r}_0, t) = \qquad (28)$$
$$\frac{1}{2\pi} \int_{-\infty}^{\infty} A(k)H(k)\sin(k_{x_T}x_0)\cos(k_{y_T}y_0)e^{ik_{z_T}z_0}e^{-i\omega t} dk,$$

and $$\Phi^T_{Array(4)}(\vec{r}_0, t) = \qquad (29)$$
$$\frac{1}{2\pi} \int_{-\infty}^{\infty} A(k)H(k)\sin(k_{x_T}x_0)\cos(k_{y_T}y_0)e^{ik_{z_T}z_0}e^{-i\omega t} dk,$$

one obtains four coverage areas in the spatial Fourier space of $f(\vec{r}_0)$ from combinations of the four echo signals. Denoting the Fourier transform of the four echo signals as $\tilde{R}_{k'_x,k'_y,k'_z}^{(1)}(\omega)$, $\tilde{R}_{k'_x,k'_y,k'_z}^{(2)}(\omega)$, $\tilde{R}_{k'_x,k'_y,k'_z}^{(3)}(\omega)$, and $\tilde{R}_{k'_x,k'_y,k'_z}^{(4)}(\omega)$, corresponding to (26)-(29), respectively, one has:

$$F_{BL}(k_x + k_{x_T}, k_y + k_{y_T}, k_z + k_{z_T}) = \qquad (30)$$
$$c^2 H(k)\left(\tilde{R}_{k'_x,k'_y,k'_z}^{(1)}(\omega) + i\tilde{R}_{k'_x,k'_y,k'_z}^{(2)}(\omega) + i\tilde{R}_{k'_x,k'_y,k'_z}^{(3)}(\omega) - \tilde{R}_{k'_x,k'_y,k'_z}^{(4)}(\omega)\right),$$

-continued $$F_{BL}(k_x + k_{x_T}, k_y - k_{y_T}, k_z + k_{z_T}) = \qquad (31)$$
$$c^2 H(k)\left(\tilde{R}_{k'_x,k'_y,k'_z}^{(1)}(\omega) - i\tilde{R}_{k'_x,k'_y,k'_z}^{(2)}(\omega) + i\tilde{R}_{k'_x,k'_y,k'_z}^{(3)}(\omega) + \tilde{R}_{k'_x,k'_y,k'_z}^{(4)}(\omega)\right),$$

$$F_{BL}(k_x - k_{x_T}, k_y + k_{y_T}, k_z + k_{z_T}) = \qquad (32)$$
$$c^2 H(k)\left(\tilde{R}_{k'_x,k'_y,k'_z}^{(1)}(\omega) + i\tilde{R}_{k'_x,k'_y,k'_z}^{(2)}(\omega) - i\tilde{R}_{k'_x,k'_y,k'_z}^{(3)}(\omega) + \tilde{R}_{k'_x,k'_y,k'_z}^{(4)}(\omega)\right),$$

$$F_{BL}(k_x - k_{x_T}, k_y - k_{y_T}, k_z + k_{z_T}) = \qquad (33)$$
$$c^2 H(k)\left(\tilde{R}_{k'_x,k'_y,k'_z}^{(1)}(\omega) - i\tilde{R}_{k'_x,k'_y,k'_z}^{(2)}(\omega) - i\tilde{R}_{k'_x,k'_y,k'_z}^{(3)}(\omega) - \tilde{R}_{k'_x,k'_y,k'_z}^{(4)}(\omega)\right).$$

Changing $k_{x_T}$ and $k_{y_T}$, one obtains partially overlapped coverage of the spatial Fourier domain because $k_x$ and $k_y$ are free to change. (11) can be used to perform the mapping between the echo Fourier domain and the Fourier domain of the object function for each transmission and the mapping will be discussed in the next section. Superposing the partially constructed images in spatial domain or their spectra in the spatial Fourier domain from different transmissions, one obtains the final image with (17). The superposition in spatial domain can be done either coherently (increase image resolution and contrast) or incoherently (reduce speckles). In frequency domain, the superposition can only be done coherently, which in theory, is equal to the superposition in the spatial domain. The superposition will also increase the field of view of the final image.

5. Steered Plane Waves. As discussed previously, (10) and (11) directly give a relationship between the ED Fourier transform of measured echo signals at the transducer surface and the 3D spatial Fourier transform of the object function for a steered plane wave transmission with fixed Axicon angle (steering angle for plane waves), $\zeta_T$, of X wave and azimuthal angle, $\theta_T$. (See "Spherical Coordinates Approach" above.)

After getting the spatial Fourier transform of the object function, using (17) one can reconstruct images with an inverse 3D Fourier transform. In the reconstruction, the same superposition schemes described above in the section of "Limited Diffraction Array Beams" can be used. The partially reconstructed images for each fixed pair of $\zeta_T$ and $\theta_T$ in either spatial Fourier or spatial domain can be used to increase image resolution, contrast, field of view, or reduce speckle noises.

Steer plane waves are useful to obtain a large field of view, increasing image resolution, or reducing speckles. Using the zeroth-order Hankel function, a relationship between the Fourier transform of echoes and the Fourier transform of an object function for 2D imaging is derived. From (13)-(16), it is clear that the relationship is a special case of (10) (for 2D imaging, one can simply set $k_y = k_{y_T} = 0$ in (10) and (11)).

For steered plane waves, one obtains the relationship of the parameters between the Fourier transform of the echoes and the object function (see (11) and (23)):

$$\begin{cases} k'_x = k_x + k\sin\zeta_T \cos\theta_T \\ k'_y = k_y + k\sin\zeta_T \sin\theta_T \\ k'_z = k_z + k\cos\zeta_T = \sqrt{k^2 - k_x^2 - k_y^2} + k\cos\zeta_T \geq 0 \end{cases} \quad (34)$$

2D High Frame Rate Imaging

(10) and (11) give a general 3D image reconstruction formula. They are readily suitable for 2D image reconstructions. Setting one of the transverse coordinates, say, $k_y = k_{y_T} = 0$, one obtains a 2D imaging formula:

$$F_{BL}(k'_x, k'_z) = c^2 H(k) \tilde{R}_{k'_x, k'_z}(\omega), \tag{35}$$

where $$\begin{cases} k'_x = k_x + k_{x_T} \\ k'_z = k_z + k_{z_T} = \sqrt{k^2 - k_x^2} + \sqrt{k^2 - k_{x_T}^2} \geq 0 \end{cases} \tag{36}$$

(35) and (36) are equations for reconstructions of images obtained with simulations aid experiments.

Relationship Between Fourier Domains of Echoes and Object Function

To reconstruct images with FFT, it is necessary to obtain the Fourier transform of the object function at rectangular grids of $(k'_x, k'_y, k'_z)$. However, the Fourier transform of echo data is known only on rectangular grids of $(k_x, k_y, k)$, which is related to $(k'_x, k'_y, k'_z)$ by (11). In this section, mapping of data with (11) will be given for two special cases (limited diffraction array beam and steered plane wave transmissions) for 2D imaging. They will be used in the reconstruction of images in both simulations and experiments in the later sections. Mappings for other special cases and for 3D can be done similarly.

A. Image Reconstruction with Limited Diffraction Array Beams

For limited-diffraction arrays beams, an inverse function of (36) can be derived:

$$\begin{cases} k_x = k'_x - k_{x_T} \\ k = \dfrac{\sqrt{(k'^2_z + k^2_{x_T} - (k'_x - k_{x_T})^2)^2 + 4k'^4_z(k'_x - k_{x_T})^2}}{2k'_z} \end{cases} \tag{37}$$

To exclude evanescent waves, both $|k_x| \leq k$ and $|k_{x_T}| \leq k$ must be satisfied in (36) (where $k \geq 0$). For limited diffraction array beam weighting, $k_{x_T}$ is a constant in each transmission. This means that the aperture weighting function is the same for all the frequency components, $k$, in each transmission. From these conditions, one set of boundaries in $(k'_x, k'_z)$ can be found by setting $k_x = k$ or $k_x = -k$ in (36):

$$(k'_x - k_{x_T})^2 - k'^2_z = k^2_{x_T}, \text{ if } k_x = k \text{ or } k_x = -k, \tag{38}$$

which is a hyperbolic function with its center shifted to $(k_{x_T}, 0)$. The hyperbolic function has two branches that intersect with $k'_x$ axis at two points, i.e., at $k'_x = 0$ and $k'_x = 2k_{x_T}$, respectively. Another boundary can be found by setting $k_{x_T} = k$ or $k_{x_T} = -k$ in (36), which gives a half circle centered at $(k_{x_T}, 0)$ with a radius of $|k_{x_T}|$ that intercepts with the hyperbolic curves at $(0, 0)$ and $(0, 2k_{x_T})$, respectively.

$$(k'_x - k_{x_T})^2 + k'^2_z = k^2_{x_T}, \text{ if } k_x = k \text{ or } k_x = -k. \tag{39}$$

If the imaging system is band limited, i.e., $k_{min} \leq k \leq k_{max}$, from (36) another two circular boundaries can be obtained:

$$(k'_x - k_{x_T})^2 + (k'_z - \sqrt{k_{min}^2 - k_{x_T}^2})^2 = k_{min}^2, \text{ if } k = k_{min} \geq k_{x_T}, \tag{40}$$

and $$(k'_x - k_{x_T})^2 + (k'_z - \sqrt{k_{max}^2 - k_{x_T}^2})^2 = k_{max}^2, \text{ if } k = k_{max} \geq k_{x_T}. \tag{41}$$

which further limit the size of the mapping area in $(k'_x, k'_z)$. As $k_{x_T}$ increases, low frequency components cannot be transmitted to illuminate objects, which could lower the energy efficiency. Outside of the boundaries, values at $(k'_x, k'_z)$ are simply set to 0 (see FIG. 2b (a) and 2b (b)). The mapping can be done with bilinear interpolation. To increase the interpolation accuracy, data in the Fourier domain of echoes can be densified by zero padding as long as the original data are not aliased.

For limited-diffraction array beam transmissions, both sine and cosine weightings are applied and thus the echoes need to be combined using 2D version of (30)-(33) to get two new sets of echoes before the mapping process above. The combination can be done in either echo or echo Fourier domain. Images can be reconstructed from the mapped data (see the text below (33)).

B. Image Reconstruction with Steered Plane Waves

Images can also be reconstructed with steered plane waves. To steer a plane wave, linear time delays are applied to transducer elements:

$$\tau(x_1) = -x_1 \sin \zeta_T / c, \tag{42}$$

where $x_1 \in (-D/2, D/2)$ is the position of the center of the element of an array transducer, D is the size of the transducer aperture, and $\zeta_T$ is the steering angle that is fixed for each transmission. To make the system causal, an additional constant delay, may be added to the delay function (42).

Assuming $k_{x_T} = k \sin \zeta_T$, from (36) or a 2D case of (34), one obtains an inverse function:

$$\begin{cases} k_x = k'_x - k \sin \zeta_T \\ k = \dfrac{k'^2_z + k'^2_x}{2k'_z \cos \zeta_T + 2k'_x \sin \zeta_T} \end{cases} \tag{43}$$

where the parameters are explained in (34). To exclude evanescent waves, the condition for steered plane waves is $|k_x| \leq k$ (notice that $k \geq 0$ and $|\zeta_T| < \pi/2$). With this condition, one set of boundaries in $(k'_z, k'_x)$ can be determined by setting $k_x = k$ and $k_x = -k$, respectively, in (36):

$$\begin{cases} k'_z = \dfrac{\cos \zeta_T}{\sin \zeta_T + 1} k'_x, \text{ if } k_x = k \\ k'_z = \dfrac{\cos \zeta_T}{\sin \zeta_T - 1} k'_x, \text{ if } k_x = -k \end{cases} \tag{44}$$

If the imaging system is band limited, i.e., $k_{min} \leq k \leq k_{max}$, another two boundaries can be added using (36) and $k_{x_T} = k \sin \zeta_T$:

$$\begin{cases} (k'_x - k_{min} \sin \zeta_T)^2 + (k'_z - k_{min} \cos \zeta_T)^2 = k_{min}^2, \text{ if } k_x = k_{min} \\ (k'_x - k_{max} \sin \zeta_T)^2 + (k'_z - k_{max} \cos \zeta_T)^2 = k_{max}^2, \text{ if } k_x = k_{max} \end{cases} \tag{45}$$

Figure 2B:
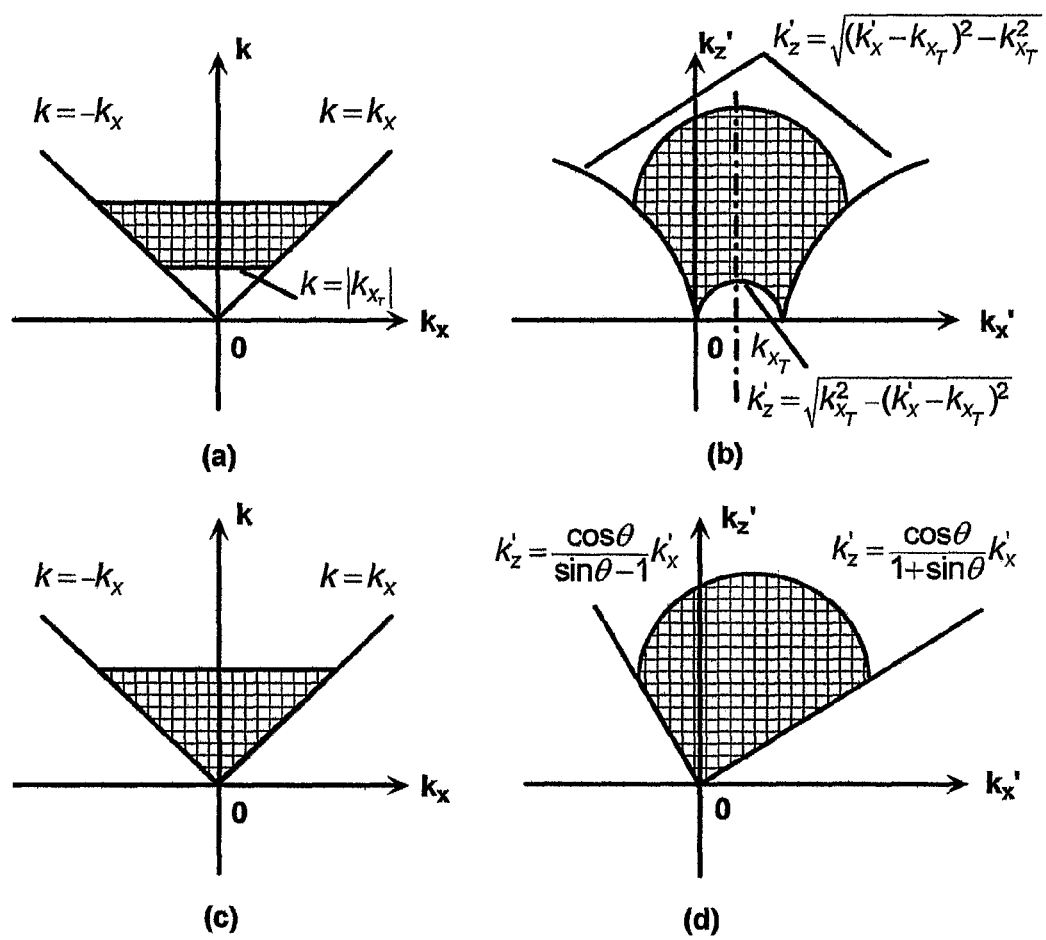
FIG. 2*b* is a schematic illustration showing mapping between the Fourier transform of echo signals ((a) and (c)) and the Fourier-transform of an object function ((b) and (d)), for limited-diffraction array beam ((a) and (b)) and steered plane wave ((c) and (d)) transmissions.

Outside of the boundaries, values at $(k'_x, k'_z)$ are simply set to 0 (see FIG. 2b(c) and 2b(d)). Similar to the limited-diffraction arrays beam case, the mapping can be done with the bilinear interpolation. To increase the interpolation accuracy, data in the Fourier domain of echoes can be densified with zero padding as long as the original data are not aliased.

EXAMPLES

Example A

Mathematical Examples

To verify the extended HFR imaging theory in ideal conditions, computer simulations were performed. For simplicity, only 2D imaging will be considered. The simulation algorithms are developed based on the impulse response methods.

In the simulations, a 128-element, 1D linear array transducer of 3.5 MHz center frequency and 58%-6 dB pulse-echo fractional bandwidth defined bus the square of the Blackman window function is assumed. A one-cycle sine wave pulse at the center frequency of the transducer is used to excite the transducer. The dimensions of the transducer are 0.32 mm (pitch), 8.6 mm (elevation width), and 40.96 mm (aperture length), respectively. The pitch is about ¾ of the center wavelength of the transducer. There is no elevation focus for the transducer.

Figure 3:
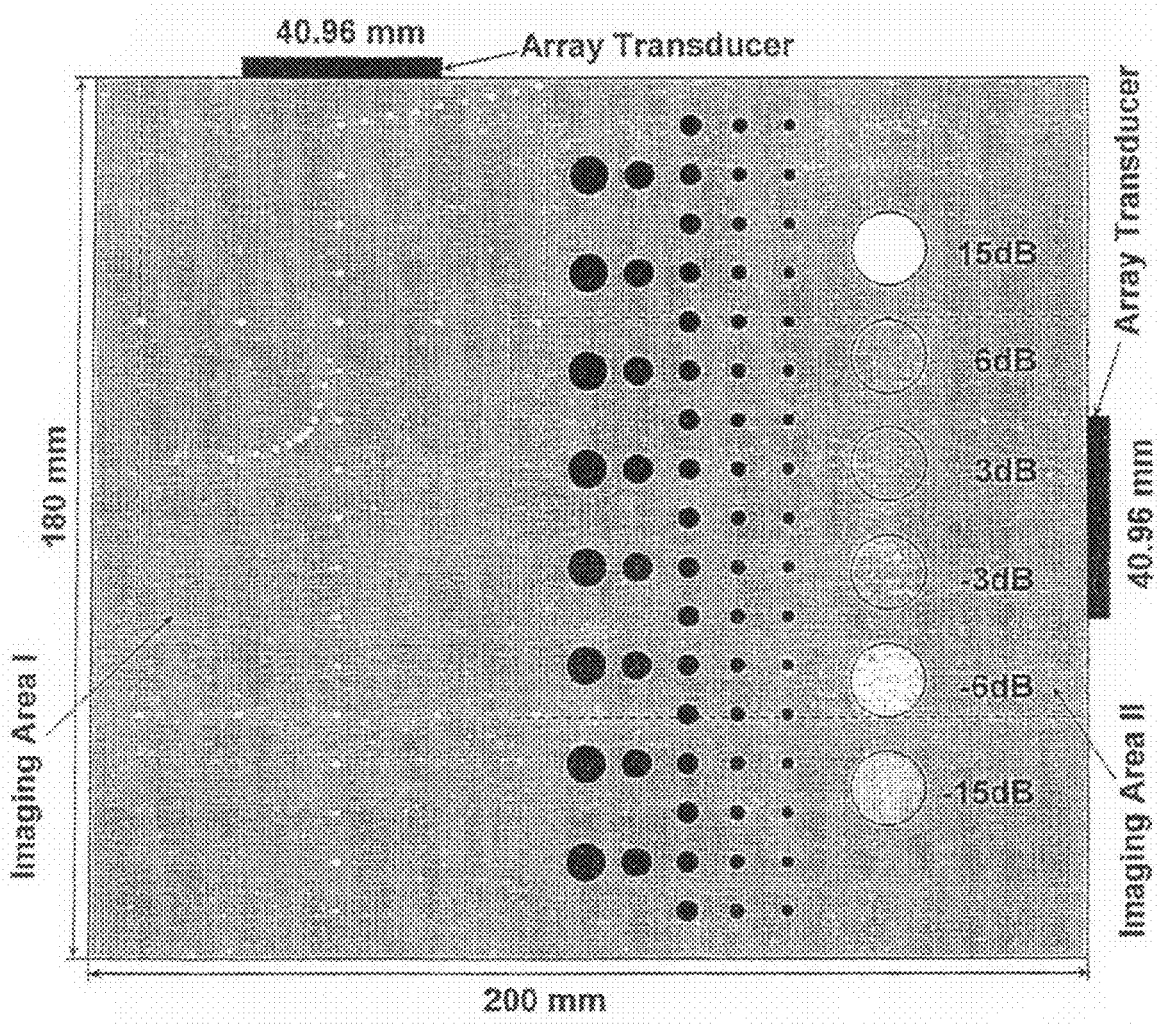
FIG. 3 is an illustration showing structure and imaging areas of an ATS539 multipurpose tissue-mimicking phantom.

Two objects are used in the simulations. One is based on the wire pattern of the ATS539 (ATS Laboratories, Inc.) multipurpose tissue-mimicking phantom (see imaging Area I and the position of the transducer in FIG. 3). There are 40-wire targets in this imaging area, each wire is represented with a point scatterer and all point scatterers are assumed to have the same scattering coefficient. The second object consists of 18 point-scatterers of the same scattering coefficient. The point scatterers are aligned along three lines with 6 point-scatterers in each line, evenly spaced with 20-mm spacing. The first line is perpendicular to the transducer surface and the other two are at 15 and 30 degrees from the first line, respectively. The center of the transducer is aligned with the first line.

Figure 6:
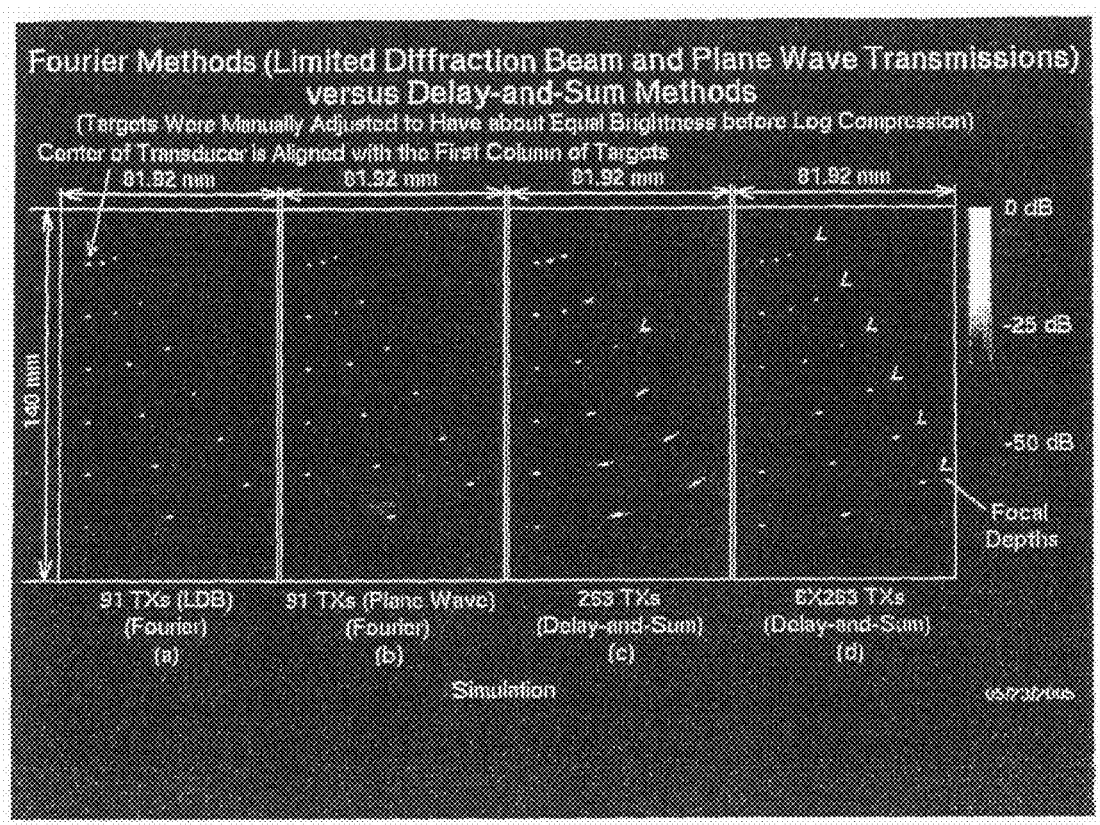
FIG. 6 shows simulated images for 18 point scatterers on three lines with 15 degrees between the lines. Six point scatterers are distributed evenly over each line with 20 mm spacing. The log compression, image panel size, and the parameters of the transducer are the same as those in FIG. 4. Image reconstructed with: (a) limited-diffraction array beam transmissions (91 transmissions up to 59 frames/s); (b) steered plane wave transmissions; (c) D&S method with a fixed focal depth at 60 mm (263 transmissions up to 20 frames/s); and (d) D&S method with a dynamically focused transmission synthesized using a montage process.

The geometry of the object is the same as that of the constructed image in FIG. 6(a), except that the points in FIG. 6(a) are not exactly geometrical points.

Figure 4:
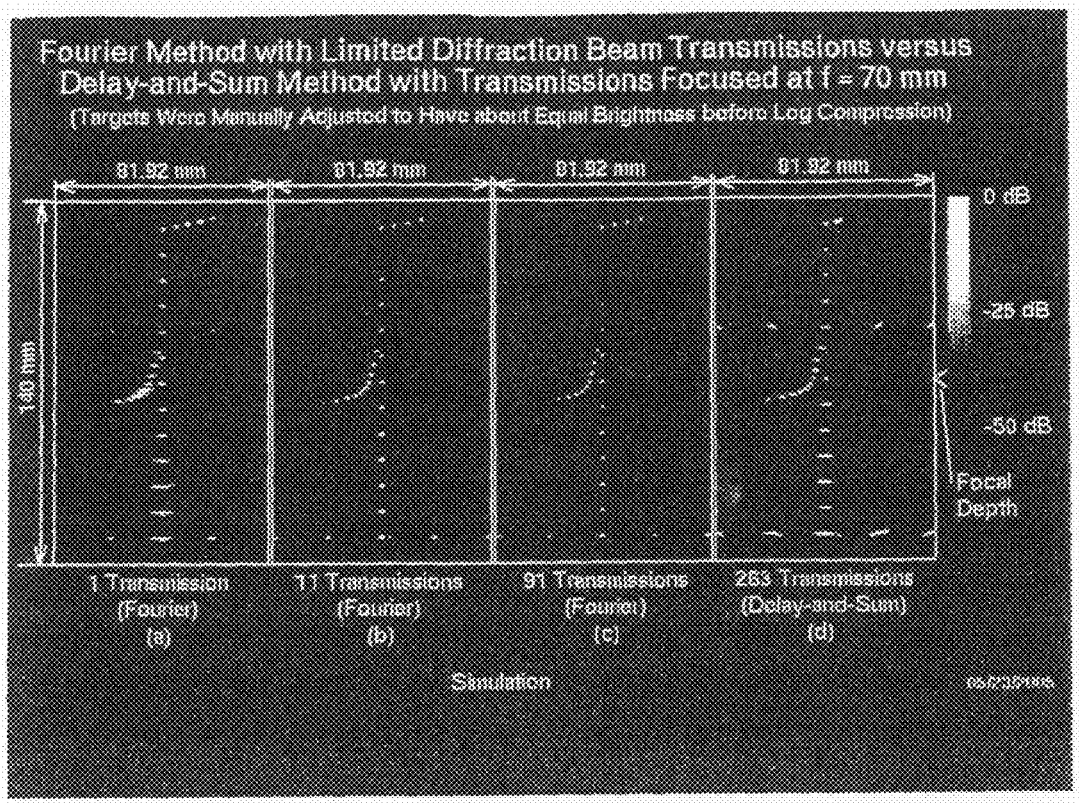
FIG. 4 shows simulated images according to the imaging Area I of the ATS539 phantom (see FIG. 3). Images are reconstructed with limited-diffraction array beam transmissions. Images are log-compressed at 50 dB. The transducer has 128 elements, 40.96 mm aperture, 0.32 mm pitch, 3.5 MHz center frequency, and 58% −6 dB pulse-echo bandwidth. The area of each image panel is 81.92×140 mm. Images are obtained with (a) 1 (up to 5500 frames/s with 1540 m/s speed of sound), (b) 11 (up to 500 frames/s), and (c) 91 (up to 60 frames/s) transmissions, respectively. (d) Result obtained with the conventional delay-and-sum (D&S) method with a fixed transmission focal depth of 70 mm and with 263 transmissions (up to 21 frames/s).
Figure 5:
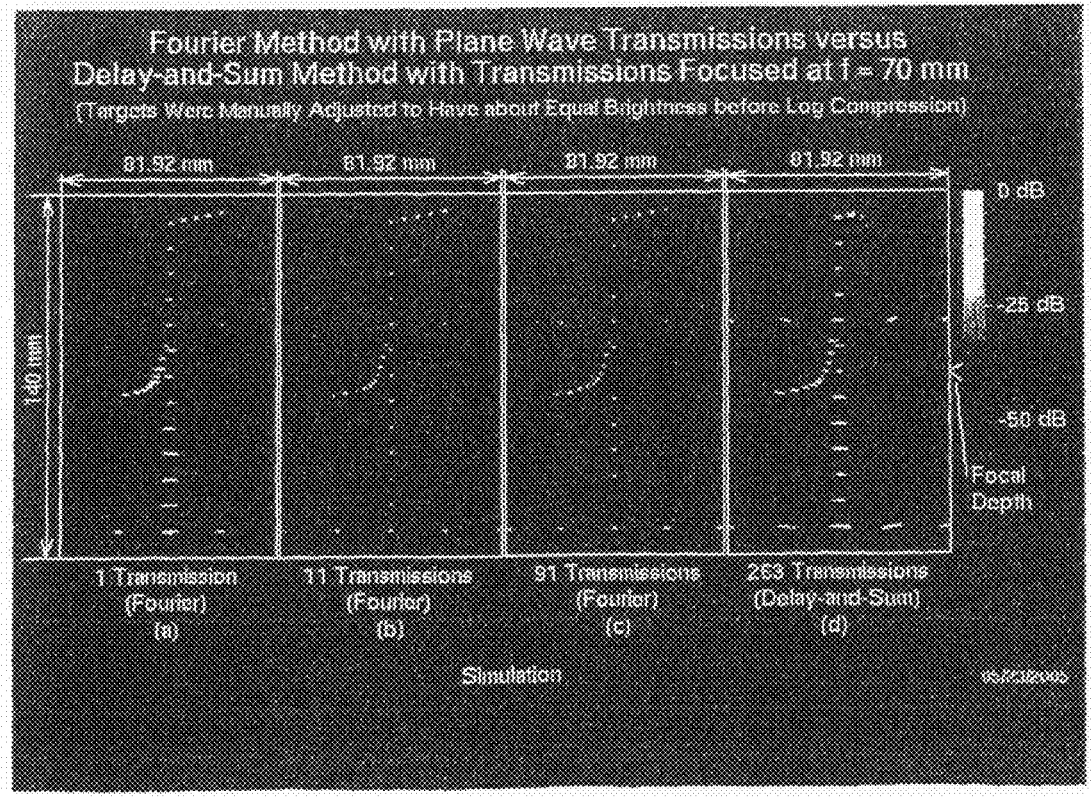
FIG. 5 is the same as FIG. 4 except that steered plane waves are used in transmissions, instead of limited-diffraction array beams.

Constructed images of the first object are shown in FIGS. 4 and 5 with limited-diffraction array beams and steered plane waves in transmissions, respectively. In each figure, there are four panels for images constructed with (a) one transmission (up to 5500 frames/s with a speed of sound of 1540 m/s), (b). 1 transmissions (up to 500 frames/s). (c) 91 transmissions (up to 60 frames/s), and (d) 263 transmissions (up to 21 frames/s), respectively, for a depth of 140 mm.

As a comparison, panel (d) in both figures is the same and is obtained with the conventional D&S method with its transmission focus at 70 mm.

For limited diffraction array beam transmissions, the maximum value of $k_{x_T}$ is calculated with $k_{x_T\_max} = \pi/\Delta x_1$, where $\Delta x_1$ is the pitch of the transducer. Since both sine and cosine aperture weightings are needed for each $k_{x_T}$, a total of 46, 6, and 1 $k_{x_T}$, equally spaced from 0 to $k_{x_T\_max}$, are used to produce the results with 91, 11, and 1 transmissions, respectively (for 1 transmission, $k_{x_T}=0$). For steered plane waves, 91, 11, and 1 transmissions, evenly spaced with the condition $|\zeta_T| \leq \pi/4$, are used to produce the results (for 1 transmission, $\zeta_T=0$). For conventional D&S method, the following formula is used to obtain the evenly spaced sine of the steering angles (there are less transmissions at larger angles than at smaller ones):

$$\sin\theta_n = n(\lambda_0/2)/D, n=0, \pm1, \pm2, \ldots, \pm(N-1)/2, \quad (46)$$

where $\theta_n$, is nth-steering angles $\lambda_0$ is the center wavelength, D is the aperture size of the transducer. For $\theta_n$ to cover $\pm 45°$, with an assumption of the speed of sound of 1540 m/s, one obtains N=263.

For 91 transmissions, it is seen from FIGS. 4 and 5 that image resolution is high and sidelobe is low (images are log-compressed in 50 dB) for both limited diffraction array beam and steered plane wave transmissions as compared to the conventional D&S method. Even with one transmission, the results are still comparable to that of D&S except at the transmission focal depth. The results for limited-diffraction array beam and steered plane wave transmissions are similar except that the former has a somewhat higher resolution.

Simulations with the second object are done to compare the image quality of both limited diffraction arrays beam and steered plane wave transmissions with the conventional D&S method of transmission focusing at all depths (dynamic transmission focusing). For D&S method, dynamic focusing in transmission is achieved with a montage process, i.e., cutting a strip of each constructed image around its focal distance and then piecing all the strips together to form a synthesized image. Apparently, this process lowers image frame rate dramatically. Despite the added complexity and a low frame rate, the resolution of the D&S method with the montage process (FIG. 6(d)) is lower than that of either limited-diffraction array beam (FIG. 6(a)) or steered plane wave (FIG. 6(b)) method with 91 transmissions. The D&S method with a fixed transmission focus (FIG. 6(c)) has the worst result. It should be mentioned that both limited-diffraction array beam and steered plane wave methods have high computation efficiency due to the use of FFT (the difference is on how to transmit—sine and cosine weighting are used to produce limited diffraction array beams, while linear time delay is used to produce a steered plane wave).

Examples B and C

In Vitro and In Vivo Examples

To test the extended HFR imaging theory in practical situations, both in vitro and in vivo experiments are carried out with a homemade high frame rate (HFR) imaging system.

Example System and Conditions

A HFR imaging system was designed and constricted in our lab and was used for all the experiments. Tins system has 128 independent, wideband (0.05 MHz-10 MHz) arbitrary waveform generators (power amplifiers), and each of them has a 40 MHz 12-bit D/A as its input and produces up to ±144V output at a 75Ω load. The system also has 128 independent receiving channels, and each has a low-noise time-gain-control (TGC) amplifier of up to 108 dB gain and 10 MHz bandwidth (0.25 MHz-10 MHz) Each channel also has a 12-bit A/D of 40 MHz sampling rate and an SDRAM of up to 512 MB for storing digitized echo signals. Data are transferred through a USB 2.0 (high-speed) link to a PC for image construction. The system operation is controlled by the PC using the same USB link.

In the experiment, a one-cycle sine wave at the center frequency of the transducer is used to excite the transducer. For limited-diffraction array beam transmissions, array, transducers are weighted with either sine or cosine function of different parameters, $k_{x_T}$. For steered plane wave or conventional D&S methods, linear time delay s are applied to the transducers to steer the beams. The precision of the time delay of the system is 6.2-5 ns, which is determined by a 160 MHz clock. In receive mode, signals are digitized at the same time at 40 MHz sampling rate. During image reconstruction, signals can be down sampled to 10 MHz for both limited diffraction array beam and steered plane wave methods. However, the D&S method requires 40 MHz to ensure image reconstruction quality.

Example B

In Vitro Examples

Figure 7:
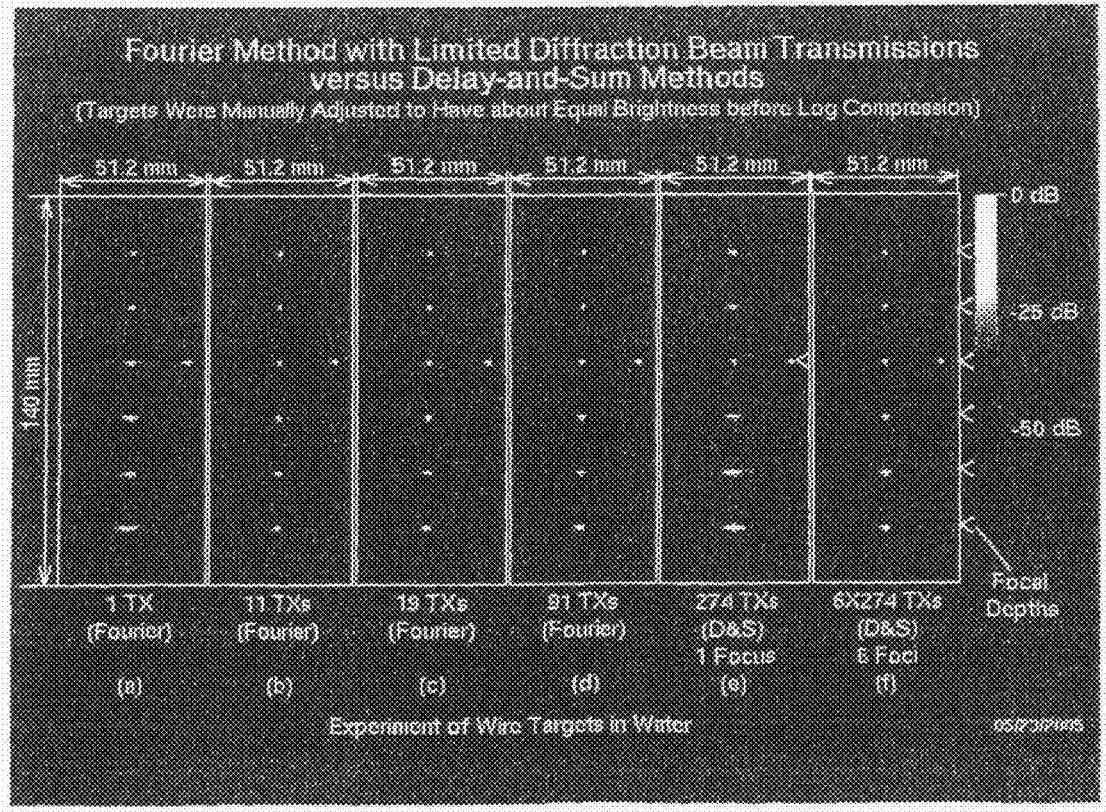
FIG. 7 shows experiment results of a wire phantom in water. Images are reconstructed with limited-diffraction array beam transmissions. There are 7 wires in total with 6 wires in a line and one wire on the third row 20 mm to the right of the line. The image panel size is 51.2×140 mm. The 6 wires are evenly distributed with 20 mm spacing. The log compression and the parameters of the transducer are the same as those in FIG. 4, except that the −6 dB pulse-echo bandwidth of the transducer is about 50%, instead of 58%, of the center frequency. Images are obtained with (a) 1 (up to 5277 frames/s, with 1477.56 ms speed of sound), (b) 11 (up to 479 frames/s), (c) 19 (up to 278 frames/s), and (d) 91 (up to 58 frames/s) transmissions, respectively. (e) Result obtained with the D&S method with a fixed transmission focal depth of 60 mm and with 274 transmissions (up to 19 frames/s); and (f) Result of the D&S method with a dynamically focused transmission synthesized with a montage process.
Figure 8:
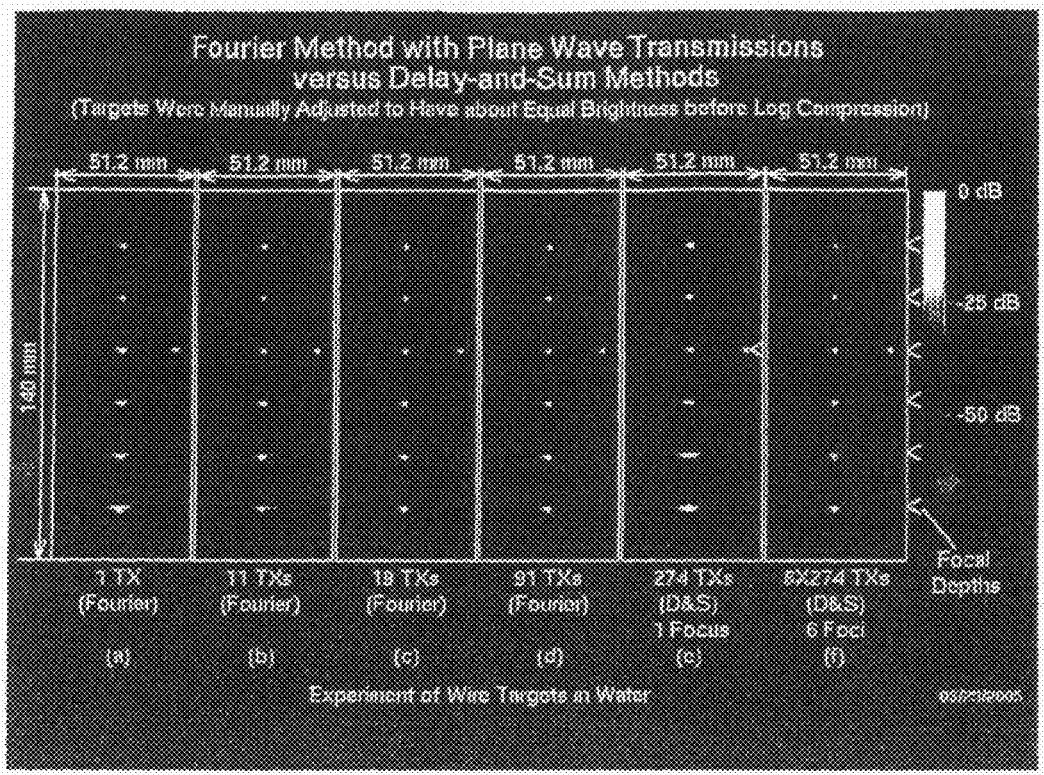
FIG. 8 shows the same as FIG. 7 except that steered plane waves are used in transmissions instead of limited-diffraction array beams.

In the in vitro experiments, the same array, transducer as in the simulations is used, except that the real transducer has a bandwidth of about 50%, instead of 58% of the center frequency. Other imaging parameters for the experiments are also the same as those in simulations. To show the line spread function of the imaging methods, a homemade wire phantom consisting of six nation wires (0.25 mm in diameter) in a line with an inter-wire spacing of 20 mm is used and images constructed with limited-diffraction array beam and steered plane wave transmissions are shown in FIGS. 7 and 8, respectively. (There is one more wire in the third row that is 20 mm away from the line.)

To show how image frame rate trades off with improved image quality, results for 1 (up to 5277 frames/s with a speed of sound of 1477.56 m/s, Panel (a)), 11 (up to 479 frames/s. Panel (b)), 19 (up to 278 frames/s, Panel (c)), and 91 (up to 58 frames/s, Panel (d)) transmissions are obtained. For comparison, results of conventional D&S method with a fixed transmission focus of 60 mm and synthesized dynamic transmission focusing with montage are shown in Panel (e) and (If, respectively (see FIGS. 7 and 8). In the experiment, the temperature in water tank is about 18.5 degree Celsius and thus the speed of sound is about 1477.56 m/s. According to (46), this gives the number of transmissions of 274 (up to 19 frames/s) for a fixed focus D&S method. The experiment results are verge similar to those of simulations.

Figure 9:
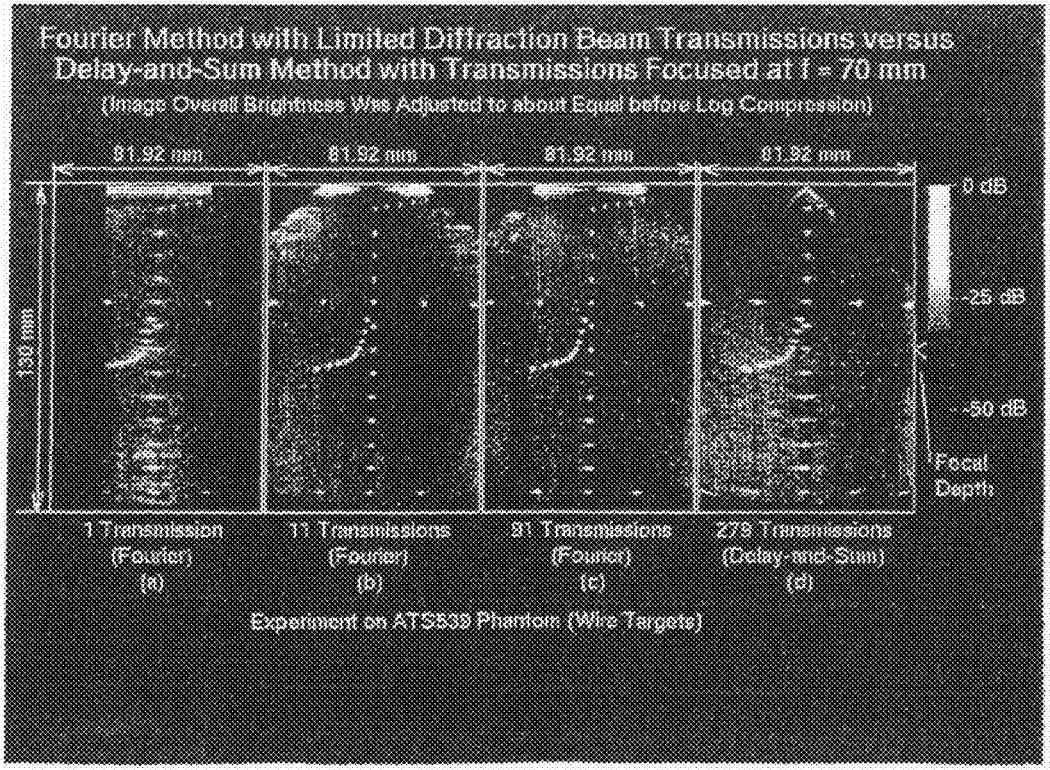
FIG. 9 shows the same as FIG. 4 except that these are experiment results from a real ATS539 phantom on imaging Area I (see FIG. 3) using a real transducer. The speed of sound of the phantom is 1450 m/s and the −6 dB pulse-echo bandwidth of the transducer is about 50% of the center frequency.
Figure 10:
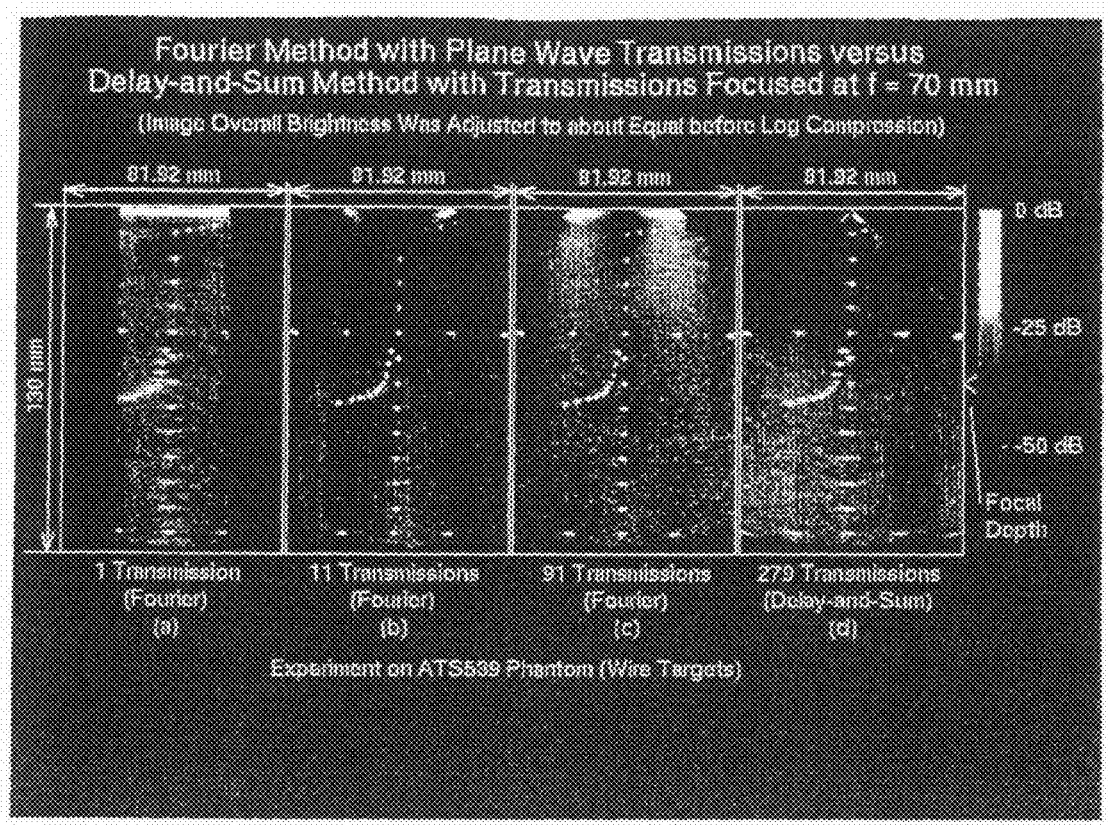
FIG. 10 shows the same as FIG. 9 except that steered plane waves are used in transmissions instead of limited-diffraction array beams.

Experiment results of the imaging Area I (see FIG. 3) of the ATS539 multifunction tissue-mimicking phantom are shown in FIGS. 9 and 10, respectively. The phantom has 0.5 dB/cm/MHz attenuation and the speed of sound is 1450 m/s. The line targets of the monofilament nylon have a diameter of 0.12 mm. The results are similar to those obtained in the computer simulations (compare FIGS. 9 and 10 with FIGS. 4 and 5, respectively).

Figure 11:
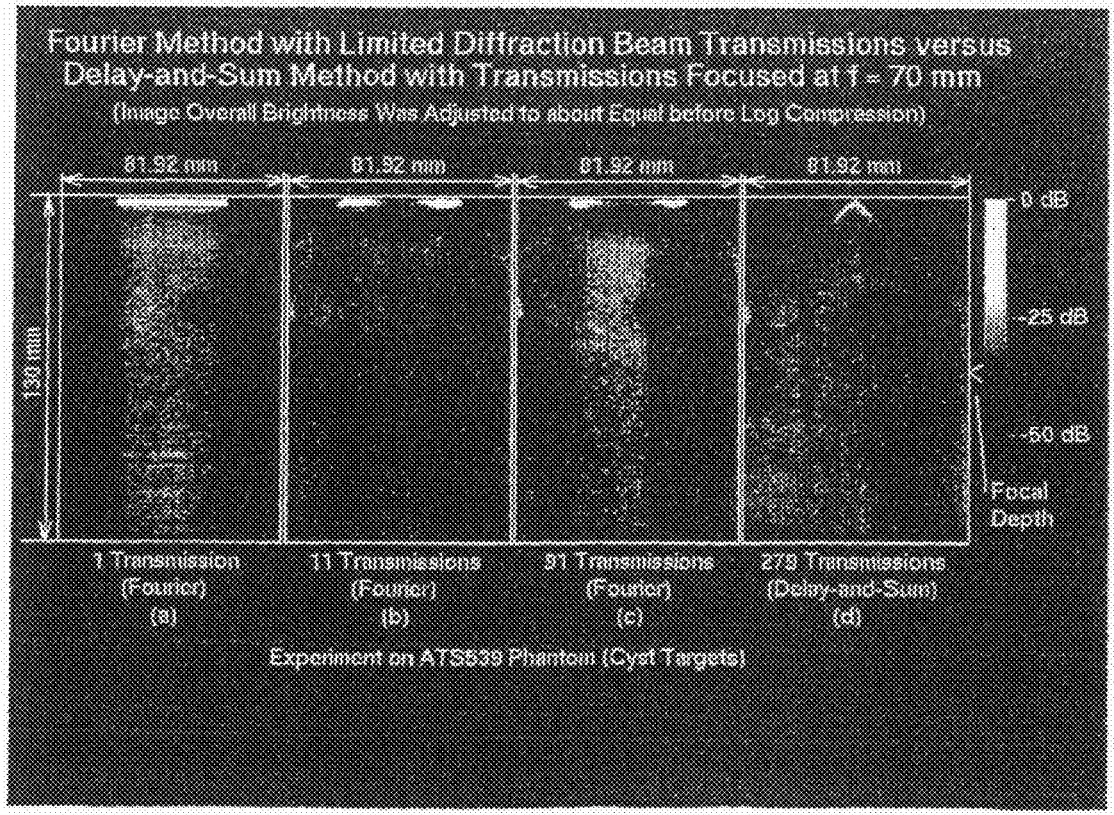
FIG. 11 shows the same as FIG. 9 except that the imaging Area II of cystic objects of the ATS539 phantom (see FIG. 3) is used in the experiments.
Figure 12:
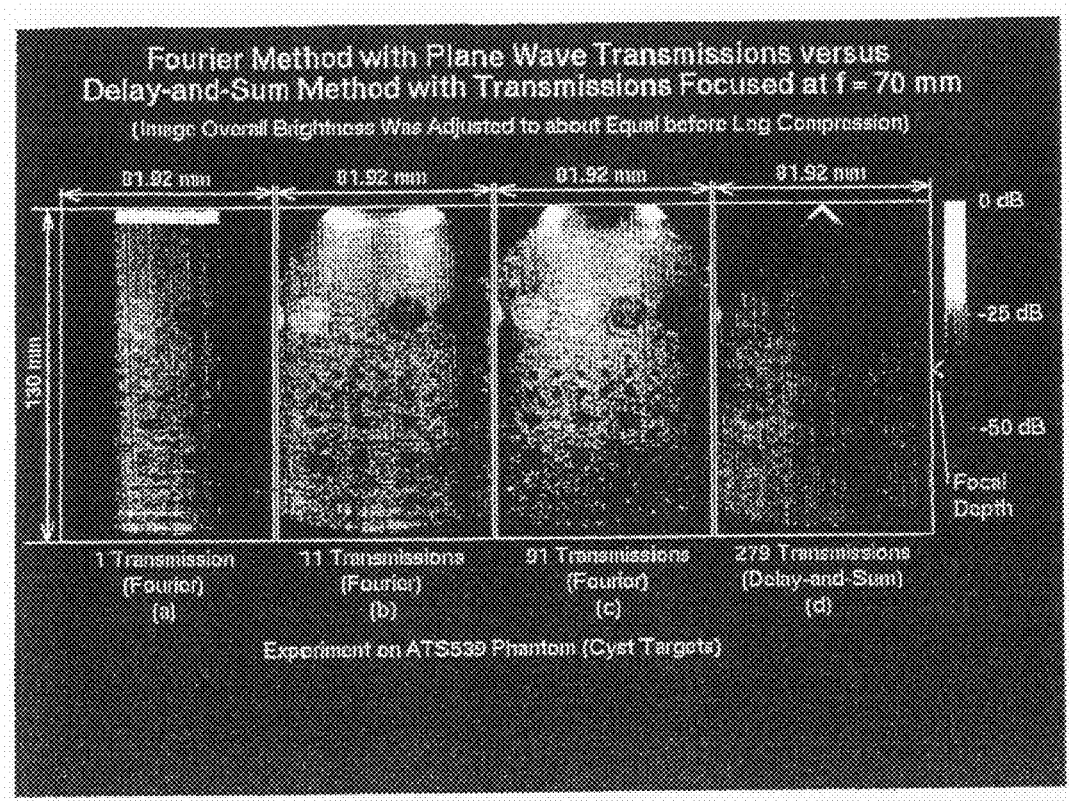
FIG. 12 shows the same as FIG. 11 except that steered plane waves are used in transmissions instead of limited-diffraction array beams.

The ATS539 phantom also contains anechoic cylindrical cysts with diameters of 2, 3, 4, 6 and 8 mm, respectively. In addition, there are six 15 mm diameter grayscale cylindrical targets, with their contrasts to background of +15, +6, +3, −3, −6, and −15 dB, respectively. Experiment results of imaging Area II (see FIG. 3) are shown in FIGS. 11 and 12, respectively, for limited diffraction array beam and steered plane wave transmissions (with 1, 11, and 91 transmissions). For comparison, image with D&S method with a focal depth of 70 mm is shown in Panel (d) of both FIGS. 11 and 12.

It is seen that as the number of transmissions increases image contrast is increased significantly for both limited-diffraction array beam and steered plane wave transmissions. Because the noise of the HFR imaging system is relatively high, the contrast of cystic targets is lowered because the noise fills into the cystic areas. This is more acute for limited-diffraction array beam transmissions where the sine or cosine weightings further reduce the transmission power by half. In addition, when $k_{x_T}$ is fixed in a limited-diffraction array beam transmission, a lower transmission frequency may have a larger spreading angle further reducing energy density although the image field of views could be increased. Furthermore, with a large $k_{x_T}$, low frequency components become evanescent waves and cannot be transmitted. Nonetheless, limited-diffraction array beam transmissions may simplify the transmitters because there is no time or phase delay, that is needed to steer the beam and may have other advantages as mentioned in the Introduction.

Example C

In Vivo Examples

In the in vivo experiments an Acuson V2 phased arrant transducer is used. The in vivo experiments are performed with the right kidney, and the heart of a healthy volunteer. The transducer has 128 elements, 2.5 MHz center frequency, 19.2 mm aperture, 14 mm elevation dimension focused at 68 mm depth, and 0.15 mm pitch. Given these parameters and (46), the number of transmissions required for the D&S method is 88 (assuming the speed of sound is 1540 m/s) to cover ±45° steering angles. The transmission beam is focused at 70 mm and the imaging depth is 120 mm.

In the experiments, a commercial Acuson 128XP/10 is used for real-time feedback for operators. Once the structure of interest is found, the transducer position is fixed by a fastener and the transducer is unplugged from the Acuson machine and then plugged into the HFR imaging system for data acquisition. Data are acquired at the highest frame rate that the FOR imaging system is allowed for the depth (187 μs between transmissions or 5348 frames/s). Because of motion of the organs, to obtain images at approximately the same vie for comparison, different transmission methods are programmed to follow, immediately one after another. For kidney (FIG. 13), 91 steered plane wave transmissions start as soon as 88 D&S transmissions are completed. For heart (FIG. 14), the imaging sequence is that the 88 (61 frames/s, see Panel (d)) D&S transmissions are finished first, followed by 11 (486 frames/s, see Panel (a)), 19 (281 frames/s, see Panel (b)), and 91 (59 frames/s, see Panel (c)) transmissions of the steered plane wave method. The data acquisition of the heart is triggered and synchronized by an electrocardiograph (ECG) signal to get images at the desired heart cycle moments (see the ECG display on the right hand side of FIG. 14).

Figure 13:
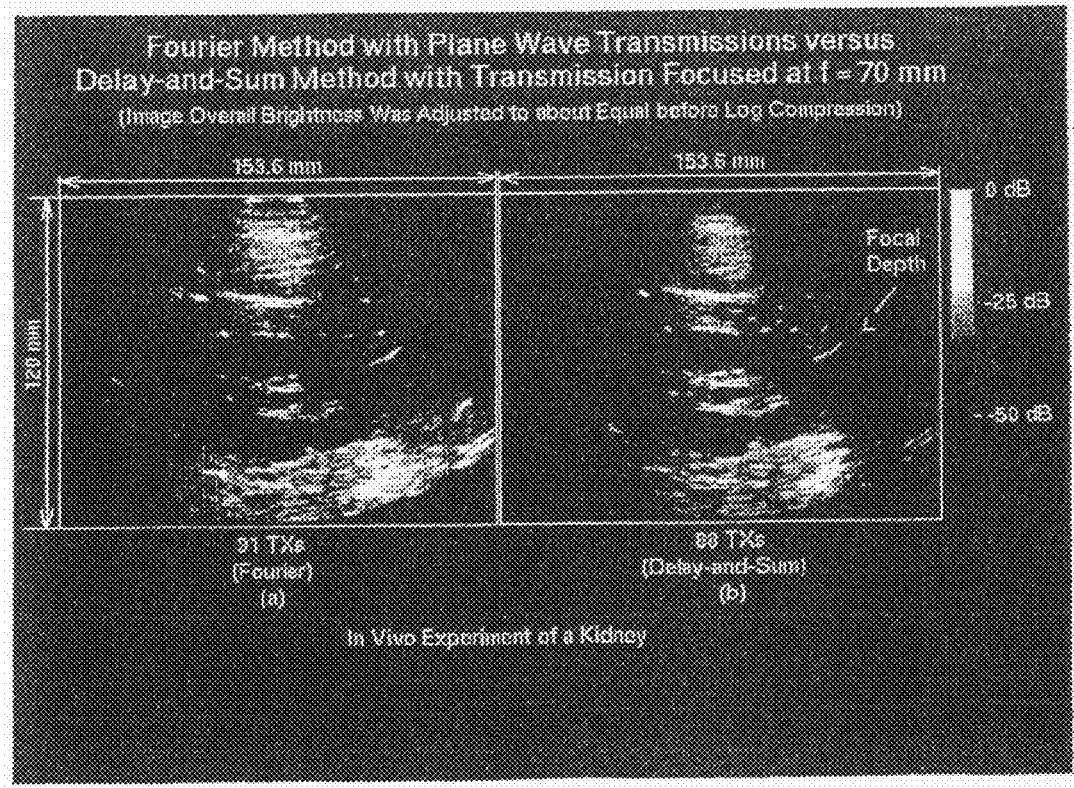
FIG. 13 shows the results of In vivo experiments of a right kidney of a volunteer. An Acuson V2 probe of 128 element, 2.5 MHz center frequency, 19.2 mm aperture, 0.15 mm pitch, and 14 mm elevation with 68 mm elevation focal depth is used. The depth of images is 120 mm. Data are acquired at the highest frame rate that the HFR system is allowed for the depth (187 µs between transmissions or 5348 frames/s for a speed of sound of 1540 m/s). (a) Image reconstructed with 91 steered plane wave transmissions (59 frames/s). (b) Image reconstructed with the D&S method with a fixed focal depth of 70 mm and 88 transmissions (61 frames/s).
Figure 14:
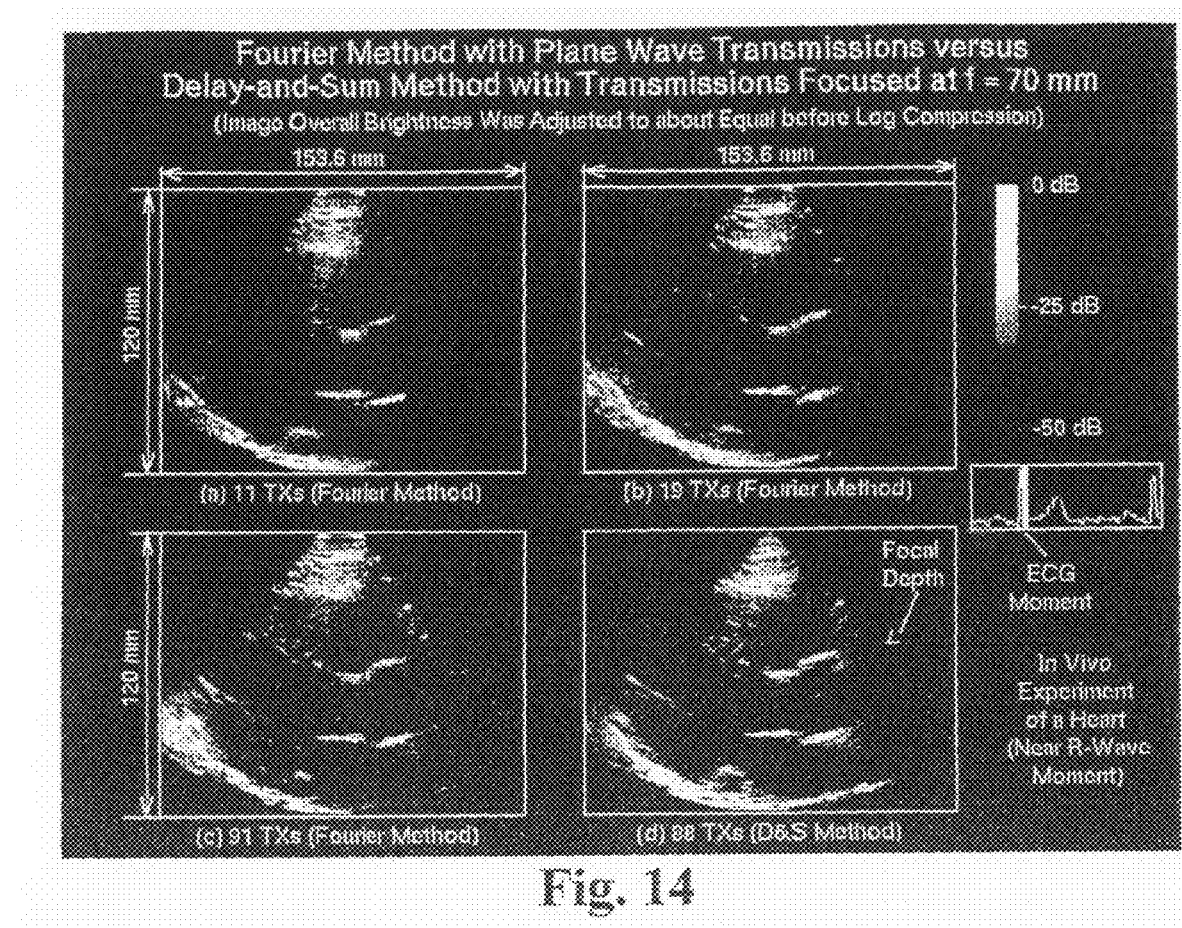
FIG. 14 shows the results of In vivo experiments of the heart of a volunteer. The transducer parameters, the depth of images, and the settings of the HFR imaging system are the same as those in FIG. 13. Data acquisition of the heart is triggered and synchronized by an electrocardiograph (ECG) signal to get images at the desired heart cycle moments (see the ECG display on the right hand side panel). Image reconstructed with (a) 11 (486 frames/s), (b) 19 (281 frames/s), and (c) 91 (59 frames/s) steered plane wave transmissions. (d) Image reconstructed with the D&S method with a fixed focal depth of 70 mm and 88 transmissions (61 frames/s).

From both FIGS. 13 and 14, it is seen that the steered plane wave with 91 transmissions produces images that are better in both resolution and contrast than the conventional D&S method of similar number of transmissions. For the heart imaging, it is seen that the image quality can be traded off with frame rate. Motion artifacts were a concern for the extended high frame rate imaging theory when more than one transmission is used, however, from the in vivo heart images, it seems that the extended theorem is not very sensitive to the motion. This is because the high frame rate imaging theory allows one transmission to reconstruct a complete image, i.e., the quality of each sub-image is not affected by the motion, and the heart does not move that fast to distort the image when sub-images obtained from different transmissions are superposed. In our experiment, only 91 transmissions are used. This translates into a time span of 91×187 μs=17.017 ms. Assuming the highest speed of the heart motion is about 0.2 m/s, the maximum registration error of sub-images would be about 3.4 mm. Furthermore, at a larger distance, the image resolution is generally poor and the sub-images will not overlap after a fraction of the total number of transmissions. This makes motion artifacts less noticeable. In addition, most part of heart tissues moves at a much lower speed than the peak velocity assumed above.

Example D

Fourier Based Imaging Method with Steered Plane Waves and Limited-Diffraction Arrant Beams The imaging system also overcomes the shortcomings of synthetic aperture focusing, which suffers from low transmission power, shallow penetration, and loss signal to noise ratio. In some configurations, a mechanical scanning system is required, which limits the achievable frame rate. In an attempt to overcome drawbacks of synthetic aperture imaging and take advantage of the computation efficiency of the Fast Fourier Transform, a high frame rate imaging method based on limited diffraction beams was proposed where a single plane wave was used in transmission and limited diffraction weightings were used in reception to achieve dynamic receive focusing. Although a high imaging frame rate can be achieved with this method, sidelobe is higher due to the lack of transmission focusing.

With the present imaging system, a Fourier-based imaging method is used to achieve a variable imaging frame rate. Multiple steered plane waves or limited diffraction array beams are used in transmission and Fast Fourier Transform is applied to received echo signals to construct images of an increased resolution and a lower sidelobe. When one transmission is used, the results produced are similar to those produced by the previous high frame rate method. However, at slightly lower frame rates, image quality improves significantly. At a lower frame rate, such as about 60 frames/s for a depth of 120 mm, images are constructed with a higher quality than the conventional delay-and-sum method where only one transmission focal distance is allowed to achieve a comparable frame rate. Both computer simulations and experiments were performed. In the experiments, a high frame rate imaging system was used to collect radio-frequency (RF) echo data from an ATS539 tissue-mimicking phantom and from the heart of a healthy volunteer. Images were constructed at different frame rates. The experiment results agree with both the theory and computer simulations.

Example E

Contrast and Resolution Study of Fourier-Based Method

A variable frame rate imaging method based on Fourier transformation thus increases the resolution and reduces sidelobe formation. In this example, multiple transmissions are used to construct a single frame of image.

The Fourier-based method was compared to the conventional delay-and-sum method. A point object was placed in a water tank and a 2.5 MHz, 19.2 mm aperture, and 128-element array transducer was used. Radio frequency (RF) echoes were obtained with a high frame rate imaging system designed and constructed by us. Data were used to construct images with both the Fourier-based method of various numbers of transmissions (1, 11, 19, and 91 transmissions) and the conventional delay-and-sum dynamic focusing method (dynamically focused in reception while the transmission focal distance changes with the depths studied) of 91 transmissions (93 transmissions for the contrast study, below). Image resolution and sidelobe were studied at two depths, 38 and 70 mm, respectively from the surface of the transducer.

In addition, a custom built, modified ATS512 contrast-detail tissue-mimicking phantom was used to study the contrasts of the image construction methods. The phantom contains eight cones with a varying diameter from 15 mm to 2 mm over a distance of 100 mm. The contrasts of the 8 cones relative to their background are −15, −10, −5, −2, 2, 4, 7.5, and 12 dB, respectively. Images were constructed for each cone at four different diameters, 15, 10.45, 5.9, and 2 mm, respectively, and the centers of the cones were at about 38 mm from the surface of the transducer.

Results show that side lobe of constructed images of the point object decreases as the number of transmissions increase for the Fourier-based method (from −36 to −65 dB versus −61 dB of the delay-and-sum method focused at 38 mm). At 70 mm, the sidelobe changes from −30 to −55 dB for the Fourier-based method and −49 dB for the delay-and-sum method focused at 70 mm. −6 dB. Image resolution increases (from 0.75 mm to 0.56 mm versus 0.64 mm of the delay-and-sum method) as the number of transmissions increases, but decreases as the depth increases. The contrast study shows a correlation between the variations of contrasts and the sidelobes of the images. Higher sidelobes lead to a decreased contrast for various object sizes.

The Fourier-based method of the present invention provides a continuous compromise between image frame rate and image quality. At a similar frame rate, such as 91 transmissions, the Fourier-based method has a higher resolution, and lower sidelobe than the conventional delay-and-sum method around its transmission focal distance where the image quality is the highest.

Example F

Motion Artifacts of Fourier-Based Image Construction

Only one plane wave transmission is needed to construct a frame of two-dimensional (2D) or three-dimensional (3D) ultrasound image at a frame rate up to 3750 frames/s for biological soft tissues at a depth of 200 mm. The ultrahigh frame rate is useful for imaging fast moving objects such as mitral valve of the heart and getting blood flow vector images. In addition, because fast Fourier transform (FFT) and inverse fast Fourier transform (IFFT) are used in image reconstruction, hardware can be greatly simplified due to reduced computations, especially, in 3D imaging.

Although the HFR imaging method has some advantages, its sidelobe is relatively high due to a lack of transmission focusing. In addition, image field of view is relatively small (same as the transducer aperture). To reduce sidelobe and increase field of view and image resolution, the HFR imaging theory was extended recently to include multiple steered plane waves or limited diffraction beams in transmission. In addition, it was proved that limited diffraction beam weighting on a receive aperture is exactly the same as the Fourier transform over the same aperture. The extended ER method allows a continuous compromise between image quality and frame rate. This is desirable in applications where high frame rate imaging is not crucial, such as imaging of livers or kidneys, high quality images can be reconstructed at the expense of image frame rate.

Because the extended HFR imaging method may use multiple transmissions to obtain a frame of image, it is important to study the motion artifact of the method. In vitro experiments were performed with the extended HFR imaging method at various frame rates. Results are compared with those obtained with the conventional delay-and-sum (D&S) method with a fixed transmission focus and dynamic reception focusing, as well as with the D&S method with dynamic focusing in both transmission and reception (dynamic transmission focusing is achieved using montage process that may reduce image frame rate dramatically).

Formulae For image Reconstruction—From X waves, one obtains limited diffraction array beams for both transmission and reception. Following the derivations of HFR imaging, one obtains a relationship between the Fourier transform ($\tilde{R}_{k_x+k_{xT},k_y+k_{yT},k_z+k_{zT}}(\omega)$) of received echo signals in terms of both time (t) and transducer aperture (or limited diffraction reception aperture weighting) and a 3D spatial Fourier transform of the object function:

$$\tilde{R}_{k_x+k_{x_T},k_y+k_{y_T},k_z+k_{z_T}}(\omega) = \qquad (47)$$

$$\frac{A(k)T(k)H(k)}{c^2} \times F(k_x+k_{x_T}, k_y+k_{y_T}, k_z+k_{z_T}),$$

or $$F_{BL}(k'_x, k'_y, k'_z) = c^2 H(k)\tilde{R}_{k'_x,k'_y,k'_z}(\omega)$$

where $A(k)$ and $T(k)$ are transmission and reception transfer functions., respectively, $H(k)$ is the Heaviside step function, $\vec{K}^T=(k_{x_T},k_{y_T},k_{z_T})$ and $\vec{K}^R=(k_x,k_y,k_z)$ are transmission and reception wave vectors, respectively, $F(\bullet)$ is the Fourier transform of the object function, $f(\vec{r}_0)$, where $\vec{r}_0=(x_0, y_0, z_0)$ is a point in space, $F_{BL}(\bullet)=A(k)T(k)F(\bullet)$ is a band-limited version of $F(\bullet)$ ($H(k)$ is moved to the side of $\tilde{R}(\bullet)$ for convenience), $k=\omega/c$ is the wave number, where $\omega$ is the angular frequency and $c$ is the speed of sound, and where $$\begin{cases} k'_x = k_x + k_{x_T} \\ k'_y = k_y + k_{y_T} \\ k'_z = k_z + k_{z_T} = \sqrt{k^2 - k_x^2 - k_y^2} + \sqrt{k^2 - k_{x_T}^2 - k_{y_T}^2} \geq 0 \end{cases} \qquad (11)$$

If $\vec{K}^T=(k_{x_T}, k_{y_T}, k_{z_T})$ is fixed for a sideband signal in each transmission, a limited diffraction array beam is transmitted. $\vec{K}^T$ can also be expressed in spherical coordinates:

$$\begin{cases} k_{x_T} = k \sin \zeta_T \cos \theta_T = k_{l_T} \cos \theta_T \\ k_{y_T} = k \sin \zeta_T \sin \theta_T = k_{l_T} \sin \theta_T \\ k_{z_T} = k \cos \zeta_T = \sqrt{k^2 - k_{l_T}^2} \geq 0 \end{cases} \qquad (23)$$

where $\zeta_T$ is an Axicon (or steering) angle of X wave, $\theta_T$ is a rotation angle of a transmission beam around the axial axis of the transducer, and $k_{1_T}=k \sin \zeta_T=\sqrt{k_{x_T}^2+k_{y_T}^2}$. If the pair, $(\zeta_T,\theta_T)$, is fixed, it means a plane wave is transmitted.

From (1), 3D images can be reconstructed with an inverse Fourier transform:

$$f(\vec{r}_0) \approx f_{BL}(\vec{r}_0) \approx f_{BL}^{Part}(\vec{r}_0) \qquad (48)$$

$$= \frac{1}{(2\pi)^3} \int_{-\infty}^{\infty} dk'_x \int_{-\infty}^{\infty} dk'_y \int_{k \geq \sqrt{k_{x_T}^2+k_{y_T}^2} \text{ and } k \geq \sqrt{k_x^2+k_y^2}} dk'_z \times$$

$$F_{BL}(k'_x, k'_y, k'_z) e^{-ik'_x x_0 - ik'_y y_0 - ik'_z z_0}$$

where the first approximation is due to the finite bandwidth of received signals and the second is due to the requirements that both $k \geq \sqrt{k_{x_T}^2+k_{y_T}^2}$ and $k \geq \sqrt{k_x^2+k_y^2}$ must be satisfied. To use FFT and IFFT for image reconstructions, mapping between the Fourier transform of received signals and the rectangular grid of the Fourier transform of the object function is required. The mapping can be accomplished with a conventional interpolation method.

Equation (47) is also suitable for 2D imaging where $k_{y_T}$ and $k_y$ are set to zero. In the following experiments, 1D array transducer is used for 2D image reconstructions. Furthermore, steered plane waves are assumed in transmissions.

To study the effects of motion on the extended high frame rate imaging method, in vitro experiments are performed using the high frame rate imaging system that we developed in house. Radio frequency (RF) data obtained are used to reconstruct images with the Fourier method (see (47) above) and conventional D&S method.

Experiment with A Point Scatterer—In the experiment, a point scatterer is placed in the imaging pane, moving perpendicularly to the axis of a 2.5 MHz, 19.2 mm aperture, and 128 element broadband phased array transducer at a velocity of 214 ml/s that is higher than the peak velocity of the mitral valve of a normal human heart. Experiments are repeated with the point scatterer placed on the transducer axis at different depths (30, 46, 50, 70 and 90 mm) from the transducer surface. At each depth, data from different numbers of transmissions (1, 11, 19, and 91) are used to reconstruct images with the Fourier method (at frame rates of 5346, 486, 281, and 59 frames/s, respectively).

As a comparison, images are also reconstructed with conventional delay-and-sum D&S) method with and without dynamic focusing in transmission. (For D&S method without dynamic transmission focusing, the frame rate is about 59 frames/s. For D&S method with dynamic transmission focusing, the frame rate may be low although image quality may be high.)

Experiment with Tissue mimicking Phantom—To study the change of image contrast due to motion, an ATS539 tissue mimicking phantom is in place of the point scatterer with the center of its six 15 mm diameter cylinders (−15 dB, −6 dB, −3 dB, +3 dB: +6 dB, and +15 dB relative to the background) located at a depth of 46 mm. The moving velocity the phantom is the same as that of the point scatterer.

Line plots of point spread functions (PSFs) representing maximum sidelobe (along axial direction) at each transverse position for a stationary point scatterer are shown in FIG. 15. −6 dB resolution and the average sidelobe of each plot are listed in FIG. 16. It is seen from these results that the Fourier method with 91 transmissions has lower sidelobe and higher image resolution than the D&S method with either fixed or dynamic transmission focusing.

The percent changes of image resolution ($R_c$) and sidelobe ($S_c$) of a point scatterer due to motion are shown in FIG. 17. The definitions of the percent changes of resolution and sidelobe are given by $$R_c = \frac{R_{moving} - R_{Stationary}}{R_{Stationary}} \times 100\% \qquad (49)$$

and $$S_c = \frac{S_{moving} - S_{Stationary}}{S_{Stationary}} \times 100\%, \qquad (50)$$

respectively, where the subscripts "moving" and "stationary" represent the parameters obtained with and without motion, respectively.

FIG. 18 shows regions that are used for the calculation of contrasts of images with the following formula:

$$C = 20 \log \frac{\bar{m}_k}{\bar{m}_b}, \qquad (51)$$

where $\bar{m}_h$ and $\bar{m}_b$ are mean values inside the envelope detected cylindrical object and the background, respectively.

Contrasts of cylindrical objects of a stationary ATS539 phantom are given in FIG. 19. The), are correlated to the manufacturer-provided nominal contrasts of the phantom.

The percent change of contrast due to motion of the ATS539 phantom is shown in FIG. 20. It is seen that the Fourier method with 91 TXs has the highest percent change. The definition of the percent change of contrast ($C_c$) is similar to those of image resolution and sidelobe:

$$C_c = \frac{C_{moving} - C_{Stationary}}{C_{Stationary}} \times 100\%, \quad (52)$$

where $C_{moving}$ and $C_{Stationary}$ are contrast with and without motion of the phantom.

The Fourier method developed based on the extended high frame rate imaging theory is not very sensitive to the motion of object except when the number of transmissions is large (lower frame rate) and the depth is small.

Example G

Fourier-Domain Coverage

As mentioned before, changing $k_{x_T}$ and $k_{y_T}$ in limited-diffraction array beam, or changing $\zeta_T$ in steered plane wave transmissions, one obtains partially overlapped coverage of the spatial Fourier domain because $k_x$ and $k_y$ are free to change (see (11)). Superposing the partially constructed images in spatial domain or its spectrum in spatial Fourier domain obtained from different transmissions, one obtains the final image. The superposition in spatial domain can be done either coherently, (increase image resolution and contrast) or incoherently (reduce speckles). However in frequency domain, the superposition can only be done coherently, which in theory, is equal to the superposition in the space domain. The superposition will also increase the field of view of the final image.

Example H

Sampling Constraints

The basic sampling constraint to implement (10) and (11) is to meet the Nyquist sampling rule in both time and spatial domains so that signals can be recovered. In the echo Fourier domain, the sampling intervals in both $x_1$ and $y_1$ directions are determined by the transducer and must be smaller than a half of the minimum wavelength of the transducer to avoid aliasing or grating lobes. The sampling interval in time should be smaller than the half of the smallest period of the signal frequency component. For limited-diffraction array beam transmissions, if the sampling interval (pitch) of the transducer is bigger than a half of minimum wavelength, the image resolution will be lower and the field of viewer may be limited because the maximum weighting wave number in transmission is limited. Another sampling interval to consider is in the spatial Fourier domain, $(k'_x, k'_y, k'_z)$, of the object function. For a big object, the sampling interval must be small to get a large field of view and to avoid aliasing.

Example I

Under Sampled Aperture

To reduce effects of under-sampled aperture, which is the case for our 3.5 MHz transducer, one can apply a phase shift to compensate for the steered plane wave after echo signals are received. After the compensation, echoes would be effectively the same as if the array transducer were physically rotated in the transmission directions. This reduces aliasing caused by under sampled aperture.

Example J

Windowing

Various windows could be applied to increase image reconstruction quality. For example, transducer aperture could be apodized to reduce sidelobes while sacrificing some image resolution and energy efficiency. Windows could also be added to the Fourier domain of the object function to reduce sidelobes, to the temporal frequency domain to remove unwanted frequency components, as well as to the spatial Fourier domain of echoes.

Example K

Finite Aperture and Image Resolution

The theory of the high frame rate imaging method was developed with the assumption that the transducer aperture is infinitely large. However, the aperture of a practical transducer is always finite. As is well known from Goodman's book, a finite aperture will decrease image resolution. This is also clear from (16) where any reduction in the size of the transducer aperture, $\Sigma_1$, will result in a convolution of the aperture function with the kernel (Green's function) in space in the Rayleigh-Sommerfeld diffraction formula, reducing image resolution.

Example L

Lotion Artifacts

Because multiple frames of images may be used to form an image of a larger field of view with the extended HFR imaging theory, motion artifacts may be a concern as more and more frames of images are used. However, from the in vivo experiment of both kidney and heart with 91 transmissions, the artifacts are not noticeable (FIG. 14 shows the moment of the heart at the beginning of systole). This is because each sub-image reconstructed with the high frame rate imaging method does not have motion artifacts and the number of transmissions is relatively small. In addition, because the transducer aperture is only 19.2 mm, at a larger distance, the number of sub-images superposed at any given point is much smaller than 91. Motion artifacts of the extended HFR imaging method have been studied preliminarily. Results show that this method is not sensitive to the motion except when the number of transmissions is large (lower frame rate) and the depth is small.

L-1. Example

Mathematical

Computer simulations were carried out to study the effects of motions on the extended HFR imaging method under ideal conditions where there are no noises and other influences of a practical imaging system. In the computer simulations, a 1D linear array transducer with 128 elements, 0.15 mm pitch (about ¼ of the center wavelength of the transducer), 14 mm elevation width (without elevation focus), 2.5 MHz center frequency, and 58% −6 dB pulse-echo fractional bandwidth defined by the square of the Blackman window function was assumed. A one-cycle sine wave pulse at the center frequency was used to excite the transducer and the time between adjacent transmission pulses was 187 µs. Simulations were performed with both limited-diffraction array beam and steered plane wave transmissions. For limited-diffraction array beam transmissions, the maximum value of $k_{xT}$ was calculated with $k_{xT\_max} = k_c \sin(\pi/4)$, where $k_c$ is the center frequency of the transducer and $\pi/4$ is a specified maximum equivalent steering angle off the axis of the transducer at the center frequency. Because for each $k_{xT}$, both sine and cosine aperture weightings are needed, 6 and 46 different $k_{xT}$ equally spaced from 0 to $k_{xT\_max}$ were used to produce 11 and 91 transmissions, respectively. (Because sin(0)=0, only one-transmission was needed for $k_{xT}$=0). For steered plane wave transmissions: the steering angles were evenly spaced from $-\pi/4$ to $\pi/4$. For the conventional D&S method with 91 transmissions, the transmission focal depth was set to 70 mm along each transmit direction and the steering angle, $\zeta_T$, was ranged from $-\pi/4$ to $\pi/4$ with an evenly spaced sin $\zeta_T$ which means that there were more transmissions at smaller steering angles than at larger ones for the D&S method.

The simulations were done first for a stationary (no motion) point scatterer placed on the axial axis (perpendicular to transducer surface) at 30, 50, 70 and 90 nm n depths, respectively. 2D envelope-detected images (point spread functions or PSFs) were obtained with both the limited diffraction array beam and steered plane wave transmissions and the maximum value of each vertical line (in parallel Edith the axial axis) of the images was plotted versus the lateral axis that is in parallel with the transducer surface, see FIG. 21.

From FIG. 21, it is clear that for all depths, both limited-diffraction array beam and steered plane wave imaging methods with 91 transmissions have better resolution and lower sidelobes than the conventional D&S method of 70 nm transmission focal distance and a dynamically focused reception with the same number of transmissions. At the 30 mm depth, which is far from the focal distance of the D&S imaging, the extended HFR imaging method has much lower sidelobes, even with only 11 transmissions. For the extended HFR imaging method with 91 transmissions, sidelobes increase and image resolution decreases as the depth increases. However, the results are still better than those of the D&S method. It is also noticed that as the number of transmissions is reduced from 91 to 11, sidelobes are increased and resolution is reduced for the extended HFR imaging method.

To study the effects of motion on the extended HFR imaging methods, the point scatterer in FIG. 21 was allowed to move in either lateral (in parallel with the transducer) or axial (perpendicular to the transducer surface) direction during the data acquisition. This produces PSFs of moving objects. Results at two depths (30 and 90 mm) are shown in FIGS. 22 and 23 with 11 and 91 transmissions, and are compared to those with a stationary point scatterer. The velocity of the point scatterer is defined as $V=\sqrt{V_x^2+V_z^2}$ where $V_x$ and $V_z$ are lateral and axial velocity components, respectively.

In Panels (1) and (2) of FIGS. 22 and 23, at the lateral or axial velocity of up to 214 mm/s, the effects of motions on both limited-diffraction array beam and steered plane wave imaging with 11 transmissions are negligible, especially, in a farther distance such as 90 mm. However, as the number of transmissions is increased to 91 (see Panels (3) and (4) in FIGS. 22 and 23), both the limited-diffraction array beam and steered plane wave imaging methods are more sensitive to the motions, especially, at a distance that is closer to the transducer. As the velocity increases, the effects of motion are more noticeable. In addition, an axial motion has stronger effects than a lateral one. The motions may significantly reduce the peak value of reconstructed images with elevated sidelobes, especially at a higher velocity.

L-2. In Vitro and In Vivo Examples

To study motion effects on the extended HFR imaging method in real conditions, in vitro and in vivo experiments were performed using a homemade general-purpose HFR imaging system.

A. Experiment System and Conditions

The imaging system has 128 independent, broadband (0.05-10 MHz), and arbitrary waveform generators (linear power amplifiers), capable of producing up to ±144 V peak voltage at a 75-ohm resistive load. The accuracy of time delay is 6.25 ns and the waveforms are produced with a 40 MHz and 12-bit digital-to-analog (D/A) converter in each channel. The system also has 128 independent, broadband (0.25-10 MHz), low-noise, and time-gain-control (TGC) amplifiers of up to 108 dB gain. Echo signals in each channel are digitized with a 12-bit analog-to-digital (A/D) converter at 40 MHz sampling rate and then stored in a synchronous dynamic random access memory (SDRAM) of up to 512 MB. The system is controlled with a personal computer (PC) via a USB 2.0 port and data are transferred to the PC with the same port for image reconstruction.

An Acuson V2 phased array transducer was used for both in vitro and in vivo experiments. The transducer has the same parameters as those assumed in the simulations, except that it is focused at 68 mm depth in the elevation direction and its −6 dB pulse-echo bandwidth may be smaller.

In the experiments, the same transmission schemes for limited-diffraction array beam, steered plane wave, and D&S imaging methods as those in the simulations were used, except for limited-diffraction array beam transmissions where cosine and sine functions were replaced with square-wave functions to weight the amplitude of transmitted pulses for different values of $k_{xT}$ to increase the SNR. The received radio frequency (RF) echo signals were digitized at 40 MHz sampling rate and then down sampled to 10 MHz to reduce computations during image reconstructions for the extended HFR imaging method (for D&S, there was no downsampling because the method is sensitive to the phase accuracy of echo signals).

B. In Vitro Experiments

In the in vitro experiments, an ATS539 multifunction tissue-mimicking phantom (ATS Laboratories, Inc.) was placed on the bottom of a water tank and immersed in water. The phantom was kept stationary during the experiments. The transducer was clamped to a three-axis scanning system that was driven by step motors and synchronized with the HFR imaging system. The surface of the transducer was also immersed in water and the gap between the transducer and the phantom was about 12 mm. The structure and imaging area of the ATS539 multipurpose tissue-mimicking phantom are shown in FIG. 24.

The phantom has an attenuation of about 0.5 dB/cm/MHz and a speed of sound of about 1450 m/s. The imaging area contains both line and cystic targets. The monofilament nylon line targets have about 0.12 mm diameter each and the anechoic cylindrical cysts have diameters of 8, 6, 4, 3, 2 mm (from left to right), respectively. Moving directions of the transducer are indicated in the upper right corner of FIG. 24.

Results of 11 transmissions of limited-diffraction array beam and steered plane wave in different motion conditions are shown in FIG. 25. Transducer scanning speeds were set to 0 and 214 mm/s in the lateral or axial direction. Images of limited-diffraction array beam and steered plane wave transmissions are shown in the top and bottom rows, respectively. Results show that there are no obvious motion artifacts for both imaging methods with 11 transmissions except that there is a slight degradation of image resolution at distances that are very close to the surface of transducer at $V_z$=214 mm for limited-diffraction array beam imaging.

Results for 91 transmissions with limited-diffraction array beams are shown in FIG. 26. The scanning velocities of the transducer were set to 0, 107 or 214 mm/s in the lateral direction, and 53.5, 107 or 214 mm/s in the axial direction, respectively. The results show that, without motion, image resolution and contrast are improved significantly as the number of transmissions increases (compare FIG. 26(a) to FIG. 25(a)).

However, motion artifacts are produced if the object is moving during data acquisitions. At a lateral velocity of 107 mm/s (FIG. 25(b)) or axial velocity of 53.5 mm/s (FIG. 25(d)), motion artifacts occur only very near the surface of the transducer. As the lateral velocity is increased to 214 mm/s (FIG. 25(c)) or the axial velocity is increased to 107 mm/s (FIG. 25(e)), motion artifacts appear in the entire imaging field: sidelobes of line targets are increased and the contrast of the cystic targets is reduced. At an axial velocity of 214 mm/s, severe motion artifacts are observed. Sidelobes for line targets become very large and the cystic targets are almost buried in the background with nearly zero contrast.

For steered plane wave with 91 transmissions, situations are a little better (FIG. 27). Similar to limited-diffraction array beam imaging, steered plane wave imaging with 91 transmissions produce a higher image quality than 11 transmissions if there is no motion (compare FIG. 27(a) to FIG. 25(d)). At a lateral velocity of 214 mm/s, only small contrast and sidelobes changes are observed, except for those objects that are very close to the surface of the transducer. For an axial velocity of 53.5 mm/s, no apparent artifacts are observed. As the axial velocity is increased to 214 mm/s, obvious motion artifacts appear. However, the motion artifacts are less as compared to those of the limited-diffraction arrays beam imaging under the same conditions.

C. In Vivo Examples

In vivo experiment was performed on the heart of a healthy volunteer. As a comparison, D&S method was also used to reconstruct images. A transmission pulse sequence was designed to have 7 transmission schemes firing one after another. The transmission sequence is as follows (from the first to the last): steered plane wave with (i) 11, (ii) 19, and (iii) 91 transmissions, D&S method with (iv) 91 transmissions, and limited-diffraction array beam with (v) 91, (vi) 19, and (vii) 11 transmissions (a total 333 transmissions/group). The HFR imaging system was set to have the highest frame rate for the depth of 120 mm (5348 frames/s or 187 μs between adjacent transmissions). The transmission sequence was repeated 18 times to cover about a heart cycle (18*333=5994 transmissions, lasting about 1.12 seconds) for a heart rate of 53 beats/min. An illustration of the transmission sequence is shown in FIG. 28.

In the experiment, a commercial Acuson 128XP/10 ultrasound system was used to find a desired cross-section of the heart. Once the cross-section was found, the transducer connector was disconnected from the Acuson machine and connected to the HFR imaging system for data acquisition. The data acquisition was triggered by an electrocardiograph (ECG) signal of the volunteer and 126 images (18*7) were reconstructed. The mitral valve of the heart has the highest peak velocity that was visually measured by tracking the speckles of 18 images of the D&S method. The maximum change of the position of the mitral valve between the neighboring images was found and the maximum mean velocity was calculated with the following equation: $V_{mean\_max}=D_{max}/T_g$ where $V_{mean\_max}$ is the maximum mean velocity, $D_{max}$ is maximum position change of speckles between neighboring images, and $T_g$ is the time duration for one group of 333 transmissions ($T_g$=333×187 μs=62.271 ms). A maximum mean velocity of about 166 nm/s (8.4° relative to the axial axis toward the transducer) was found on the anterior leaflet of the mitral valve during the rapid ventricular dilatation that pushed the mitral valve open quickly. The vertical bar in the ECG graph of both FIGS. 29 and 30 indicates this moment.

Images reconstructed with limited-diffraction array beam and steered plane wave methods near the moment of the peak velocity of the mitral valve are shown in FIGS. 29 and 30, respectively. Images obtained with 11, 19, and 91 transmissions have frame rates of about 486, 281, and 59 frames/s, respectively, and are compared well with those of D&S method with 91 transmissions focused at 70 mm distance with a dynamically focused reception.

Compared with the in vitro experiments and simulations, no obvious motion artifacts are observed, which may be due to the following reasons: Firstly, most places in the imaging field, if they moved, moved at a much lower speed than the peak velocity of the mitral valve. Secondly, most moving parts in the images (valves, ventricles, and walls) of the heart were near the middle or at farther distances from the transducer where transmitted beams have fewer overlaps. Thirdly, brighter speckle spots (higher grayscale levels) appear in relative slow moving parts (such as the heart walls) at farther distances and thus the motion of the mitral valve does not significantly rescale the entire image. Finally, although the instantaneous velocity might be high in some places (such as at the leaflets of the mitral valve), the duration of such velocity may be relatively short and thus it may only affect a small part of transmissions during the data acquisition. No apparent motion artifacts were observed by examining all of the 18 images of each transmission scheme. This is different from the simulations or in vitro experiments where an entire object moves at a uniformly high velocity (too extreme from the realistic situations) during the data acquisition leading to severe motion artifacts.

L.3 Examples of Factors Relating to Motion Artifacts

The extended high frame rate imaging method with multiple limited-diffraction array beam or steered plane wave transmissions require a phase-coherent summation in either spatial or spatial Fourier domain. Phase misalignment due to motions during data acquisitions shill produce motion artifacts. From the simulations and experiments, we have found that motion artifacts are related to the following factors.

1. Number of Transmissions

At any given point in an imaging field, the number of coherent superposition is proportion to the number of overlapping transmissions. As the number of transmissions increases, motion artifacts increase. With 11 transmissions, overlapping regions are close to the transducer surface. For 91 transmissions, overlapping transmissions appear in the entire imaging area and thus the superposed image is more sensitive to the motion. In addition, in general, areas that are nearer to the surface of the transducer are more sensitive to motions than those farther away from the transducer are.

2. Motion Velocity

When velocity of objects increases, phase misalignment between transmissions increases and thus more artifacts are produced. Fortunately, most organs of the human body do not move very fast and fast moving objects such as the leaflets of the heart are confined to a small region. Thus, no severe motion artifacts would appear in these cases (see the in vivo experiments of the heart in FIGS. 29 and 30).

3. Direction of Motion

Both the simulation and experiment results show that an axial motion produces more artifacts than a lateral one. This is because, for each transmission, spatial frequency in the axial direction is much higher than that in the lateral. Therefore, higher phase coherence is required to avoid motion artifacts in the axial direction. At axial velocities of 53.5, 107 and 214 mm/s, the maximum phase error for 91 transmissions of a limited-diffraction array beam or steered plane wave can be as much as $1.5\lambda$, $3\lambda$, and $6\lambda$, where $\lambda$ is the wavelength, near the surface of the transducer, respectively, for a 2.5 MHz transducer and a speed of sound of 1540 mm/s. However, the same lateral velocities will produce much less phase error. As a result, an axial motion will degrade image quality more quickly than a lateral one.

4. Partial or Entire Imaging Field Motion

Simulation results show that motion may cause peak intensity of a PSF to drop along with sidelobes increase. If only a small part of an imaging field is moved and the mapping of the grayscale of the entire imaging field remains more or less unchanged, motion artifacts may be localized, or a degradation of image quality may appear only in a small region. However, if objects in the entire imaging field are moving, the dynamic range of image may be reduced, resulting in more severe motion artifacts that reduce image contrast and resolution.

5. Imaging Method

Results also show that limited-diffraction array beam imaging is more sensitive to motion than steered plane wave imaging when the number of transmissions is large (such as 91 transmissions). Further examining the partially reconstructed images from each transmission (in simulations and under the stationary condition), one can see that the two methods form the final PSF differently. For limited-diffraction array beam imaging, sidelobes of the PSF in each partially reconstructed image have different oscillation patterns and the PSF will not rotate between transmissions. During a coherent superposition, mainlobe of each PSF is added together while sidelobes cancel each other, resulting in a final PSF with a much lower sidelobe. For steered plane wave imaging, the PSF rotates when plane waves are steered in different directions. During the superposition, sidelobes do not increase while the mainlobe is enhanced coherently, resulting in a similar final PSF as that of limited-diffraction array beam imaging. If objects move between transmissions, sidelobes of the partial PSFs of different limited-diffraction array beam transmissions cannot be suppressed effectively anymore, producing more motion artifacts than the steered plane wave imaging. However, if the number of transmissions is small, motion effects on both limited-diffraction array beam and steered plane wave imaging are similar.

L-4. Examples of Methods for Reducing and/or Compensating for Motion Artifacts

Several methods are useful to reduce or compensate for motion artifacts. When imaging fast moving objects, small number of transmissions can be used for both limited-diffraction array beam and steered plane wave imaging. If fast moving objects are located farther away from the transducer surface, more transmissions can be used to increase image contrast and resolution without significantly increase the motion artifacts.

Both limited-diffraction array beam and steered plane wave imaging, motion artifacts will increase when the number of transmissions or moving velocity increase. Areas near the surface of transducer are more sensitive to motions than those in farther distances do. Lateral motions produce fewer artifacts than axial motions, and motions in a partial imaging field may be less noticeable than those of a whole imaging field may. In addition, when a large number of transmissions are used, limited-diffraction array beam imaging is more sensitive to motion than steered plane wave imaging.

It is noted that, in most medical imaging applications, organs, structures and tissues keep stationary or move at low speeds during imaging and therefore, both methods are generally useful for these applications.

In certain embodiments, because the extended HFR methods with multiple limited-diffraction array beam or steered plane wave transmissions can provide a continuous trade-off between image quality and frame rate, the imaging methods can be optimized according to different clinical applications. When stationary or slowly moving objects are imaged, a lower frame rate (or a larger number of transmissions) can be used to increase image quality. If objects move fast, such as the heart, a higher frame rate (or a smaller number of transmissions) can be used to reduce motion artifacts. This is more useful than the conventional Delay-and-sum (D&S) method where the frame rate is less flexible to change given a desired imaging depth and field of view.

Example M

Blood Flow Velocity Vector Imaging with High Frame Rate Imaging

High frame rate (HFR) imaging was used to obtain blood flow velocity vector images where an image, instead of a line, is reconstructed from each transmission in the HFR imaging.

An in vivo experiment was performed on the heart of a human volunteer with a homemade HFR imaging system. In the experiment, a broadband phased array transducer of 128 elements, 2.5 MHz center frequency 19.2 mm aperture., 14 mm elevation width, and 68 mm elevation focal distance was used to produce a plane wave repeatedly firing in the same direction. A 2.5 MHz one-cycle sine wave pulse was used in the transmissions with a pulse repetition period of 187 microseconds. Echo signals were digitized at 12 bit/40 MHz and then down sampled to 10 MHz in image reconstruction. A two-dimensional (in other embodiments, the system is also applicable to three-dimensional) radio frequency image (before the envelope detection) was reconstructed from each transmission.

Blood flow velocity component images along the axial (perpendicular to the transducer surface) and an angle (45 degrees were used) off the axial directions, respectively, were reconstructed simultaneously with the conventional color flow processing techniques. From the two sets of velocity component images, each of which was obtained with 16 transmissions to reduce noise, velocity vector images for about one heart cycle at 5348 frames/s were obtained. To measure the accuracy of the method, a group of speckles of about 3 mm by 2 mm in size was tracked visually. The result shows that the visually measured velocity magnitude of the group of speckles was about 63 mm/s while the velocity calculated with the method developed was about 66 mm/s (an error of about 5%).

Example N

Phase Aberration and Noise Effects Examples

To study the effects of the phase aberration and noise on the extended high frame rate (HFR) imaging method with the limited-diffraction array beam and steered plane wave transmissions, in vitro experiments were performed with a home-made general-purpose HFR imaging system. The system has 128 independent channels, each has a broadband (about 0.05-10 MHz) linear power amplifiers in transmission and is capable of producing ±144V arbitrary waveforms (with a 40 MHz/12-bit digital-to-analog (D/A) converter) on a 75Ω resistive load with a 6.25 ns time delay accuracy between channels. The system also has 128 independent high gain (up to 108 dB), low-noise, and wideband (about 0.25-10 MHz) time-gain-control (TGC) amplifiers. Echo signals from each receive channel are digitized with a 40 MHz/12-bit analog-to-digital (A/D) converter and stored in an SDRAM of up to 512 MB. Data are transferred to a personal computer (PC) via a USB 2.0 port for image reconstructions and the system is controlled with the same PC via the same USB links.

In the experiments, an Acuson V2 phased array transducer (128-elements, 2.5 MHz, and 0.15 mm pitch) was used. A one-cycle sine wave pulse at center frequency was used to excite the transducer and the time between adjacent transmissions was 187 s, which gave a maximum image frame rate of 486 and 59 frames/s for 11 and 91 transmissions, respectively. The radio frequency (RF) echo signals were received with the same transducer and the signals were digitized at 40 MHz sampling rate and then down sampled to 10 MHz for the extended HFR imaging method to reduce computations in image reconstructions. For the D&S method, the sampling rate remained at 40 MHz because the method is sensitive to phase errors caused by down sampling.

To produce the limited-diffraction array beam transmissions, the maximum value of $k_{xT}$ was first calculated with $k_{xT\_max} = k_c \sin(\pi/4)$, where $k_c$ was the center frequency of the transducer and $\pi/4$ was a specified maximum equivalent steering angle off the axis of the transducer at the center frequency. Then, 6 and 46 different $k_{xT}$, equally spaced from 0 to $k_{xT\_max}$, were obtained to produce 11 and 91 transmissions, respectively (for each $k_{xT}$, both sine and cosine aperture weightings are needed, except that when $k_{xT}=0$ only one transmission is needed since $\sin(0)=0$). In addition, square-wave, instead of the exact sine and cosine, aperture weightings were used in transmissions to simplify the experiments and to increase image quality. To produce the steered plane wave transmissions, the steering angle, $\zeta_T$, was evenly spaced from $-\pi/4$ to $\pi/4$. For the conventional D&S method, 91 transmissions focused at 70 mm were produced with an evenly spaced $\sin \zeta_T$, where $\zeta_T$, was also ranged from $-\pi/4$ to $\pi/4$ resulting in more transmissions at smaller steering angles than at larger ones. To reconstruct images with the D&S method of 11 transmissions, one out of every nine transmissions was evenly extracted from 91 over an image field of view of $\pm\pi/4$, and then a bilinear interpolation was used.

An ATS539 multifunction tissue-mimicking phantom was used in the experiments. A cross-section structure and an imaging area of the phantom are shown in FIG. 31. The phantom has 0.5 dB/cm/MHz attenuation and a speed of sound of 1450 m/s. The imaging area contains both line and cylindrical cystic targets. The diameter of the monofilament nylon wire targets is 0.12 mm and the diameters of the anechoic cylindrical cysts are 8, 6, 4, 3, and 2 mm (from left to right), respectively. To introduce the phase aberration to transmissions and receptions, the same random phase shifts or phase screens (FIG. 32) were added to both the transmitters and receivers.

The ranges of the phase shifts of the phase screens are $\pm 0.25\lambda$ ($\pm 0.5\pi$) and $\pm 0.375\lambda$ ($\pm 0.75\pi$), respectively, where $\lambda=0.6$ mm is the center wavelength of the transducer. The random noise was produced first by a pseudo random sequence generator in a computer and then band-pass filtered with its pass band equal to the Blackman window (about 81% −6 dB fractional bandwidth). The band-pass noise was then added to the RF echo signals with its absolute peak equal to 25% or 50% of that of the received echo signals (the absolute peak of the echo signals was about the same for all experiments and appeared near the transducer surface). Images were reconstructed with the noise added echoes.

Images reconstructed with the limited-diffraction array beam and steered plane wave imaging with 11 and 91 transmissions under no phase shift, $\pm 0.25\lambda$ random shifts, and $\pm 0.375\lambda$ random shifts are shown in FIG. 33 and FIG. 34, respectively. As a comparison, images reconstructed with the conventional D&S method with a transmission focal distance of 70 mm and a dynamically focused reception under the same conditions are shown in FIG. 35. Results of the effects of the noise on the limited-diffraction array beam and steered plane wave imaging are shown in FIG. 36 and FIG. 37, respectively. Similar to FIG. 35, images reconstructed with the D&S method under the same conditions of the noise are shown in FIG. 38 for comparison. To show the effects of the phase aberration and noise quantitatively, the contrast of a cylindrical cyst that was centered at 55.2 mm in depth was calculated with the formula: Contrast=$20 \log_{10}(m_i/m_o)$, where $m_i$ and $m_o$ were mean values inside and outside of the envelope detected images of the cyst, respectively. The areas for the calculations of $m_i$ and $m_o$ are marked Regions I and II, respectively, in FIG. 31. Region I has a diameter of 6.3 mm that is concentric with the cyst and Region II is a square with 19 mm on each side but excludes Region I. The calculated contrasts for both the extended HFR imaging and the D&S methods are shown in FIG. 39.

From the experiment results, it is clear that in the absence of the phase aberration and noise, the extended HFR imaging method produces higher quality images than the conventional D&S method with a fixed transmission focus of 70 r=n and a dynamically focused reception with the same number of transmissions (compare Panels (a) and (d) in FIGS. 33-38. In addition, as the number of transmissions increases, image quality is improved for all the methods. When the phase aberration and noise are introduced, image resolution and contrast are reduced. However, the effects of both the phase aberration and noise are similar on the extended HFR and the D&S imaging methods (see FIGS. 33-39).

The phase aberration and noise have similar effects on both the extended HFR imaging and the D&S methods. This demonstrates that while the extended HFR imaging method improves image quality, has a potential to simplify imaging systems, and can flexibly vary the number of transmissions for various medical applications, it is not more subject to distortions such as the phase aberration and system noise than the conventional D&S method.

The above descriptions of the preferred and alternative embodiments of the present invention are intended to be illustrative and are not intended to be limiting upon the scope and content of the following claims.

All of the compositions and methods disclosed and claimed herein is made and executed without undue experimentation in light of the present disclosure. While the compositions and methods of this invention have been described in terms of the foregoing illustrative embodiments, it will be apparent to those skilled in the art that variations, changes, modifications, and alterations may be applied to the compositions and/or methods described herein, without departing from the true concept, spirit, and scope of the invention. More specifically, it will be apparent that subjects other than human body can be imaged with the imaging system also. All such similar substitutes and modifications apparent to those skilled in the art are deemed to be within the spirit, scope, and concept of the invention as defined by the appended claims.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

REFERENCES

The references discussed above and the following references, to the extent that they provide exemplary procedural or other details supplementary to those set forth herein, are specifically incorporated herein by reference.

[1] J. A. Stratton, *Electromagnetic Theory*. New York and London: McGraw-Hill Book Company, 1941, Page 356.

[2] J. Durnin, "Exact solutions for nondiffracting beams. I. The scalar theory," *J. Opt. Soc. Am. A*, vol. 4, no. 4, pp. 651-654, 1987.

[3] J. Durnin, J. J. Miceli, Jr., and J. H. Eberly, "Diffraction-free beams," *Phys. Rev. Lett.*, vol. 58, no. 15, pp. 1499-1501, Apr. 13, 1987.

[4] Jian-yu Lu and J. F. Greenleaf, "Sidelobe reduction for limited diffraction pulse-echo systems," *IEEE Transactions on Ultrasonics, Ferroelectrics, and Frequency Control*, vol. 40, no. 6, pp. 735-746, November, 1993.

[5] G. Indebetow, "Nondiffracting optical fields: some remarks on their analysis and synthesis," *J. Opt. Soc. Am. A*, vol. 6, no. 1, pp. 150-152, January, 1989.

[6] F. Gori, G. Guattari, and C. Padovani, "Model expansion for JO-correlated Schell-model sources," *Optics Commun.*, vol. 64, no. 4, pp. 311-316, Nov. 15, 1987.

[7] K. Uehara and H. Kikuchi, "Generation of near diffraction-free laser beams," *Appl. Physics B*, vol. 48, pp. 125-129, 1989.

[8] L. Vicari, "Truncation of nondiffracting beams," *Optics Commun.*, vol. 70, no. 4, pp. 263-266, Mar. 15, 1989.

[9] M. Zalid and M. S. Zubairy, "Directionally of partially coherent Bessel-Gauss beams," *Optics Commun.*, vol. 70, no. 5, pp. 361-364, Apr. 1, 1989.

[10] J. Ojeda-Castaneda and A. Noyola-lglesias, "Nondiffracting wavefields in grin and free-space," *Microwave and optical technology letters* vol. 3, no. 12, pp. 430-433, December, 1990.

[11] D. K. Hsu, F. J. Margetan, and D. O. Thompson, "Bessel beam ultrasonic transducer: fabrication method and experimental results," *Appl. Phys. Lett.*, vol. 55, no. 20, pp. 2066-2068, Nov. 13, 1989.

[12] Paul D. Fox, Jiqi Cheng, and Jian-yu Lu, "Theory and experiment of Fourier-Bessel field calculation and tuning of a PW annular array," *Journal of Acoustical Society of America*, vol. 113, no. 5, pp. 2412-2423, May, 2003.

[13] Paul Fox, Jiqi Cheng, and Jian-yu Lu, "Fourier-Bessel field calculation and tuning of a CW annular array," *IEEE Transactions on Ultrasonics, Ferroelectrics, and Frequency Control*, vol. 49, no. 9, pp. 1179-1190, September, 2002.

[14] Hu Peng and Jian-yu Lu, "High frame rate 2D and 3D imaging with a curved or cylindrical array," in 2002 *IEEE Ultrasonics Symposium Proceedings* 02CH37388, vol. 2, pp. 1725-1728, 2002 (ISSN: 1051-0117).

[15] Jian-yu Lu, Jiqi Cheng, and Brent Cameron, "Low sidelobe limited diffraction optical coherence tomography," in *Coherence Domain Optical Methods in Biomedical Science and Clinical Applications VI*, Valery V. Tuchin, Joseph A. Izatt, James G. Fujimoto, Editors, Proceedings of SPIE, vol. 4619, pp. 300-311, 2002 (ISBN: 0-8194-4358-1).

[16] Jian-yu Lu, Jing Wang, Hu Peng, and Jiqi Cheng, "Increasing frame rate of limited diffraction imaging system with code excitations," in *Acoustical Imaging* vol. 26, Roman Gr. Maev, Editor, pp. 467-475, 2002 (ISBN: 0-306-47340-2).

[17] Jian-yu Lu, Jiqi Cheng, and Hu Peng, "Sidelobe reduction of images with coded limited diffraction beams," in 2001 *IEEE Ultrasonics Symposium Proceedings* 01CH37263, vol. 2, pp. 1565-1568, 2001 (ISSN: 1051-0117).

[18] Jian-yu Lu, "A study of signal-to-noise ratio of the Fourier method for construction of high frame rate images," in *Acoustical Imaging*, vol. 24, Hua Lee and G. Wade, Editors, pp. 401-406, 2000 (ISBN: 0-306-46518-3).

[19] Jian-yu Lu and Anjun Liu, "An X wave transform," *IEEE Transactions on Ultrasonics, Ferroelectrics, and Frequency Control*, vol. 47, no. 6, pp. 1472-1481, November, 2000.

[20] Shiping He and Jian-yu Lu, "Sidelobe reduction of limited diffraction beams with Chebyshev aperture apodization," *Journal of Acoustical Society of America*, vol. 107, no. 6, pp. 3556-3559, June, 2000.

[21] Desheng Ding and Jian-yu Lu, "Second Harmonic Generation of the nth-order Bessel beams," *Physical Review E*, vol. 61, no. 2, pp. 2038-2041, February, 2000.

[22] Desheng Ding and Jian-yu Lu, "Higher-order harmonics of limited diffraction Bessel beams," *Journal of Acoustical Society of America*, vol. 107, no. 3, pp. 1212-1214, March, 2000.

[23] Jian-yu Lu and Shiping He, "Effects of phase aberration on high frame rate imaging," *Ultrasound in Medicine and Biology*, vol. 26, no. 1, pp. 143-152, 2000.

[24] Jian-yu Lu and Shiping He, "High frame rate imaging with a small number of array elements," *IEEE Transactions on Ultrasonics, Ferroelectrics, and Frequency Control*, vol. 46, no. 6, pp. 1416-1421, November, 1999.

[25] Jian-yu Lu and Shiping He, "Optical X waves communications," *Optics Communications*, vol. 161, pp. 187-192, Mar. 15, 1999.

[26] Jian-yu Lu, "Transmit-receive dynamic focusing with limited diffraction beams," in 1997 *IEEE Ultrasonics Symposium Proceedings*, 97CH36118, vol. 2, pp. 1543-1546, 1997 (ISSN: 1051-0117).

[27] Jian-yu Lu, "2D and 3D high frame rate imaging with limited diffraction beams," *IEEE Transactions on Ultrasonics, Ferroelectrics, and Frequency Control*, vol. 44, no. 4, pp. 839-856, July, 1997.

[28] Jian-yu Lu, "Experimental study of high frame rate imaging with limited diffraction beams," *IEEE Transactions on Ultrasonics, Ferroelectrics, and Frequency Control*, vol. 45, no. 1, pp. 84-97, January, 1998.

[29] Jian-yu Lu, "Improving accuracy of transverse velocity measurement with a new limited diffraction beam," in 1996

[30] Jian-yu Lu, "Designing limited diffraction beams," *IEEE Transactions on Ultrasonics, Ferroelectrics, and Frequency Control*, vol. 44, no. 1, pp. 181-193, January, 1997.

[31] Jian-yu Lu, M. Fatemi, and J. F. Greenleaf, "Pulse-echo imaging with X wave," in *Acoustical Imaging*, vol. 22, Piero Tortoli, Editor, pp. 191-196, 1996 (ISBN: 0-306-45364-9).

[32] Jian-yu Lu, "Limited diffraction array beams," *International Journal of Imaging System and Technology*, vol. 8, no. 1, pp. 126-136, January, 1997 (ISSN: 0899-9457).

[33] Jian-yu Lu, "Producing bowtie limited diffraction beams with synthetic array experiment," *IEEE Transactions on Ultrasonics, Ferroelectrics, and Frequency Control*, vol. 43, no. 5, pp. 893-900, September, 1996.

[34] Jian-yu Lu, "Bowtie limited diffraction beams for low-sidelobe and large depth of field imaging," *IEEE Transactions on Ultrasonics, Ferroelectrics, and Frequency Control*, vol. 42, no. 6, pp. 1050-1063, November, 1995.

[35] Jian-yu Lu, Hehong Zou and J. F. Greenleaf, "A new approach to obtain limited diffraction beams," *IEEE Transactions on Ultrasonics, Ferroelectrics, and Frequency Control*, vol. 42, no. 5, pp. 850-853, September, 1995.

[36] Jian-yu Lu and J. F. Greenleaf, "Comparison of sidelobes of limited diffraction beams and localized waves," in *Acoustical Imaging*, vol. 21, Joie Pierce Jones, Editor, pp. 145-152, 1995 (ISBN: 0-306-45009-7).

[37] Jian-yu Lu, Xiao-Liang Xu, Hehong Zou, and J. F. Greenleaf, "Application of Bessel beam for Doppler velocity estimation," *IEEE Transactions on Ultrasonics, Ferroelectrics, and Frequency Control*, vol. 42, no. 4, pp. 649-662, July, 1995.

[38] Jian-yu Lu and J. F. Greenleaf, "A study of two-dimensional array transducers for limited diffraction beams," *IEEE Transactions on Ultrasonics, Ferroelectrics, and Frequency Control*, vol. 41, no. 5, pp. 724-739, September, 1994.

[39] Jian-yu Lu, Hehong Zou, and J. F. Greenleaf, "Biomedical ultrasound beam forming," *Ultrasound in Medicine and Biology*, vol. 20, no. 5, pp. 403-428, July, 1994 (invited review paper).

[40] Jian-yu Lu, Tai K. Song, Randall R. Kinnick, and J. F. Greenleaf, "In vitro and in vivo real-time imaging with ultrasonic limited diffraction beams," *IEEE Transactions on Medical Imaging*, vol. 12, no. 4, pp. 819-829, December, 1993.

[41] Jian-yu Lu and J. F. Greenleaf, "Producing deep depth of field and depth-independent resolution in NDE with limited diffraction beams," *Ultrasonic Imaging*, vol. 15, no. 2, pp. 134-149, April, 1993.

[42] Tai K. Song, Jian-yu Lu and J. F. Greenleaf, "Modified X waves with improved field properties," *Ultrasonic Imaging*, vol. 15, no. 1, pp. 36-47, January, 1993.

[43] Jian-yu Lu and J. F. Greenleaf, "Diffraction-limited beams and their applications for ultrasonic imaging and tissue characterization," in *New, Developments in Ultrasonic Transducers and Transducer Systems*, F. L. Lizzi, Editor, Proceedings of SPIE, vol. 1733, pp. 92-119, 1992 (ISBN: 0-8194-0906-5).

[44] Jian-yu Lu and J. F. Greenleaf, "Nondiffracting X waves—exact solutions to free-space scalar wave equation and their finite aperture realizations," *IEEE Transactions on Ultrasonics, Ferroelectrics, and Frequency Control*, vol. 39, no. 1, pp. 19-31, January, 1992.

[45] Jian-yu Lu and J. F. Greenleaf, "Experimental verification of nondiffracting X waves," *IEEE Transactions on Ultrasonics, Ferroelectrics, and Frequency Control*, vol. 39, no. 3, pp. 441-446, May, 1992.

[46] Jian-yu Lu and J. F. Greenleaf, "Evaluation of a nondiffracting transducer for tissue characterization," in 1990 *IEEE Ultrasonics Symposium Proceedings*, 90CH2938-9, vol. 2, pp. 795-798, 1990 (ISSN: 1051-0117).

[47] Jian-yu Lu and J. F. Greenleaf, "Pulse-echo imaging using a nondiffracting beam transducer," *Ultrasound in Medicine and Biology*, vol. 17, no. 3, pp. 265-281, May, 1991.

[48] Jian-yu Lu and J. F. Greenleaf, "Ultrasonic nondiffracting transducer for medical imaging," *IEEE Transactions on Ultrasonics, Ferroelectrics, and Frequency Control*, vol. 37, no. 5, pp. 438-447, September, 1990.

[49] Miguel A. Porras, Alberto Parola, Daniele Faccio, Audrius Dubietis, and Paolo Di Trapani, "Nonlinear unbalanced Bessel beams: stationary conical waves supported by nonlinear losses," *Phys. Rev. Lett.*, 93, 153902 (2004).

[50] M. Kolesik, E. M. Wright, and J. V. Moloney, "Dynamic nonlinear X waves for femtosecond pulse propagation in water," *Phys. Rev. Lett.*, 92, 253901 (2004).

[51] Claudio Conti and Stefano Trillo, "Nonspreading wave packets in three dimensions formed by an ultracold Bose gas in an optical lattice," *Phys. Rev. Lett.*, 92, 120404 (2004).

[52] P. Di Trapani, G. Valiulis, A. Piskarskas, O. Jedrkiewicz, J. Trull, C. Conti, and S. Trillo, "Spontaneously generated x-shaped light bullets," *Phys. Rev. Lett.*, 91, 093904 (2003).

[53] C. Conti, S. Trillo, P. Di Trapani, G. Valiulis, A. Piskarskas, O. Jedrkiewicz, and J. Trull, "Nonlinear electromagnetic X waves," *Phys. Rev. Lett.*, 90, 170406 (2003).

[54] J. Salo, J. Fagerholm, A. T. Friberg, and M. M. Salomaa, "Nondiffracting bulk-acoustic X waves in crystals," *Phys. Rev. Lett.*, 83, 1171-1174 (1999).

[55] Peeter Saari and Kaido Reivelt, "Evidence of X-shaped propagation-invariant localized light waves," *Phys. Rev. Lett.*, 79, 4135-4138 (1997).

[56] T. Wulle and S. Herminghaus, "Nonlinear optics of Bessel beams," *Phys. Rev. Lett.*, 70, 1401-1404 (1993).

[57] Charles Day, "Intense X-shaped pulses of light propagate without spreading in water and other dispersive media," *Physics Today*, v. 57, n. 10, pp. 25-26, October, 2004.

[58] Glen Wade, "Human uses of ultrasound: ancient and modern," *Ultrasonics*, vol. 38, pp. 1-5 (2000).

[59] Jian-yu Lu, "Nonlinear processing for high frame rate imaging," *Journal of Ultrasound in Medicine*, vol. 18, no. 3 (Supplement), p. S50, March, 1999.

[60] Jian-yu Lu and Shiping He, "Increasing field of view of high frame rate ultrasonic imaging," *Journal of Acoustical Society of America*, vol. 107, no. 5, pt. 2, pp. 2779, May, 2000.

[61] Jiqi Cheng and Jian-yu Lu, "Fourier based imaging method with steered plane waves and limited-diffraction array beams," in 2005 IEEE Ultrasonics Symposium Proceedings, 05CH37716C, vol. 2, pp. 1976-1979, 2005 (ISSN: 1051-0117).

[62] Jian-yu Lu, Jiqi Cheng, and Jing Wang, "High frame rate imaging system for limited diffraction array beam imaging with square-wave aperture weightings," *IEEE Transactions on Ultrasonics, Ferroelectrics, and Frequency Control* (to appear in October 2006 issue).

[63] S. J. Nortan and M. Linzer, "Ultrasonic reflectivity imaging in three dimensions: Exact inverse scattering solution for plane, cylindrical and spherical aperture," *IEEE Trans. Biomed. Eng.*, vol. BME-28, no. 2, pp. 202-220, February, 1981.

[64] K. Nagai, "Fourier domain reconstruction of ultrasonic 2-D and 3-D images using exact inverse scattering solution," *Proc. IEEE Ultrason. Symp.*, 1985, pp. 804807.

[65] K. Nagai, "A new synthetic-aperture focusing method for ultrasonic B-scan imaging by the Fourier transform," *IEEE Trans. Ultrson., Ferroelect., Freq. Contr.*, vol. SU-32, no. 4, pp. 531-536, Jul., 1985.

[66] M. Soumekh, "Depth-focused interior echo imaging", *IEEE Trans. Image Processing*, vol. 8, no. 11, pp. 1608-1618, November, 1999.

[67] M. Soumekh, "Array imaging with beam-steered data", *IEEE Trans. Image Processing*, vol. 1, no. 3, pp. 379-390, July, 1992.

[68] J. T. Ylitalo and H. Ermert, "Ultrasound synthetic aperture imaging: monostatic approach," *IEEE Trans. Ultrson., Ferroelect., Freq. Contr.*, vol. 41, no. 3, pp. 333-339, May, 1994.

[69] J. T. Ylitalo, "Synthetic aperture ultrasound imaging using a convex array," *Proc. IEEE Ultrason. Symp.*, 1995, pp. 1337-1340.

[70] L. J. Busse, "Three-dimensional imaging using a frequency domain synthetic aperture focusing technique," *IEEE Trans. Ultrson., Ferroelect., Freq. Contr.*, vol. 39, no. 2, pp. 174-179, March, 1992.

[71] T. Rastello, C. Hass, D. Vray, M. Krueger, K. Schroeder, E. Brusseau, G. Gimenez, and H. Ermert, "A new Fourier-based muliistatic synthetic aperture focusing technique for intravascular ultrasound imaging," *Proc. IEEE Ultrason. Symp.*, 1998, pp. 1725-1728.

[72] M. A. Haun, D. L. Jones, and W. D. O'Brien, "Efficient three-dimensional imaging from a small cylindrical aperture," *IEEE Trans. Ultrson., Ferroelect., Freq. Contr.*, vol. 49, no. 7, pp. 861-870, Jul., 0.2002.

[73] M. A. Moehring, F. E. Barber, and J. R Klepper, "Quasi real-time Fourier reconstructive imaging from acoustic backscatter data," *Proc. IEEE Ultrason. Symp.*, 1990, pp. 1485-1490.

[74] Z. M. Benenson, A. B. Elizarov, T. V. Yakovleva, and W. D. O'Brien, "Approach to 3-D ultrasound high resolution imaging for mechanically moving large-aperture transducer based upon Fourier transform," *IEEE Trans. Ultrson., Ferroelect., Freq. Contr.*, vol. 49, no. 12, pp. 1665-1685, December, 2002.

[75] M. K. Jeong, S. J. Kwon, T. K. Song, and M. H. Bae, "Realization of Sinc waves in ultrasound imaging systems," *Ultrason. Imaging*, vol. 21, pp. 173-185, July 1999.

[76] M. K. Jeong, T. K. Song, S. B. Park and J. B. Ra, "Generation of Sinc wave by one-dimensional array for applications in ultrasonic imaging," *IEEE Trans. Ultrson., Ferroelect., Freq. Contr.*, vol. 43, no. 2, pp. 285-295, March 1996.

[77] Jian-yu Lu and John L. Waugaman, "Development of a linear power amplifier for high frame rate imaging system," in 2004 *IEEE Ultrasonics Symposium Proceedings*, 04CH37553C, vol. 2, pp. 1413-1416, 2004 (ISSN: 1051-0117).

[78] Jian-yu Lu, "A multimedia example," *IEEE Transactions on Ultrasonics, Ferroelectrics, and Frequency Control*, vol. 50, no. 9, pp. 1078, September, 2003.

[79] C. S. Kino, *Acoustic Waves: Devices, Imaging and Analog Signal Processing*, Englewood Cliffs, N.J.: Prentice-Hall, 1987.

[80] R. Bracewell, *The Fourier Transform and its Applications*. New York: McGraw-Hill, 1965, Ch. 4 and 6.

[81] A. C. Kak and M. Slaney, *Principle of Computerized Tomographic Imaging*. New York, N.Y.: IEEE press, 1987, Ch. 6.

[82] M. Born and E. Wolf, *Principles of Optics*. Cambridge: Cambridge University Press, $7^{th}$ ed. Ch. 13., 1999.

[83] G. C. Sherman, "Application of the convolution theorem to Rayleigh's integral formulas," *J. Opt. Soc. Am.*, vol. 57, pp. 546-547, Apr. 1967.

[84] J. W. Goodman, *Introduction to Fourier Optics*. New York, N.Y.: McGraw-Hill, 1968, Ch. 2-4.

[85] J. Shen, H. Wang, C. Cain, and E. S. Ebbini, "A post beamforming processing technique for enhancing conventional pulse-echo ultrasound imaging contrast resolution," in *Proc. IEEE Ultrason. Symp.*, 95CH335844, vol. 2, 1995, pp. 1319-1322.

[86] C. B. Burckhardt, H. Hoffmann, and P. A. Grandchamp, "Ultrasound Axicon: a device for focusing over a large depth," *J. Acoust. Soc. Amer.*, vol. 54, pp. 1628-1630, December 1973.

[87] F. S. Foster, M. S. Patterson, M. Arditi, and J. W. Hunt, "The conical scanner: a two transducer ultrasound scatter imaging technique," *Ultrason. Imaging*, vol. 3, pp. 62-82, April 1981.

[88] D-L. D. Liu, "Plane wave scanning reception and receiver," U.S. Pat. No. 6,685,641 B2, Issued: Feb. 3, 2004.

[89] G. E. Tupholme, "Generation of acoustic pulses by baffled plane pistons," *Mathematika* vol. 16, pp. 209-224, 1969.

[90] P. R. Stepanishen, "The time-dependent force and radiation impedance on a piston in a rigid infinite planar baffle," *J. Acoust. Soc. Am.*, vol. 49, no. 3, pp. 841-849, 1971.

[91] G. R. Harris, "Review of transient field theory for a baffled planar piston," *J. Acoust. Soc. Am.*, vol. 70, pp. 1-20, 1981.

[92] J. A. Jensen and N. B. Svendsen, "Calculation of pressure fields from arbitrarily shaped, apodized, and excited ultrasound transducers," *IEEE Tyans. Ultrson., Ferroelect., Freq. Contr.*, vol. 39, no. 2, Mar. 1992.

[93] J. A. Jensen, "A new calculation procedure for spatial impulse responses in ultrasound," *J. Acoust. Soc. Am.*, vol. 105, no. 6, pp. 3266-3274, 1999.

[94] J. Lubbers and R. Graaff, "A simple and accurate formula for the sound velocity in water", *Ultrasound Med. Biol.* vol 24, no 7, pp 1065-1068, 1998.

[95] Jing Wang and Jian-yu Lu, "A study of motion artifacts of Fourier-based image construction," in 2005 *IEEE Ultrasonics Symposium Proceedings*, 05CH37716C, vol. 2, pp. 1439-1442, 2005 (ISSN: 1051-0117).

What is claimed is:

1. A method for producing a high frame rate, high resolution and high contrast image, comprising:
   a) transmitting, using at least one transmitter, a group of signals of energy weighted by single spatial frequency but may be of different phases or linear time delay toward an object to be imaged;
   b) weighting receive signals from the object with multiple spatial frequencies, or by performing a spatial Fourier transform;
   c) reconstructing, using an inverse fast Fourier transform element, a two- or three-dimensional image data set from the group of the transmitted signals weighted by the single spatial frequency or linear time delay, and the receive signals weighted with the multiple spatial frequencies or processed by the spatial Fourier transform; and,
   d) reconstructing the high frame rate, high resolution and high contrast image from the image data set of step c) using a processor.

2. A method for producing a high frame rate, high resolution and high contrast velocity vector image of an object where at least a part of the object is moving, comprising:
   a) transmitting, using at least one transmitter, two or more groups of signals of energy weighted by single spatial frequency but may be of different phases or linear time delay toward the object,
   b) weighting receive signals from the object with multiple spatial frequencies or by performing a spatial Fourier transform;
   c) reconstructing, using an inverse fast Fourier transform element, two- or three-dimensional image data sets from the groups of the transmitted signals weighted by the single spatial frequency or linear time delay, and the receive signals weighted with the multiple spatial frequencies or processed by the spatial Fourier transform;
   d) using the image data sets to reconstruct:
      a first set of flow velocity component images in a first direction, and
      a second set of flow velocity component images in a second direction that is different from the first direction; and,
   e) reconstructing the velocity vector image from the two sets of velocity component images using a processor.

3. The method of claim 1, wherein step a) each group may contain one or more signals, each of which is produced with one transmission.

4. The method of claim 1, in which the transmit group comprises one or more limited diffraction beams.

5. The method of claim 1, in which the received signal for echoes returned from all random scatterers within the object $f(\vec{r}_0)$ is a linear superposition of those echo signals from individual point scatterers as follows:

$$R_{k_x+k_{x_T},k_y+k_{y_T},k_z+k_{z_T}}(t) = \frac{1}{2\pi}\int_{-\infty}^{\infty}\frac{A(k)T(k)H(k)}{c} \times \qquad (8)$$

$$\left[\int_V f(\vec{r}_0)e^{i(k_x+k_{x_T})x_0+i(k_y+k_{y_T})y_0+i(k_z+k_{z_T})z_0}\,d\vec{r}_0\right]e^{-i\omega t}dk = \frac{1}{2\pi}$$

$$\int_{-\infty}^{\infty}\frac{A(k)T(k)H(k)}{c}F(k_x+k_{x_T},k_y+k_{y_T},k_z+k_{z_T})e^{-i\omega t}\,dk.$$

6. The method of claim 5, in which the temporal Fourier transform (spectrum) of the received signal obtained as follows:

$$\tilde{R}_{k_x+k_{x_T},k_y+k_{y_T},k_z+k_{z_T}}(\omega) = \qquad (10)$$

$$\frac{A(k)T(k)H(k)}{c^2} \times \int_V f(\vec{r}_0)e^{i(k_x+k_{x_T})x_0+i(k_y+k_{y_T})y_0+i(k_z+k_{z_T})z_0}\,d\vec{r}_0$$

or $$\tilde{R}_{k_x+k_{x_T},k_y+k_{y_T},k_z+k_{z_T}}(\omega) =$$

$$\frac{A(k)T(k)H(k)}{c^2} \times F(k_x+k_{x_T},k_y+k_{y_T},k_z+k_{z_T})$$

or $$F_{BL}(k'_x,k'_y,k'_z) = c^2 H(k)\tilde{R}_{k'_x,k'_y,k'_z}(\omega).$$

7. The method of claim 6, in which a 2D Fourier transform of the echo signals in terms of both $x_1$ and $y_1$ over a transducer surface is as follows:

$$\tilde{R}_{k_x+k_{x_T},k_y+k_{y_T},k_z+k_{z_T}}(\omega) = \frac{A(k)T(k)H(k)}{c^2} \times \int_V f(\vec{r}_0)e^{ik_x x_0+ik_y y_0+ik_z z_0}e^{ik_{x_T}x_0+ik_{y_T}y_0+ik_{z_T}z_0}\,d\vec{r}_0 \qquad (13)$$

$$= \frac{A(k)}{c}\int_V f(\vec{r}_0)\left[\frac{T(k)H(k)}{c}e^{ik_x x_0+ik_y y_0+ik_z z_0}\right]e^{ik_{x_T}x_0+ik_{y_T}y_0+ik_{z_T}z_0}\,d\vec{r}_0$$

$$= \frac{A(k)}{c}\int_V f(\vec{r}_0)[\Phi^R_{Array}(\vec{r}_0,\omega)]e^{ik_{x_T}x_0+ik_{y_T}y_0+ik_{z_T}z_0}\,d\vec{r}_0$$

$$= \frac{A(k)}{c}\int_V f(\vec{r}_0)[\mathcal{J}_{x_1,y_1}\{\tilde{E}(x_1,y_1;\vec{r}_0;\omega)\}]e^{ik_{x_T}x_0+ik_{y_T}y_0+ik_{z_T}z_0}\,d\vec{r}_0$$

$$= \mathcal{J}_{x_1,y_1}\left\{\int\left[f(\vec{r}_0)\frac{A(k)}{c}e^{ik_{x_T}x_0+ik_{y_T}y_0+ik_{z_T}z_0}\right]\tilde{E}(x_1,y_1;\vec{r}_0;\omega)d\vec{r}_0\right\}.$$

8. The method of claim 1, wherein four limited-diffraction array beams are transmitted (fix both $k_{x_T}$ and $k_{y_T}$) in each group as follows:

$$\Phi_{Array(1)}^T(\vec{r}_0, t) = \frac{1}{2\pi}\int_{-\infty}^{\infty} A(k)H(k)\cos(k_{x_T}x_0)\cos(k_{y_T}y_0)e^{ik_{z_T}z_0}e^{i\omega x}dk, \quad (26)$$

$$\Phi_{Array(2)}^T(\vec{r}_0, t) = \frac{1}{2\pi}\int_{-\infty}^{\infty} A(k)H(k)\cos(k_{x_T}x_0)\sin(k_{y_T}y_0)e^{ik_{z_T}z_0}e^{i\omega x}dk, \quad (27)$$

$$\Phi_{Array(3)}^T(\vec{r}_0, t) = \frac{1}{2\pi}\int_{-\infty}^{\infty} A(k)H(k)\sin(k_{x_T}x_0)\cos(k_{y_T}y_0)e^{ik_{z_T}z_0}e^{i\omega x}dk, \quad (28)$$

and $$\Phi_{Array(4)}^T(\vec{r}_0, t) = \frac{1}{2\pi}\int_{-\infty}^{\infty} A(k)H(k)\sin(k_{x_T}x_0)\sin(k_{y_T}y_0)e^{ik_{z_T}z_0}e^{i\omega x}dk, \quad (29)$$

wherein four coverage areas are obtained in a spatial Fourier space of $f(\vec{r}_0)$ from combinations of the four echo signals, and wherein denoting the Fourier transform of the four echo signals as $\tilde{R}_{k'_x, k'_y, k'_z}^{(1)}(\omega)$, $\tilde{R}_{k'_x, k'_y, k'_z}^{(2)}(\omega)$, $\tilde{R}_{k'_x, k'_y, k'_z}^{(3)}(\omega)$, and $\tilde{R}_{k'_x, k'_y, k'_z}^{(4)}(\omega)$, corresponding to (26)-(29), respectively, provides:

$$F_{BL}(k_x + k_{x_T}, k_y + k_{y_T}, k_z + k_{z_T}) = \quad (30)$$
$$c^2 H(k)\left(\tilde{R}_{k'_x,k'_y,k'_z}^{(1)}(\omega) + i\tilde{R}_{k'_x,k'_y,k'_z}^{(2)}(\omega) + i\tilde{R}_{k'_x,k'_y,k'_z}^{(3)}(\omega) - \tilde{R}_{k'_x,k'_y,k'_z}^{(4)}(\omega)\right),$$

$$F_{BL}(k_x + k_{x_T}, k_y - k_{y_T}, k_z + k_{z_T}) = \quad (31)$$
$$c^2 H(k)\left(\tilde{R}_{k'_x,k'_y,k'_z}^{(1)}(\omega) - i\tilde{R}_{k'_x,k'_y,k'_z}^{(2)}(\omega) + i\tilde{R}_{k'_x,k'_y,k'_z}^{(3)}(\omega) + \tilde{R}_{k'_x,k'_y,k'_z}^{(4)}(\omega)\right),$$

$$F_{BL}(k_x - k_{x_T}, k_y + k_{y_T}, k_z + k_{z_T}) = \quad (32)$$
$$c^2 H(k)\left(\tilde{R}_{k'_x,k'_y,k'_z}^{(1)}(\omega) + i\tilde{R}_{k'_x,k'_y,k'_z}^{(2)}(\omega) - i\tilde{R}_{k'_x,k'_y,k'_z}^{(3)}(\omega) + \tilde{R}_{k'_x,k'_y,k'_z}^{(4)}(\omega)\right),$$

$$F_{BL}(k_x - k_{x_T}, k_y - k_{y_T}, k_z + k_{z_T}) = \quad (33)$$
$$c^2 H(k)\left(\tilde{R}_{k'_x,k'_y,k'_z}^{(1)}(\omega) - i\tilde{R}_{k'_x,k'_y,k'_z}^{(2)}(\omega) - i\tilde{R}_{k'_x,k'_y,k'_z}^{(3)}(\omega) - \tilde{R}_{k'_x,k'_y,k'_z}^{(4)}(\omega)\right).$$

9. The method of claim 1, further comprising:
using (10) and (11) to directly give a relationship between the 3D Fourier transform of measured echo signals at a transducer surface and the 3D spatial Fourier transform of the object function for a steered plane wave transmission with a fixed Axicon angle (steering angle for plane waves), $\zeta_T$, of X wave and azimuthal angle, $\theta_T$,
obtaining the spatial Fourier transform of the object function, and
using (17) to reconstruct images with an inverse 3D Fourier transform; wherein, for steered plane waves, the relationship of the parameters between the Fourier transform of the echoes and the object function is obtained:

$$\begin{cases} k'_x = k_x + k\sin\zeta_T\cos\theta_T \\ k'_y = k_y + k\sin\zeta_T\sin\theta_T \\ k'_z = k_z + k\cos\zeta_T = \sqrt{k^2 - k_x^2 - k_y^2} + k\cos\zeta_T \geq 0 \end{cases} \quad (34)$$

10. The method of claim 1, wherein, for a 2D image reconstruction, using a 2D imaging formula: $F_{BL}(k'_x, k'_z) = c^2 H(k) \tilde{R}_{k'_x, k'_z}(\omega)$, (35)

where $$\begin{cases} k'_x = k_x + k_{x_T} \\ k'_z = k_z + k_{z_T} = \sqrt{k^2 - k_x^2} + \sqrt{k^2 - k_{x_T}^2} \geq 0 \end{cases}. \quad (36)$$

11. The method of claim 1, wherein step c) includes Fourier transforming along a time domain of one or more of: i) the weighted transmitted signal, or ii) the spatial Fourier transform, whereby a multi-dimensional k-space data set is formed.

12. The method of claim 1, wherein step c) includes:
i) interpolating a multi-dimensional k-space data set to produce rectilinear multi-dimensional k-space data sets; and,
ii) performing inverse Fourier transformations of the interpolated rectilinear multi-dimensional k-space data sets along each of its dimensions to produce the image data set.

13. The method of claim 12, wherein the k-space data sets have two- or three-dimensions, and the inverse Fourier transformation is performed along each of the two- or three-dimensions to produce a two- or three-dimensional image data set.

14. The method of claim 1, wherein the image data set of step c) is reconstructed using the formula $k'_z = k + k_{z_T}$.

15. The method of claim 1, wherein the image data set of step c) is reconstructed using $$\begin{cases} k'_x = k_x + k_{x_T} \\ k'_y = k_y + k_{y_T} \\ k'_z = k_z + k_{z_T} = \sqrt{k^2 - k_x^2 - k_y^2} + \sqrt{k^2 - k_{x_T}^2 - k_{y_T}^2} \geq 0 \end{cases}.$$

16. The method of claim 1, wherein the image data set of step c) is reconstructed using $$\begin{cases} k_x = k'_x - k_{x_T} \\ k = \dfrac{\sqrt{(k'^2_z + k_{x_T}^2 - (k'_x - k_{x_T})^2)^2 + 4k'^2_z(k'_x - k_{x_T})^2}}{2k'_z} \end{cases},$$

for producing a two-dimensional image.

17. The method of claim 1, wherein steps a)-c) are performed a plurality of times.

18. The method of claim 1, wherein the spatial frequency is non-uniform.

19. The method of claim 1, further including combining a plurality of the single transmit spatial frequency signals and the multiple receive spatial frequency signals to increase signal-to-noise ratio, image resolution, image contrast, and reduce sidelobes for the image.

20. The method of claim 2, further including combining a plurality of the multiple transmit spatial frequency signals and the multiple receive spatial frequency signals to increase signal-to-noise ratio, image resolution, image contrast, and reduce sidelobes for the image.

21. The method of claim 1, in which the step a) and step b) are performed using the same transducer array.

22. The method of claim 1, in which the multiple receive signals are Fourier transformed over a single transducer aperture.

23. The method of claim 1, in which the multiple receive signals are superposed coherently with corresponding or other transmission weightings or steered angles to enhance resolutions and contrast, and to reduce sidelobes.

24. The method of claim 1, in which the multiple receive signals are superposed incoherently with corresponding or other transmission weightings or steered angles to reduce speckle formation.

25. The method of claim 1, in which one group of transmitted signals is used to reconstruct an image.

26. The method of claim 2, in which at least two groups of transmitted signals are used to reconstruct an image.

27. The method of claim 1, in which a single transmitter is used to produce weightings for different transducer elements.

28. The method of claim 1, in which more than one transmitter is used to produce weightings for different transducer elements.

29. The method of claim 1, in which harmonic and/or elastic images are produced.

30. The method of claim 1, in which a physiological functional image is reproduced.

31. The method of claim 1, in which at least a part of the object to be imaged is moving.

32. The method of claim 2, in which the first direction is perpendicular with respect to a surface transmitting the signals.

33. The method of claim 2, in which a single image is used to construct the first and second sets of flow velocity component images by rotating the single image and interpolating data from the rotated image.

34. The method of claim 2, in which pulse Doppler or color flow Doppler method is used to reconstruct images.

35. The method of claim 1, in which the transmitted signals comprise sine and cosine spatially weighted signals.

36. An apparatus for producing a high frame rate, high resolution and high contrast image of an object, comprising:
   a) a transmitter device configured to:
      i) transmit one or more groups of signals of energy weighted by single spatial frequency but may be of different phases or linear time delay toward an object to be imaged; and
      ii) receive by weighting receive signals from the object with multiple spatial frequencies, or by performing a spatial Fourier transform;
   b) an electronic- or computer-implemented device configured to reconstruct a two- or three-dimensional image data set from the group of the transmitted signals weighted by the single spatial frequency or linear time delay, and the receive signals weighted with the multiple spatial frequencies or processed by the spatial Fourier transform; and,
   c) a processor configured to reconstruct the high frame rate, high resolution and high contrast image from the image data set.

37. The apparatus of claim 36, wherein the transmit/receive device comprises a transducer array configured to form one or more limited diffraction transmitted beams.

38. The apparatus of claim 37, wherein the transmit/receive device comprises a transducer array configured to form one or more steered transmitted beams.

39. The apparatus of claim 36, wherein the device b) is configured to: i) Fourier transform the weighted echo signals to form at least a first multi-dimensional k-space data set.

40. The apparatus of claim 39 wherein device c) is further configured to: ii) interpolate one or more multi-dimensional k-space data sets to produce rectilinear multi-dimensional k-space data sets; and, iii) perform inverse Fourier transformations of the interpolated k-space data sets along each of its dimensions, whereby the image data set is produced.

41. The apparatus of claim 36, wherein the transmit/receive device comprising separate elements in a transducer array arranged in a one- or two-dimensional array.

42. The apparatus of claim 36, wherein the transmit/receive device is configured to steer one or more plane waves at one or more different angles.

43. The apparatus of claim 36, wherein a single transmit/receive device is configured to produce weightings for different transducer elements.

44. The apparatus of claim 36, wherein the transmit/receive device comprises a transducer having a single aperture, and wherein the receive signals are Fourier transformed over the single transducer aperture.

45. The apparatus of claim 36, wherein the transmit/receive device transmits more than one beam at the same spatial frequency or steering angle in order to obtain the velocity component image and to improve signal-to-noise ratio.

46. The method of claim 2, wherein step a) each group may contain one or more signals, each of which is produced with one transmission.

47. The method of claim 2, in which the transmit group comprises one or more limited diffraction beams.

48. The method of claim 2, in which the received signal for echoes returned from all random scatterers within the object $f(\vec{r}_0)$ is a linear superposition of those echo signals from individual point scatterers as follows:

$$R_{k_x+k_{x_T},k_y+k_{y_T},k_z+k_{z_T}}(t) = \frac{1}{2\pi}\int_{-\infty}^{\infty}\frac{A(k)T(k)H(k)}{c} \times \quad (8)$$

$$\left[\int_V f(\vec{r}_0)e^{i(k_x+k_{x_T})x_0+i(k_y+k_{y_T})y_0+i(k_z+k_{z_T})z_0}\overline{d r_0}\right]e^{-i\omega x}dk = \frac{1}{2\pi}$$

$$\int_{-\infty}^{\infty}\frac{A(k)T(k)H(k)}{c}F(k_x+k_{x_T},k_y+k_{y_T},k_z+k_{z_T})e^{-i\omega x}dk.$$

49. The method of claim 48, in which the temporal Fourier transform (spectrum) of the received signal obtained as follows:

$$\tilde{R}_{k_x+k_{x_T},k_y+k_{y_T},k_z+k_{z_T}}(\omega) = \quad (10)$$

$$\frac{A(k)T(k)H(k)}{c^2} \times \int_V f(\vec{r}_0)e^{i(k_x+k_{x_T})x_0+i(k_y+k_{y_T})y_0+i(k_z+k_{z_T})z_0}d\vec{r}_0$$

or $$\tilde{R}_{k_x+k_{x_T},k_y+k_{y_T},k_z+k_{z_T}}(\omega) =$$

$$\frac{A(k)T(k)H(k)}{c^2} \times F(k_x+k_{x_T},k_y+k_{y_T},k_z+k_{z_T})$$

or $$F_{BL}(k'_x,k'_y,k'_z) = c^2 H(k)\tilde{R}_{k'_x,k'_y,k'_z}(\omega).$$

50. The method of claim 49, in which a 2D Fourier transform of the echo signals in terms of both $x_1$ and $y_1$ over a transducer surface is as follows:

$$\tilde{R}_{k_x+k_{x_T},k_y+k_{y_T},k_z+k_{z_T}}(\omega) = \frac{A(k)T(k)H(k)}{c^2} \times \quad (13)$$

$$\int_V f(\vec{r}_0) e^{ik_x x_0 + ik_y y_0 + ik_z z_0} e^{ik_{x_T} x_0 + ik_{y_T} y_0 + ik_{z_T} z_0} d\vec{r}_0$$

$$= \frac{A(k)}{c} \int_V f(\vec{r}_0) \left[ \frac{T(k)H(k)}{c} e^{ik_x x_0 + ik_y y_0 + ik_z z_0} \right]$$

$$e^{ik_{x_T} x_0 + ik_{y_T} y_0 + ik_{z_T} z_0} d\vec{r}_0$$

$$= \frac{A(k)}{c} \int_V f(\vec{r}_0) [\tilde{\Phi}^R_{Array}(\vec{r}_0, \omega)] e^{ik_{x_T} x_0 + ik_{y_T} y_0 + ik_{z_T} z_0} d\vec{r}_0$$

$$= \frac{A(k)}{c} \int_V f(\vec{r}_0) [\mathfrak{I}_{x_1, y_1} \{\tilde{E}(x_1, y_1; \vec{r}_0; \omega)\}] e^{ik_{x_T} x_0 + ik_{y_T} y_0 + ik_{z_T} z_0} d\vec{r}_0$$

$$= \mathfrak{I}_{x_1, y_1} \left\{ \int_V \left[ f(\vec{r}_0) \frac{A(k)}{c} e^{ik_{x_T} x_0 + ik_{y_T} y_0 + ik_{z_T} z_0} \right] \tilde{E}(x_1, y_1; \vec{r}_0; \omega) d\vec{r}_0 \right\}.$$

51. The method of claim 2, wherein four limited-diffraction array beams are transmitted (fix both $k_{x_T}$ and $k_{y_T}$) in each group as follows:

$$\Phi^T_{Array(1)}(\vec{r}_0, t) = \quad (26)$$
$$\frac{1}{2\pi} \int_{-\infty}^{\infty} A(k)H(k)\cos(k_{x_T} x_0)\cos(k_{y_T} y_0) e^{ik_{z_T} z_0} e^{i\omega x} dk,$$

$$\Phi^T_{Array(2)}(\vec{r}_0, t) = \frac{1}{2\pi} \int_{-\infty}^{\infty} A(k)H(k)\cos(k_{x_T} x_0)\sin(k_{y_T} y_0) e^{ik_{z_T} z_0} e^{i\omega x} dk, \quad (27)$$

$$\Phi^T_{Array(3)}(\vec{r}_0, t) = \quad (28)$$
$$\frac{1}{2\pi} \int_{-\infty}^{\infty} A(k)H(k)\sin(k_{x_T} x_0)\cos(k_{y_T} y_0) e^{ik_{z_T} z_0} e^{i\omega x} dk,$$

and $$\Phi^T_{Array(4)}(\vec{r}_0, t) = \frac{1}{2\pi} \int_{-\infty}^{\infty} A(k)H(k)\sin(k_{x_T} x_0)\sin(k_{y_T} y_0) e^{ik_{z_T} z_0} e^{i\omega x} dk, \quad (29)$$

wherein four coverage areas are obtained in a spatial Fourier space of $f(\vec{r}_0)$ from combinations of the four echo signals, and wherein denoting the Fourier transform of the four echo signals as $\tilde{R}_{k'_x, k'_y, k'_z}^{(1)}(\omega)$, $\tilde{R}_{k'_x, k'_y, k'_z}^{(2)}(\omega)$, $\tilde{R}_{k'_x, k'_y, k'_z}^{(3)}(\omega)$, and $\tilde{R}_{k'_x, k'_y, k'_z}^{(4)}(\omega)$, corresponding to (26)-(29), respectively, provides:

$$F_{BL}(k_x + k_{x_T}, k_y + k_{y_T}, k_z + k_{z_T}) = \quad (30)$$
$$c^2 H(k)\left(\tilde{R}_{k'_x, k'_y, k'_z}^{(1)}(\omega) + i\tilde{R}_{k'_x, k'_y, k'_z}^{(2)}(\omega) + i\tilde{R}_{k'_x, k'_y, k'_z}^{(3)}(\omega) - \tilde{R}_{k'_x, k'_y, k'_z}^{(4)}(\omega)\right),$$

$$F_{BL}(k_x + k_{x_T}, k_y - k_{y_T}, k_z + k_{z_T}) = \quad (31)$$
$$c^2 H(k)\left(\tilde{R}_{k'_x, k'_y, k'_z}^{(1)}(\omega) - i\tilde{R}_{k'_x, k'_y, k'_z}^{(2)}(\omega) + i\tilde{R}_{k'_x, k'_y, k'_z}^{(3)}(\omega) + \tilde{R}_{k'_x, k'_y, k'_z}^{(4)}(\omega)\right),$$

$$F_{BL}(k_x - k_{x_T}, k_y + k_{y_T}, k_z + k_{z_T}) = \quad (32)$$
$$c^2 H(k)\left(\tilde{R}_{k'_x, k'_y, k'_z}^{(1)}(\omega) + i\tilde{R}_{k'_x, k'_y, k'_z}^{(2)}(\omega) - i\tilde{R}_{k'_x, k'_y, k'_z}^{(3)}(\omega) + \tilde{R}_{k'_x, k'_y, k'_z}^{(4)}(\omega)\right),$$

$$F_{BL}(k_x - k_{x_T}, k_y - k_{y_T}, k_z + k_{z_T}) = \quad (33)$$
$$c^2 H(k)\left(\tilde{R}_{k'_x, k'_y, k'_z}^{(1)}(\omega) - i\tilde{R}_{k'_x, k'_y, k'_z}^{(2)}(\omega) - i\tilde{R}_{k'_x, k'_y, k'_z}^{(3)}(\omega) - \tilde{R}_{k'_x, k'_y, k'_z}^{(4)}(\omega)\right).$$

52. The method of claim 2, further comprising:
using (10) and (11) to directly give a relationship between the 3D Fourier transform of measured echo signals at a transducer surface and the 3D spatial Fourier transform of the object function for a steered plane wave transmission with a fixed Axicon angle (steering angle for plane waves), $\zeta_T$, of X wave and azimuthal angle, $\theta_T$, obtaining the spatial Fourier transform of the object function, and
using (17) to reconstruct images with an inverse 3D Fourier transform; wherein, for steered plane waves, the relationship of the parameters between the Fourier transform of the echoes and the object function is obtained:

$$\begin{cases} k'_x = k_x + k\sin\zeta_T \cos\theta_T \\ k'_y = k_y + k\sin\zeta_T \sin\theta_T \\ k'_z = k_z + k\cos\zeta_T = \sqrt{k^2 - k_x^2 - k_y^2} + k\cos\zeta_T \geq 0 \end{cases} \quad (34)$$

53. The method of claim 2, wherein, for a 2D image reconstruction, using a 2D imaging formula: $F_{BL}(k'_x, k'_z) = c^2 H(k) \tilde{R}_{k'_x, k'_z}(\omega)$, (35)
where $$\begin{cases} k'_x = k_x + k_{x_T} \\ k'_z = k_z + k_{z_T} = \sqrt{k^2 - k_x^2} + \sqrt{k^2 - k_{x_T}^2} \geq 0 \end{cases} \quad (36)$$

54. The method of claim 2, wherein step c) includes Fourier transforming along a time domain of one or more of: i) the weighted transmitted signal, or ii) the spatial Fourier transform, whereby a multi-dimensional k-space data set is formed.

55. The method of claim 2, wherein step c) includes:
i) interpolating a multi-dimensional k-space data set to produce rectilinear multi-dimensional k-space data sets; and,
ii) performing inverse Fourier transformations of the interpolated rectilinear multi-dimensional k-space data sets along each of its dimensions to produce the image data set.

56. The method of claim 55, wherein the k-space data sets have two- or three-dimensions, and the inverse Fourier transformation is performed along each of the two- or three-dimensions to produce a two- or three-dimensional image data set.

57. The method of claim 2, wherein the image data set of step c) is reconstructed using the formula $k'_z = k + k_{z_T}$.

58. The method of claim 2, wherein the image data set of step c) is reconstructed using $$\begin{cases} k'_x = k_x + k_{x_T} \\ k'_y = k_y + k_{y_T} \\ k'_z = k_z + k_{z_T} = \sqrt{k^2 - k_x^2 - k_y^2} + \sqrt{k^2 - k_{x_T}^2 - k_{y_T}^2} \geq 0 \end{cases}$$

59. The method of claim 2, wherein the image data set of step c) is reconstructed using $$\begin{cases} k_x = k'_x - k_{x_T} \\ k = \dfrac{\sqrt{(k'^2_z + k^2_{x_T} - (k'_x - k_{x_T})^2)^2 + 4k'^2_z(k'_x - k_{x_T})^2}}{2k'_z} \end{cases}$$

for producing a two-dimensional image.

60. The method of claim 2, wherein steps a)-c) are performed a plurality of times.

61. The method of claim 2, wherein the spatial frequency is non-uniform.

62. The method of claim 2, in which the step a) and step b) are performed using the same transducer array.

63. The method of claim 2, in which the multiple receive signals are Fourier transformed over a single transducer aperture.

64. The method of claim 2, in which the multiple receive signals are superposed coherently with corresponding or other transmission weightings or steered angles to enhance resolutions and contrast, and to reduce sidelobes.

65. The method of claim 2, in which the multiple receive signals are superposed incoherently with corresponding or other transmission weightings or steered angles to reduce speckle formation.

66. The method of claim 2, in which a single transmitter is used to produce weightings for different transducer elements.

67. The method of claim 2, in which more than one transmitter is used to produce weightings for different transducer elements.

68. The method of claim 2, in which harmonic and/or elastic images are produced.

69. The method of claim 2, in which a physiological functional image is reproduced.

70. The method of claim 2, in which at least a part of the object to be imaged is moving.

71. The method of claim 2, in which the transmitted signals comprise sine and cosine spatially weighted signals.

* * * * *

UNITED STATES PATENT AND TRADEMARK OFFICE
CERTIFICATE OF CORRECTION

| | | |
|---|---|---|
| PATENT NO. | : 7,957,609 B2 | Page 1 of 8 |
| APPLICATION NO. | : 11/991129 | |
| DATED | : June 7, 2011 | |
| INVENTOR(S) | : Lu et al. | |

It is certified that error appears in the above-identified patent and that said Letters Patent is hereby corrected as shown below:

Column 2, Line 18, delete the "," after "low,"

Column 2, Line 27, delete "mal" and insert --may--,

Column 2, Line 41, delete the "," after "low,"

Column 2, Line 63, delete "bye" and insert --by--,

Column 3, Line 13, delete "ma)" and insert --may--,

Column 5, Line 59, delete "D&S 9117s" and insert --D&S 91 TXs--,

Column 8, Line 6, delete "imagine" and insert --imaging--,

Column 8, Line 25, delete "imagine" and insert --imaging--,

Column 8, Line 61, delete "bad" and insert --by--,

Column 9, Line 1, delete "bad" and insert --by--,

Column 10, Line 51, delete "bet" and insert --by--,

Column 12, Line 11, delete "tope" and insert --type--,

Column 13, Line 57, delete "vet" and insert --yet--,

Column 14, Line 11, delete "flowing" and insert --flow--,

Column 14, Line 26, delete "bar" and insert --by--,

Column 14, Line 48, delete "an)," and insert --any--,

Column 15, Line 23, delete "rate:" and insert --rate,--,

Column 20, Line 47, delete "an)" and insert --any--,

Column 21, Lines 41-45, see supplemental sheet attached hereto,

Column 21, Lines 50-54, see supplemental sheet attached hereto,

Column 22, Line 30, delete "ED" and insert --3D--,

Column 23, Line 11, delete "aid" and insert --and--,

Column 23, Lines 30-35, see supplemental sheet attached hereto,

Signed and Sealed this
Thirty-first Day of January, 2012

David J. Kappos
*Director of the United States Patent and Trademark Office*

CERTIFICATE OF CORRECTION (continued)
U.S. Pat. No. 7,957,609 B2

Column 23, Lines 53-55, see supplemental sheet attached hereto,

Column 25, Line 5, delete "bus" and insert --by--,

Column 25, Line 34, delete "1" and insert --11--,

Column 25, Line 55, delete "n," and insert --n--,

Column 25, Line 55, delete "angles" and insert --angle,--,

Column 26, Line 52, delete "6.2-5" and insert --6.25--,

Column 27, Line 16, delete "(1f," and insert --(f)--,

Column 27, Line 22, delete "verge" and insert --very--,

Column 28, Line 13, delete "FOR" and insert --HFR--,

Column 28, Line 15, delete "vie" and insert --view--,

Column 28, Line 17, delete the "," after "follow,"

Column 28, Line 56, delete "Arrant" and insert --Array--,

Column 31, Line 27, delete "sideband" and insert --wideband--,

Column 32, Line 6, delete "pane" and insert --plane--,

Column 32, Lines 45-48, see supplemental sheet attached hereto,

Column 32, Lines 57-61, see supplemental sheet attached hereto,

Column 32, Line 66, delete "The)," and insert --They--,

Column 34, Line 35, delete "Lotion" and insert --Motion--,

Column 35, Line 28, delete "Edith" and insert --with--,

Column 38, Line 58, delete "shill" and insert --will--

Column 42, Line 47, delete "r=n" and insert --mm--.

Column 50, Claim 7, Lines 5-6, See supplemental sheet attached hereto,

Column 51, Claim 8, Line 8, See supplemental sheet attached hereto,

Column 51, Claim 8, Line 10, See supplemental sheet attached hereto,

Column 51, Claim 8, Line 15, See supplemental sheet attached hereto,

Column 51, Claim 8, Line 18, See supplemental sheet attached hereto,

Column 51, Claim 8, Lines 25-27, See supplemental sheet attached hereto,

Column 54, Claim 48, Lines 41-43, See supplemental sheet attached hereto,

Column 55, Claim 51, Line 25, See supplemental sheet attached hereto,

Column 55, Claim 51, Line 27, See supplemental sheet attached hereto,

Column 55, Claim 51, Line 32, See supplemental sheet attached hereto,

Column 55, Claim 51, Line 35, See supplemental sheet attached hereto,

Column 55, Claim 51, Lines 41-43, See supplemental sheet attached hereto.

CERTIFICATE OF CORRECTION (continued)
U.S. Pat. No. 7,957,609 B2

Column 21, Lines 41 - 45, delete

"
$$\Phi^T_{Array(2)}(\vec{r}_0, t) = \frac{1}{2\pi} \int_{-\infty}^{\infty} A(k)H(k)\cos(k_{xT}x_0)\cos(k_{yT}y_0)e^{ik_{zT}z_0}e^{-i\omega t} dk, \quad (27)$$
"

and insert

--
$$\Phi^T_{Array(2)}(\vec{r}_0, t) = \frac{1}{2\pi} \int_{-\infty}^{\infty} A(k)H(k)\cos(k_{xT}x_0)\sin(k_{yT}y_0)e^{ik_{zT}z_0}e^{-i\omega t} dk, \quad (27)$$
--, Column 21, Lines 50 - 54, delete "
$$\Phi^T_{Array(4)}(\vec{r}_0, t) = \frac{1}{2\pi} \int_{-\infty}^{\infty} A(k)H(k)\sin(k_{xT}x_0)\cos(k_{yT}y_0)e^{ik_{zT}z_0}e^{-i\omega t} dk, \quad (29)$$
"

and insert

--
$$\Phi^T_{Array(4)}(\vec{r}_0, t) = \frac{1}{2\pi} \int_{-\infty}^{\infty} A(k)H(k)\sin(k_{xT}x_0)\sin(k_{yT}y_0)e^{ik_{zT}z_0}e^{-i\omega t} dk, \quad (29)$$
--, Column 23, Lines 30 - 35, delete "
$$\begin{cases} k_x = k'_x - k_{xT} \\ k = \dfrac{\sqrt{(k'^2_z + k^2_{xT} - (k'_x - k_{xT})^2)^2 + 4k'^4_z(k'_x - k_{xT})^2}}{2k'_z} \end{cases} \quad (37)$$
"

and insert

--
$$\begin{cases} k_x = k'_x - k_{x_T} \\ k = \dfrac{\sqrt{\left(k'^2_z + k^2_{x_T} - \left(k'_x - k_{x_T}\right)^2\right)^2 + 4k'^2_z\left(k'_x - k_{x_T}\right)^2}}{2k'_z} \end{cases} \quad (37)$$
--,

Column 23, Lines 53 - 55, delete

$$(k'_x - k_{xT})^2 + k'^2_z = k^2_{xT}, \text{ if } k_x = k \text{ or } k_x = -k. \quad (39)$$

and insert $$(k'_x - k_{x_T})^2 + k'^2_z = k^2_{x_T}, \text{ if } k_{x_T} = k \text{ or } k_{x_T} = -k. \quad (39)$$

Column 32, Lines 45 - 48, delete

$$R_c = \frac{R_{moving} - R_{Stationary}}{R_{Stationary}} \times 100\% \quad (49)$$

and insert $$R_c = \frac{R_{moving} - R_{Stationary}}{R_{Stationary}} \times 100\% \quad (49)$$

Column 32, Lines 57 - 61, delete

$$C = 20 \log \frac{\overline{m_k}}{\overline{m_b}}, \quad (51)$$

and insert $$C = 20\log\frac{\overline{m_k}}{\overline{m_b}}, \quad (51)$$

Column 50, Claim 7, Lines 5 - 6, delete

$$= \frac{A(k)}{c} \int_V f(\vec{r}_0) \left[ \frac{T(k)H(k)}{c} e^{ik_x x_0 + ik_y y_0 + ik_z z_0} \right] e^{ik_{xT} x_0 + ik_{yT} y_0 + ik_{zT} z_0} d\vec{r}_0$$

$$= \frac{A(k)}{c} \int_V f(\vec{r}_0) [\Phi^R_{Array}(\vec{r}_0, \omega)] e^{ik_{xT} x_0 + ik_{yT} y_0 + ik_{zT} z_0} d\vec{r}_0$$

and insert $$= \frac{A(k)}{c} \int_V f(\vec{r}_0) \left[ \frac{T(k)H(k)}{c} e^{ik_x x_0 + ik_y y_0 + ik_z z_0} \right] e^{ik_{xT} x_0 + ik_{yT} y_0 + ik_{zT} z_0} d\vec{r}_0$$

$$= \frac{A(k)}{c} \int_V f(\vec{r}_0) \left[ \check{\Phi}^R_{Array}(\vec{r}_0, \omega) \right] e^{ik_{xT} x_0 + ik_{yT} y_0 + ik_{zT} z_0} d\vec{r}_0$$

-- --,

Column 51, Claim 8, Line 8, delete

"
$$\Phi^T_{Array(1)}(\vec{r}_0, t) = \qquad (26)$$
$$\frac{1}{2\pi} \int_{-\infty}^{\infty} A(k)H(k)\cos(k_{xT} x_0)\cos(k_{yT} y_0) e^{ik_{zT} z_0} e^{i\omega t} dk,$$
"

and insert

-- 
$$\Phi^T_{Array(1)}(\vec{r}_0, t) = \frac{1}{2\pi} \int_{-\infty}^{\infty} A(k)H(k)\cos(k_{xT} x_0)\cos(k_{yT} y_0) e^{ik_{zT} z_0} e^{-i\omega t} dk, \qquad (26)$$
--,

Column 51, Claim 8, Line 10, delete

"
$$\Phi^T_{Array(2)}(\vec{r}_0, t) = \frac{1}{2\pi} \int_{-\infty}^{\infty} A(k)H(k)\cos(k_{xT} x_0)\sin(k_{yT} y_0) e^{ik_{zT} z_0} e^{i\omega t} dk, \qquad (27)$$
"

and insert

--
$$\Phi^T_{Array(2)}(\vec{r}_0, t) = \frac{1}{2\pi} \int_{-\infty}^{\infty} A(k)H(k)\cos(k_{xT} x_0)\sin(k_{yT} y_0) e^{ik_{zT} z_0} e^{-i\omega t} dk, \qquad (27)$$
--,

Column 51, Claim 8, Line 15, delete

"
$$\Phi^T_{Array(3)}(\vec{r}_0, t) = \qquad (28)$$
$$\frac{1}{2\pi} \int_{-\infty}^{\infty} A(k)H(k)\sin(k_{xT} x_0)\cos(k_{yT} y_0) e^{ik_{zT} z_0} e^{i\omega t} dk,$$
"

and insert

CERTIFICATE OF CORRECTION (continued)

U.S. Pat. No. 7,957,609 B2

$$\Phi^T_{Array(3)}(\vec{r}_0, t) = \frac{1}{2\pi} \int_{-\infty}^{\infty} A(k)H(k)\sin(k_{xT} x_0)\cos(k_{yT} y_0)e^{ik_{zT} z_0} e^{-i\omega t} dk, \quad (28)$$

Column 51, Claim 8, Line 18, delete

" $\Phi^T_{Array(4)}(\vec{r}_0, t) = \frac{1}{2\pi} \int_{-\infty}^{\infty} A(k)H(k)\sin(k_{xT} x_0)\sin(k_{yT} y_0)e^{ik_{zT} z_0} e^{-i\omega t} dk, \quad (29)$ "

and insert

-- $\Phi^T_{Array(4)}(\vec{r}_0, t) = \frac{1}{2\pi} \int_{-\infty}^{\infty} A(k)H(k)\sin(k_{xT} x_0)\sin(k_{yT} y_0)e^{ik_{zT} z_0} e^{-i\omega t} dk, \quad (29)$ --, Column 51, Claim 8, Lines 25 - 27, delete " the four echo signals as $\hat{R}^{(1)}_{k'_x,k'_y,k'_z}(\omega)$, $\hat{R}^{(2)}_{k'_x,k'_y,k'_z}(\omega)$, $\hat{R}^{(3)}_{k'_x,k'_y,k'_z}(\omega)$, and $\hat{R}^{(4)}_{k'_x,k'_y,k'_z}(\omega)$, corresponding to "

and insert

-- the four echo signals as $\tilde{R}^{(1)}_{k'_x,k'_y,k'_z}(\omega)$, $\tilde{R}^{(2)}_{k'_x,k'_y,k'_z}(\omega)$, $\tilde{R}^{(3)}_{k'_x,k'_y,k'_z}(\omega)$, and $\tilde{R}^{(4)}_{k'_x,k'_y,k'_z}(\omega)$, corresponding to --, Column 54, Claim 48, Lines 41 - 43, delete " $R_{k_x+k_{xT},k_y+k_{yT},k_z+k_{zT}}(t) = \frac{1}{2\pi} \int_{-\infty}^{\infty} \frac{A(k)T(k)H(k)}{c} \times$ $\left[ \int_V f(\vec{r}_0) e^{i(k_x+k_{xT})x_0 + i(k_y+k_{yT})y_0 + i(k_z+k_{zT})z_0} d\vec{r}_0 \right] e^{-i\omega t} dk = \frac{1}{2\pi}$ $\int_{-\infty}^{\infty} \frac{A(k)T(k)H(k)}{c} F(k_x+k_{xT}, k_y+k_{yT}, k_z+k_{zT}) e^{-i\omega t} dk.$ $\quad (8)$ "

and insert

CERTIFICATE OF CORRECTION (continued)
U.S. Pat. No. 7,957,609 B2

$$R_{k_x+k_{x_T}, k_y+k_{y_T}, k_z+k_{z_T}}(t) = \frac{1}{2\pi} \int_{-\infty}^{\infty} \frac{A(k)T(k)H(k)}{c}$$

$$\times \left[ \int_V f(\vec{r}_0) e^{j(k_x+k_{x_T})x_0 + j(k_y+k_{y_T})y_0 + j(k_z+k_{z_T})z_0} d\vec{r}_0 \right] e^{-j\omega t} dk \quad (8)$$

$$= \frac{1}{2\pi} \int_{-\infty}^{\infty} \frac{A(k)T(k)H(k)}{c} F(k_x+k_{x_T}, k_y+k_{y_T}, k_z+k_{z_T}) e^{-j\omega t} dk$$

--,

Column 55, Claim 51, Line 25, delete

" $$\Phi^T_{Array(1)}(\vec{r}_0, t) = \frac{1}{2\pi} \int_{-\infty}^{+\infty} A(k)H(k)\cos(k_{x_T}x_0)\cos(k_{y_T}y_0) e^{j\vec{k}_T \cdot \vec{r}_0} e^{-j\omega t} dk, \quad (26)$$ "

and insert

-- $$\Phi^T_{Array(1)}(\vec{r}_0, t) = \frac{1}{2\pi} \int_{-\infty}^{\infty} A(k)H(k)\cos(k_{x_T}x_0)\cos(k_{y_T}y_0) e^{j\vec{k}_T \cdot \vec{r}_0} e^{-j\omega t} dk. \quad (26)$$ --,

Column 55, Claim 51, Line 27, delete

" $$\Phi^T_{Array(2)}(\vec{r}_0, t) = \frac{1}{2\pi} \int_{-\infty}^{+\infty} A(k)H(k)\cos(k_{x_T}x_0)\sin(k_{y_T}y_0) e^{j\vec{k}_T \cdot \vec{r}_0} e^{-j\omega t} dk, \quad (27)$$ , and insert

-- $$\Phi^T_{Array(2)}(\vec{r}_0, t) = \frac{1}{2\pi} \int_{-\infty}^{\infty} A(k)H(k)\cos(k_{x_T}x_0)\sin(k_{y_T}y_0) e^{j\vec{k}_T \cdot \vec{r}_0} e^{-j\omega t} dk, \quad (27)$$ --,

Column 55, Claim 51, Line 32, delete

" $$\Phi^T_{Array(3)}(\vec{r}_0, t) = \frac{1}{2\pi} \int_{-\infty}^{+\infty} A(k)H(k)\sin(k_{x_T}x_0)\cos(k_{y_T}y_0) e^{j\vec{k}_T \cdot \vec{r}_0} e^{-j\omega t} dk, \quad (28)$$ , and insert

$$\Phi^T_{Array(3)}(\bar{r}_0,t) = \frac{1}{2\pi}\int_{-\infty}^{\infty} A(k)H(k)\sin(k_{x'}x_0)\cos(k_{y'}y_0)e^{ik_{z'}z_0}e^{-i\omega t}dk, \quad (28)$$

Column 55, Claim 51, Line 35, delete

" $$\Phi^T_{Array(4)}(\bar{r}_0,t) = \frac{1}{2\pi}\int_{-\infty}^{\infty} A(k)H(k)\sin(k_{x'}x_0)\sin(k_{y'}y_0)e^{ik_{z'}z_0}e^{-i\omega t}dk, \quad (29)$$ "

and insert $$\Phi^T_{Array(4)}(\bar{r}_0,t) = \frac{1}{2\pi}\int_{-\infty}^{\infty} A(k)H(k)\sin(k_{x'}x_0)\sin(k_{y'}y_0)e^{ik_{z'}z_0}e^{-i\omega t}dk, \quad (29)$$

Column 55, Claim 51, Lines 41 - 43, delete

" the four echo signals as $\tilde{R}^{(1)}_{k'_x, k'_y, k'_z}(\omega)$, $\tilde{R}^{(2)}_{k'_x, k'_y, k'_z}(\omega)$, $\tilde{R}^{(3)}_{k'_x, k'_y, k'_z}(\omega)$, and $\tilde{R}^{(4)}_{k'_x, k'_y, k'_z}(\omega)$, corresponding to (26)-(29), respectively, provides: "

and insert the four echo signals as $\tilde{R}^{(1)}_{k'_x,k'_y,k'_z}(\omega)$, $\tilde{R}^{(2)}_{k'_x,k'_y,k'_z}(\omega)$, $\tilde{R}^{(3)}_{k'_x,k'_y,k'_z}(\omega)$, and $\tilde{R}^{(4)}_{k'_x,k'_y,k'_z}(\omega)$, corresponding to